(12) United States Patent
Katsura et al.

(10) Patent No.: US 9,381,974 B2
(45) Date of Patent: Jul. 5, 2016

(54) ELECTRIC DERAILLEUR MOTOR UNIT AND MOTORIZED DERAILLEUR

(71) Applicant: Shimano Inc., Sakai, Osaka (JP)

(72) Inventors: Takafumi Katsura, Osaka (JP); Kensuke Tagaya, Osaka (JP); Hisashi Kawamoto, Narashino (JP); Yasuhiro Uno, Narashino (JP)

(73) Assignee: Shimano Inc., Osaka (JP)

( * ) Notice: Subject to any disclaimer, the term of this patent is extended or adjusted under 35 U.S.C. 154(b) by 378 days.

(21) Appl. No.: 14/068,317

(22) Filed: Oct. 31, 2013

(65) Prior Publication Data

US 2014/0121047 A1    May 1, 2014

(30) Foreign Application Priority Data

Nov. 1, 2012   (JP) ................................. 2012-242247

(51) Int. Cl.
*F16H 48/06*  (2006.01)
*B62M 9/122*  (2010.01)
*B62M 9/132*  (2010.01)

(52) U.S. Cl.
CPC ............... *B62M 9/122* (2013.01); *B62M 9/132* (2013.01); *Y10T 74/19614* (2015.01)

(58) Field of Classification Search
None
See application file for complete search history.

(56) References Cited

U.S. PATENT DOCUMENTS

| | | | |
|---|---|---|---|
| 5,480,365 A | 1/1996 | Lundin et al. | |
| 6,162,140 A | 12/2000 | Fukuda | |
| 6,679,797 B2 * | 1/2004 | Valle | B62M 25/08 474/78 |
| 6,726,586 B2 * | 4/2004 | Fukuda | B62M 9/122 474/70 |
| 6,945,888 B2 | 9/2005 | Fukuda et al. | |
| 7,306,531 B2 * | 12/2007 | Ichida | B62M 9/122 474/70 |
| 7,341,532 B2 | 3/2008 | Ichida et al. | |
| 7,467,567 B2 | 12/2008 | Fukuda | |
| 7,704,173 B2 * | 4/2010 | Ichida | B62M 25/08 474/80 |
| 7,942,768 B2 * | 5/2011 | Takamoto | B62M 25/08 474/82 |
| 7,980,974 B2 * | 7/2011 | Fukuda | B62M 25/08 474/70 |
| 8,025,597 B2 * | 9/2011 | Takamoto | B62M 9/122 474/70 |
| 8,033,937 B2 * | 10/2011 | Meggiolan | B62M 9/132 474/70 |
| 8,137,223 B2 * | 3/2012 | Watarai | B62K 23/06 280/260 |
| 8,202,182 B2 * | 6/2012 | Ishikawa | B62M 9/1248 192/226 |

(Continued)

FOREIGN PATENT DOCUMENTS

JP   2713601   2/1998
JP   2006219029   8/2006

OTHER PUBLICATIONS

AGMA Technical Paper, "Self-Locking Gears: Design and Potential Applications", Kapelvish et al., Oct. 2010.*

*Primary Examiner* — Dirk Wright
(74) *Attorney, Agent, or Firm* — Global IP Counselors

(57) ABSTRACT

An electric derailleur motor unit includes a base member, a motor, an output shaft, and a drive train. The motor is mounted to the base member. The motor has a motor shaft rotatable about a first rotational axis. The output shaft is rotatable about a second rotational axis. The drive train is operatively disposed between the motor shaft of the motor and the output shaft. The drive train includes an anti-backdriving device. The anti-backdriving device is configured to transmit rotation of the motor shaft of the motor in both rotational directions about the first rotational axis to the output shaft. The anti-backdriving device is further configured to prevent the output shaft from rotating in both rotational directions about the second rotational axis while the output shaft receives an external rotational torque from outside of the electric derailleur motor unit.

33 Claims, 29 Drawing Sheets

(56) References Cited

U.S. PATENT DOCUMENTS

| | | | |
|---|---|---|---|
| 8,591,367 B2* | 11/2013 | Kochan | F16H 1/003 475/149 |
| 8,882,618 B2* | 11/2014 | Yamaguchi | B62M 9/122 474/80 |
| 8,886,417 B2* | 11/2014 | Jordan | B62M 25/08 200/61.88 |
| 8,974,331 B2* | 3/2015 | Yamaguchi | B62M 9/122 474/80 |
| 8,979,683 B2* | 3/2015 | Katsura | B62M 25/08 474/80 |
| 9,005,059 B2* | 4/2015 | Suyama | B62M 9/122 474/80 |
| 9,085,340 B1* | 7/2015 | Sala | B62M 9/132 |
| 9,221,519 B2* | 12/2015 | Pasqua | B62M 9/132 |
| 2005/0197222 A1* | 9/2005 | Tatsumi | B62M 9/132 474/80 |
| 2006/0183584 A1* | 8/2006 | Fukuda | B62M 9/12 474/70 |

* cited by examiner

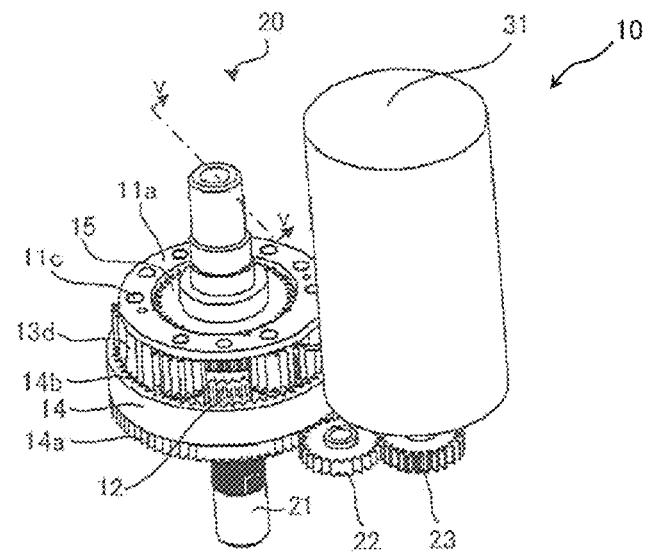
FIG. 4A
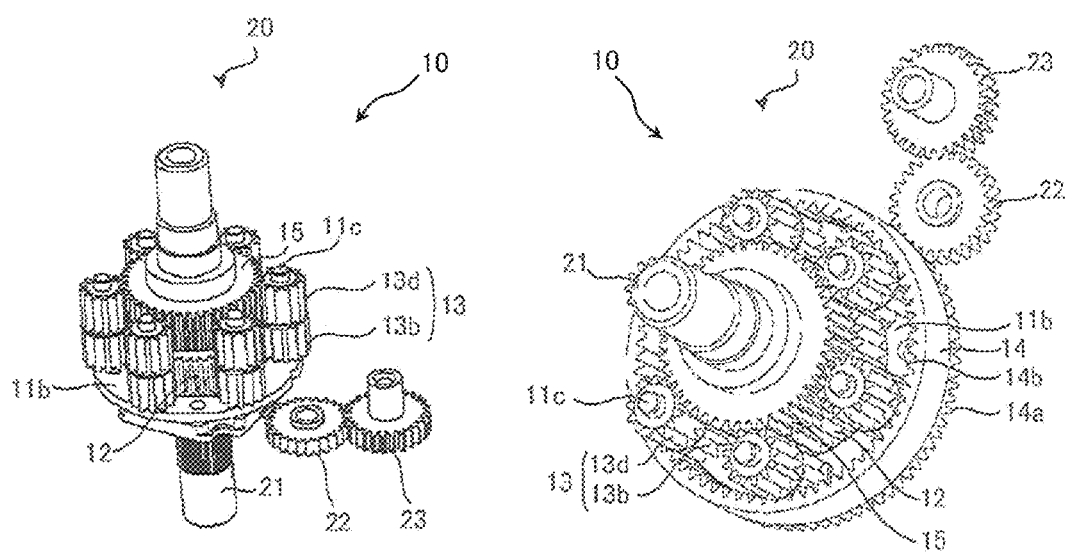
FIG. 4B
FIG. 4C

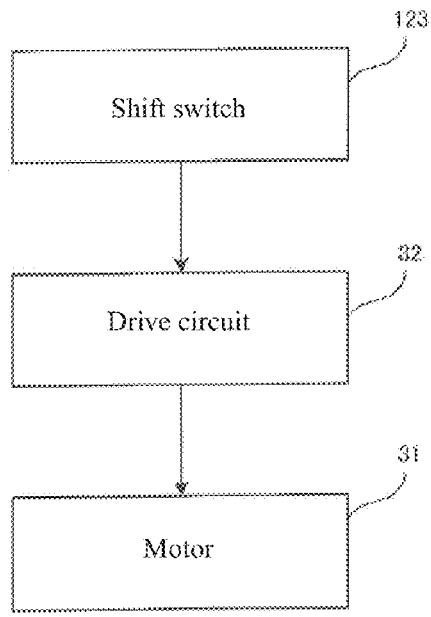

FIG. 6

| Parameters | Fixed sun gear 12 | First gear 13b | Second gear 13d | Output sun gear 15 |
|---|---|---|---|---|
| Module | $m_{ab}$ | | $m_{de}$ | |
| Inter-shaft distance | L | | L | |
| Number of teeth | $Z_a$ | $Z_b$ | $Z_d$ | $Z_e$ |
| Engagement pressure angle | $\alpha_{ab}$ | | $\alpha_{de}$ | |
| Engagement pressure angle of the imaginary line of action | $\alpha w_{ab}$ | | $\alpha w_{de}$ | |
| Transmission coefficient | $\eta_{ab}$ | | $\eta_{de}$ | |
| Base circle radius | $r_{ba}$ | $r_{bb}$ | $r_{bd}$ | $r_{be}$ |

FIG. 7

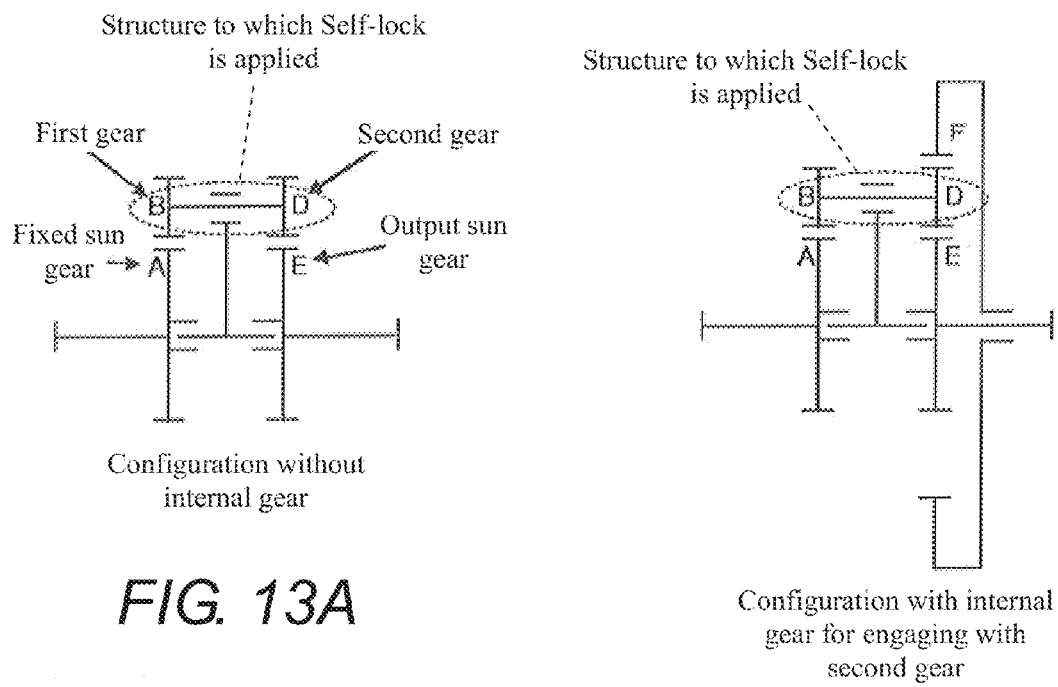
FIG. 13A
FIG. 13B
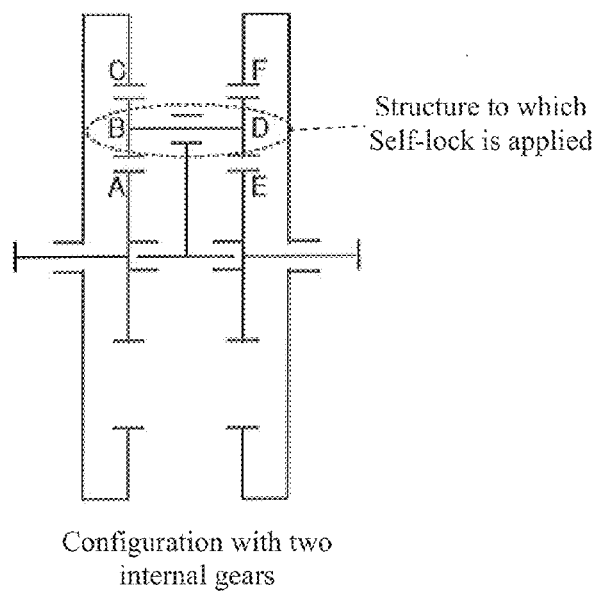
FIG. 13C

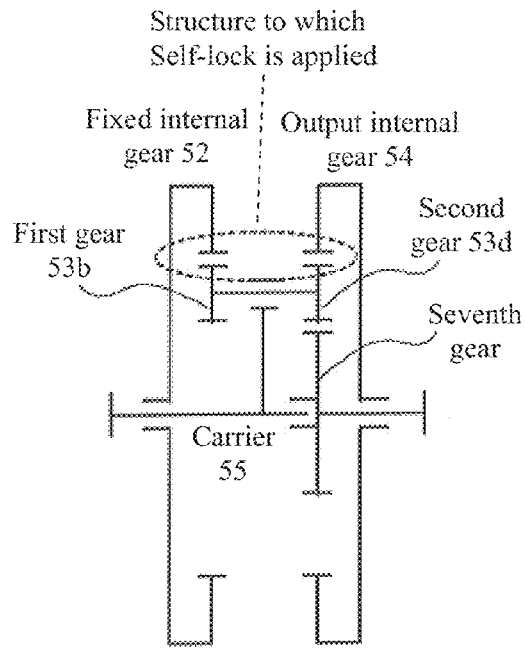 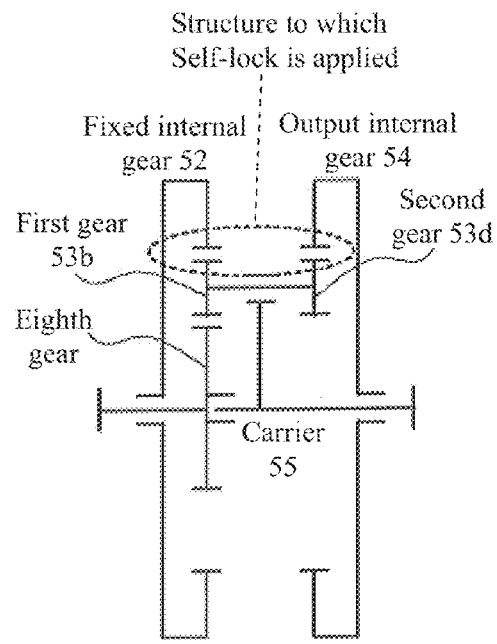
FIG. 20A    FIG. 20B
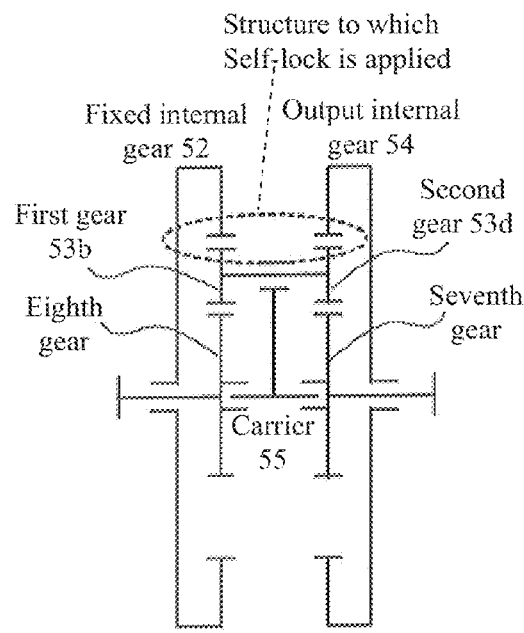
FIG. 20C

ELECTRIC DERAILLEUR MOTOR UNIT AND MOTORIZED DERAILLEUR

CROSS-REFERENCE TO RELATED APPLICATIONS

This application claims priority to Japanese Patent Application No. 2012-242247 filed on Nov. 1, 2012. The entire disclosure of Japanese Patent Application No. 2012-242247 is hereby incorporated herein by reference.

BACKGROUND

1. Field of the Invention

The present invention generally relates to a bicycle derailleur motor gear unit.

2. Background Information

Electrically-driven gear changing devices have been widely used for electric gear shifting in bicycles (see Japanese Laid-Open Patent Application Publication No. 2006-219029 (Patent Document 1), for example). The conventional electrically-driven gear changing device operates a bicycle derailleur via a shift cable.

SUMMARY

The tension of a chain and so forth applies a large force to the derailleur. Thus it is necessary for the derailleur to act against this large force to maintain its position. For this reason in the above-mentioned Patent Document 1, a worm gear is mounted on an output shaft of an electrically driven motor and transmits the torque of the motor to a worm wheel, while the rotation of the worm wheel drives the derailleur.

When a large force is applied to a positioning unit in the configuration described in the above-mentioned Patent Document 1, a large load acts on the worm gear and the worm wheel, thereby causing a malfunction of gears such as wear. Therefore, it is necessary to increase the size of and to strengthen the components such as the gears and the like.

One object of the present disclosure is to provide an electric derailleur motor unit with a self-lock function using a simple configuration.

In accordance with a first aspect of the present invention, an electric derailleur motor unit includes a base member, a motor, an output shaft, and a drive train. The motor is mounted to the base member. The motor has a motor shaft rotatable about a first rotational axis. The output shaft is rotatable about a second rotational axis. The drive train is operatively disposed between the motor shaft of the motor and the output shaft. The drive train includes an anti-backdriving device. The anti-backdriving device is configured to transmit rotation of the motor shaft of the motor in both rotational directions about the first rotational axis to the output shaft. The anti-backdriving device is further configured to prevent the output shaft from rotating in both rotational directions about the second rotational axis while the output shaft receives an external rotational torque from outside of the electric derailleur motor unit.

In accordance with a second aspect of the present invention, the electric derailleur motor unit according to the first aspect is configured such that the anti-backdriving device includes a case, an input member, an output member, and an engagement element. The case is mounted to the base member. The input member is rotatable with respect to the case. The input member is operatively coupled to the motor shaft of the motor. The output member is rotatable with respect to the case. The output member is operatively coupled to the output shaft. The engagement element is operatively disposed between the case and the output member.

In accordance with a third aspect of the present invention, the electric derailleur motor unit according to the second aspect is further configured such that the anti-backdriving device is further configured to lock the output member with respect to the case in response to the rotation of the output shaft being transmitted from the output shaft to the output member of the anti-backdriving device.

In accordance with a fourth aspect of the present invention, the electric derailleur motor unit according to the first aspect is configured such that the drive train further includes a spur gear that is fixedly attached to the motor shaft of the motor.

In accordance with a fifth aspect of the present invention, the electric derailleur motor unit according to the first aspect is configured such that the first and second rotational axes are parallel to each other.

In accordance with a sixth aspect of the present invention, the electric derailleur motor unit according to the first aspect is configured such that the drive train further includes a first reduction gear train that is operatively coupled between the motor shaft and the anti-backdriving device.

In accordance with a seventh aspect of the present invention, the electric derailleur motor unit according to the sixth aspect is configured such that the first reduction gear train consists of spur gears to operatively couple the motor shaft to the anti-backdriving device.

In accordance with an eighth aspect of the present invention, the electric derailleur motor unit according to the first aspect is configured such that the drive train further includes a second reduction gear train that is operatively coupled between the anti-backdriving device and the output shaft.

In accordance with a ninth aspect of the present invention, the electric derailleur motor unit according to the eighth aspect is further configured such that the second reduction gear train consists of spur gears to operatively couple the anti-backdriving device to the output shaft.

In accordance with a tenth aspect of the present invention, the electric derailleur motor unit according to the sixth aspect is configured such that the drive train further includes a second reduction gear train that is operatively coupled between the anti-backdriving device and the output shaft.

In accordance with an eleventh aspect of the present invention, the electric derailleur motor unit according to the tenth aspect is configured such that the second reduction gear train consists of spur gears to operatively couple the anti-backdriving device to the output shaft.

In accordance with a twelfth aspect of the present invention, a motorized derailleur includes the electric derailleur motor unit according to the first aspect. The motorized derailleur includes a linkage and a movable member. The linkage is operatively coupled to the output shaft. The movable member is movably supported by the linkage to move relative to the base member between a first shift position and a second shift position.

In accordance with a thirteenth aspect of the present invention, the motorized derailleur according to the twelfth aspect is configured such that the anti-backdriving device includes a case, an input member, an output member, and an engagement element. The case is mounted to the base member. The input member is rotatable with respect to the case. The input member is operatively coupled to the motor shaft of the motor. The output member is rotatable with respect to the case. The output member is operatively coupled to the output shaft. The engagement element is operatively disposed between the case and the output member.

In accordance with a fourteenth aspect of the present invention, the motorized derailleur according to the thirteenth aspect is configured such that the anti-backdriving device is further configured to lock the output member with respect to the case in response to the rotation of the output shaft being transmitted from the output shaft to the output member of the anti-backdriving device.

In accordance with a fifteenth aspect of the present invention, the motorized derailleur according to the twelfth aspect is configured such that the drive train further includes a spur gear that is fixedly attached to the motor shaft of the motor.

In accordance with a sixteenth aspect of the present invention, the motorized derailleur according to the twelfth aspect is configured such that the first and second rotational axes are parallel to each other.

In accordance with a seventeenth aspect of the present invention, a bicycle derailleur motor gear unit is configured to reduce motor speed of a motor and transmit motor torque of the motor to a derailleur. The bicycle derailleur motor gear unit includes an output shaft, a fixed sun gear, an output sun gear, a plurality of planet gears, and a carrier. The output sun gear is rotatable relative to the fixed sun gear. The output sun gear is fixedly coupled to the output shaft. The carrier rotatably and revolvably supports the planet gears. Each of the planet gears has a first gear that engages with the fixed sun gear and a second gear that engages with the output sun gear. The first gear and the second gear are coaxially coupled to each other. The fixed sun gear, the output sun gear, the first gear, and the second gear have tooth counts, respectively, such that the fixed sun gear, the output sun gear, the first gear, and the second gear lock while an external force is exerted to the output sun gear.

In accordance with a eighteenth aspect of the present invention, a bicycle derailleur motor gear unit is configured to reduce motor speed of a motor and transmit motor torque of the motor to a derailleur. The bicycle derailleur motor gear unit includes an output shaft, a fixed external sun gear, an output external sun gear, a plurality of planet gears, and a carrier. The output external sun gear is rotatable relative to the fixed external sun gear. The output external sun gear is fixedly coupled to the output shaft. The output external sun gear has external gear teeth. The carrier rotatably and revolvably supports the planet gears. Each of the planet gears has a first gear that engages with the fixed external sun gear and a second gear that engages with the output external sun gear. The first gear and the second gear are coaxially coupled to each other. The fixed external sun gear, the output external sun gear, the first gear, and the second gear have tooth counts, respectively, such that the tooth counts satisfy the following formulas:

$$(\eta ab*Za/Zb+1)/(Ze/(\eta de*Zd)+1) \leq 1 \text{ when } Zb*Ze < Za*Zd; \text{ and}$$

$$(\eta de*Ze/Zd+1)/(Za/(\eta ab*Zb)+1) \leq 1 \text{ when } Zb*Ze > Za*Zd,$$

where Za represents the tooth count of the fixed external sun gear, Ze represents the tooth count of the output external sun gear, Zb represents the tooth count of the first gear, Zd represents the tooth count of the second gear, $\eta ab$ represents a transmission coefficient between the fixed external sun gear and the first gear, and $\eta de$ represents a transmission coefficient between the output external sun gear and the second gear.

In accordance with a nineteenth aspect of the present invention, a bicycle derailleur motor gear unit is configured to reduce motor speed of a motor and transmit motor torque of the motor to a derailleur. The bicycle derailleur motor gear unit includes an output shaft, a fixed internal sun gear, an output internal sun gear, a plurality of planet gears and a carrier. The output internal sun gear is rotatable relative to the fixed internal sun gear. The output internal sun gear is fixedly coupled to the output shaft. The output internal sun gear has internal gear teeth. The carrier rotatably and revolvably supports the planet gears. Each of the planet gears has a first gear that engages with the fixed internal sun gear and a second gear that engages with the output internal sun gear. The first gear and the second gear are coaxially coupled to each other. The fixed internal sun gear, the output internal sun gear, the first gear, and the second gear have tooth counts, respectively, such that the tooth counts satisfy the following formulas:

$$(\eta bc*Zc/Zb-1)/\{Zf/(\eta df*Zd)-1\} \leq 1 \text{ when } Zc*Zd > Zb*Zf; \text{ and}$$

$$(\eta df*Zf/Zd-1)/(\eta bc*Zc/Zb-1) \leq 1 \text{ when } Zc*Zd < Zb*Zf,$$

where Zc represents the tooth count of the fixed internal sun gear, Zf represents the tooth count of the output internal sun gear, Zb represents the tooth count of the first gear, Zd represents the tooth count of the second gear, $\eta bc$ represents a transmission coefficient between the fixed internal sun gear and the first gear, and $\eta df$ represents a transmission coefficient between the output internal sun gear and the second gear.

In accordance with a twentieth aspect of the present invention, the bicycle derailleur motor gear unit according to the seventeenth aspect further includes a gear reduction mechanism configured to be disposed between the motor and a planetary gear mechanism including the fixed sun gear, the output sun gear, the planet gears and the carrier. The gear reduction mechanism is configured to transmit the motor torque of the motor to the planetary gear mechanism.

In accordance with a twenty-first aspect of the present invention, the bicycle derailleur motor gear unit according to the seventeenth aspect further includes a gear train with at least one spur gear configured to be disposed between a motor pinion of the motor and a planetary gear mechanism including the fixed sun gear, the output sun gear, the planet gears and the carrier. The gear train is configured to transmit the motor torque of the motor to the planetary gear mechanism.

In accordance with a twenty-second aspect of the present invention, the bicycle derailleur motor gear unit according to the seventeenth aspect is configured such that at least one of the planet gears has a guard that is axially disposed between the first gear and the second gear. The first gear, the second gear and the guard are a one-piece member.

In accordance with a twenty-third aspect of the present invention, the bicycle derailleur motor gear unit according to the seventeenth aspect is configured such that the output shaft is coaxially arranged relative to a rotational axis of the output sun gear. The second gears of the planet gears engage with the output sun gear. Rotational output of the output shaft is transmitted externally.

In accordance with a twenty-fourth aspect of the present invention, the bicycle derailleur motor gear unit according to the eighteenth aspect further includes a gear reduction mechanism configured to be disposed between the motor and a planetary gear mechanism including the fixed external sun gear, the output external sun gear, the planet gears and the carrier. The gear reduction mechanism is configured to transmit the motor torque of the motor to the planetary gear mechanism.

In accordance with a twenty-fifth aspect of the present invention, the bicycle derailleur motor gear unit according to the eighteenth aspect further includes a gear train with at least one spur gear configured to be disposed between a motor pinion of the motor and a planetary gear mechanism including the fixed external sun gear, the output external sun gear, the planet gears and the carrier. The gear train is configured to transmit the motor torque of the motor to the planetary gear mechanism.

In accordance with a twenty-sixth of the present invention, the bicycle derailleur motor gear unit according to eighteenth aspect is configured such that at least one of the planet gears has a guard that is axially disposed between the first gear and the second gear. The first gear, the second gear and the guard are a one-piece member.

In accordance with a twenty-seventh aspect of the present invention, the bicycle derailleur motor gear unit according to the eighteenth aspect is configured such that the output shaft is coaxially arranged relative to a rotational axis of the output external sun gear. The second gears of the planet gears engage with the output external sun gear. Rotational output of the output shaft is transmitted externally.

In accordance with a twenty-eighth aspect of the present invention, the bicycle derailleur motor gear unit according to the eighteenth aspect is configured such that the transmission coefficient between the fixed internal sun gear and the first gear and the transmission coefficient between the output internal sun gear and the second gear have a value of 0.9.

In accordance with a twenty-ninth aspect of the present invention, the bicycle derailleur motor gear unit according to the nineteenth aspect further includes a gear reduction mechanism configured to be disposed between the motor and a planetary gear mechanism including the fixed internal sun gear, the output internal sun gear, the planet gears and the carrier. The gear reduction mechanism is configured to transmit the motor torque of the motor to the planetary gear mechanism.

In accordance with a thirtieth aspect of the present invention, the bicycle derailleur motor gear unit according to the nineteenth aspect further includes a gear train with at least one spur gear configured to be disposed between a motor pinion of the motor and a planetary gear mechanism including the fixed internal sun gear, the output internal sun gear, the planet gears and the carrier. The gear train is configured to transmit the motor torque of the motor to the planetary gear mechanism.

In accordance with a thirty-first aspect of the present invention, the bicycle derailleur motor gear unit according to the nineteenth aspect is configured such that at least one of the planet gears has a guard that is axially disposed between the first gear and the second gear. The first gear, the second gear and the guard are a one-piece member.

In accordance with a thirty-second aspect of the present invention, the bicycle derailleur motor gear unit according to the nineteenth aspect is configured such that the output shaft is coaxially arranged relative to a rotational axis of the output internal sun gear. The second gears of the planet gears engage with the output internal sun gear. Rotational output of the output shaft is transmitted externally.

In accordance with a thirty-third aspect of the present invention, the bicycle derailleur motor gear unit according to the nineteenth aspect is configured such that the transmission coefficient between the fixed internal sun gear and the first gear and the transmission coefficient between the output internal sun gear and the second gear have a value of 0.9.

With the bicycle derailleur motor gear unit, the relationship between the tooth counts of the gears is set such that the planet gear does not rotate or revolve even when an external force is exerted to the output sun gear. Therefore, it is possible to obtain the bicycle derailleur motor gear unit with a self-lock function in response to the external force.

Other objects, features, aspects and advantages of the present disclosure will become apparent to those skilled in the art from the following detailed description, which, taken in conjunction with the annexed drawings, discloses selected embodiments of the electric derailleur motor unit.

BRIEF DESCRIPTION OF THE DRAWINGS

Referring now to the attached drawings which form a part of this original disclosure:

FIG. 4A is a perspective view of the drive device;

FIG. 4B is a perspective view of a planetary gear reduction mechanism of the drive device;

FIG. 4C is an enlarged, perspective view of the planetary gear reduction mechanism;

FIG. 6 is a block diagram illustrating an electric configuration of the drive device;

FIG. 7 is a table illustrating specifications of gears of the planetary gear reduction mechanism;

FIG. 13A is a skeleton diagram of a planetary gear reduction mechanism in accordance with a modification example of the first embodiment;

FIG. 13B is a skeleton diagram of a planetary gear reduction mechanism in accordance with a modification example of the first embodiment;

FIG. 13C is a skeleton diagram of a planetary gear reduction mechanism in accordance with a modification example of the first embodiment;

FIG. 20A is a skeleton diagram of a planetary gear reduction mechanism in accordance with a modification example of the second embodiment;

FIG. 20B is a skeleton diagram of a planetary gear reduction mechanism in accordance with a modification example of the second embodiment;

FIG. 20C is a skeleton diagram of a planetary gear reduction mechanism in accordance with a modification example of the second embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

A motor unit for operating a bicycle gear changing device is illustrated according to a first embodiment. The bicycle with the motor unit will be described below.

Figure 1:
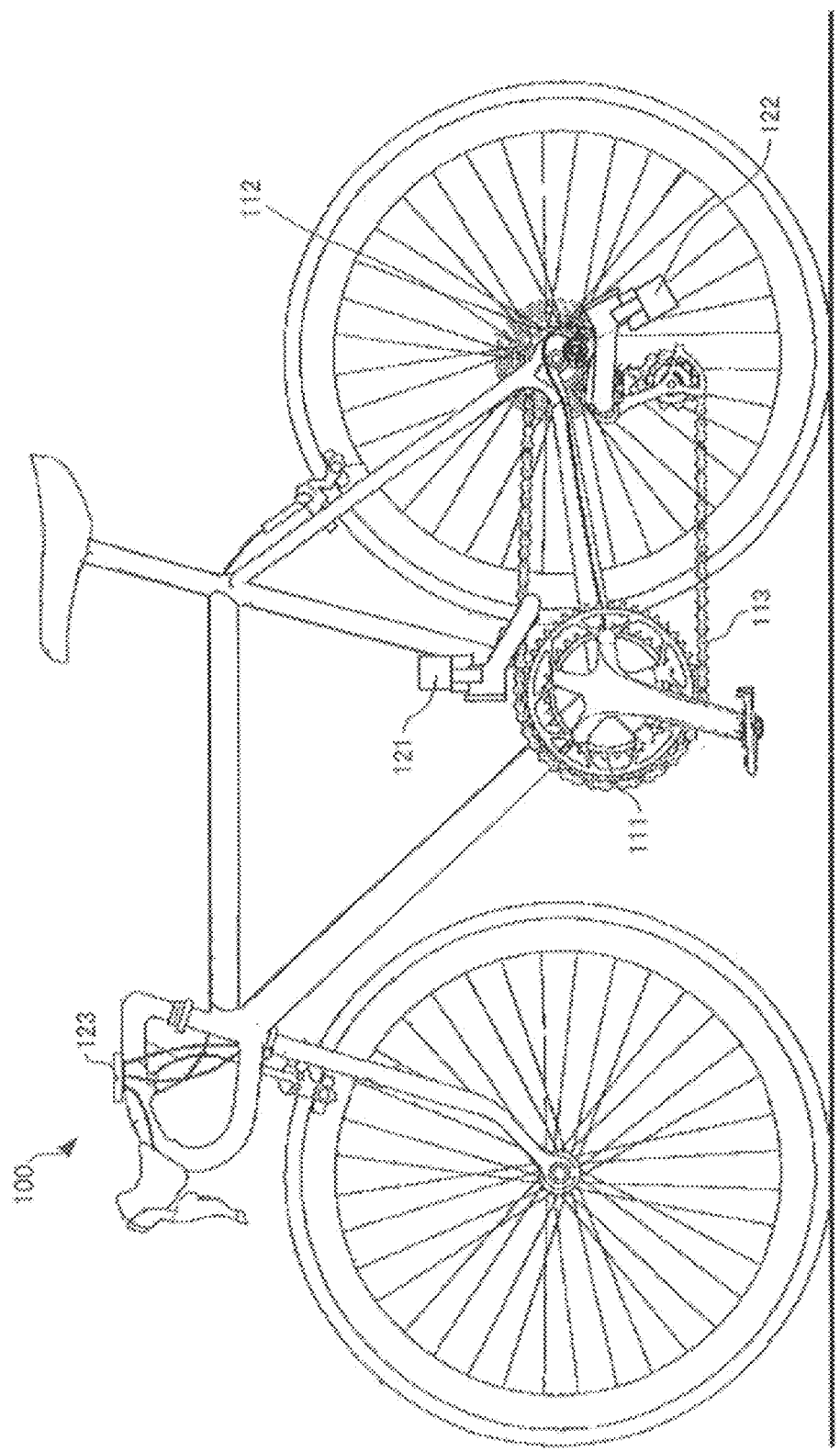
FIG. 1 is a side elevational view of a bicycle with a drive device in accordance with a first embodiment.

As shown in FIG. 1, the bicycle 100 according to the present embodiment includes a front derailleur 121 placed near a front gear changing device 111, a rear derailleur 122 placed near a rear gear changing device 112, and a shift switch 123.

The front derailleur 121 selectively engages a chain 113 with any one of a plurality of sprockets in the front gear changing device 111. The rear derailleur 122 selectively engages the chain 113 with any one of a plurality of sprockets in the rear gear changing device 112. To carry out a shift operation, the shift switch 123 sends a shift signal in accordance with the operation thereof to the gear changing device which is equipped with the front derailleur 121 and the rear derailleur 122, and the like.

Figure 2C:
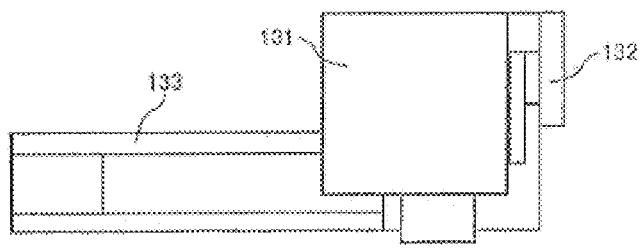
FIG. 2C is a top plan view of the derailleur illustrated in FIG. 2A.
Figure 2A:
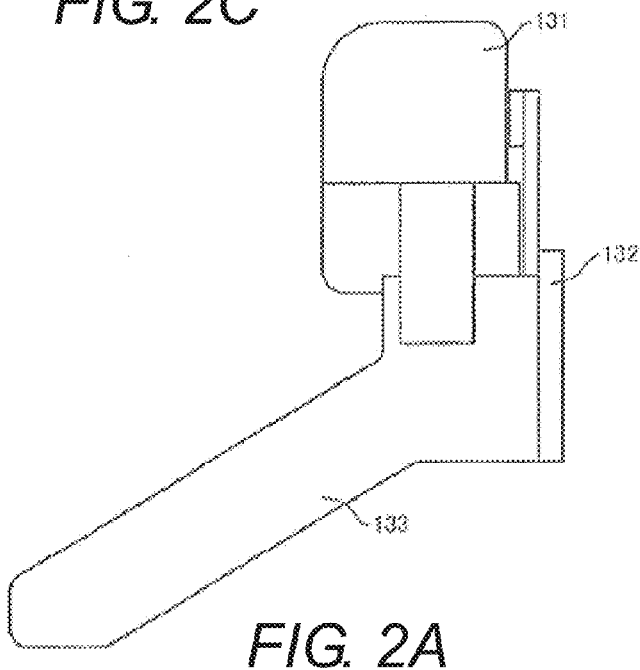
FIG. 2A is a side elevational view of a derailleur of the bicycle illustrated in FIG. 1.
Figure 2B:
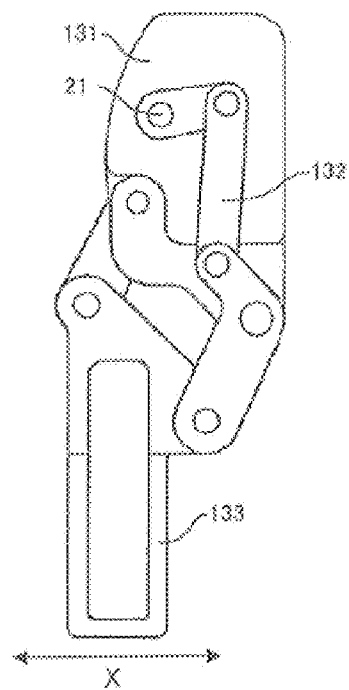
FIG. 2B is a rear elevational view of the derailleur illustrated in FIG. 2A.

The front derailleur 121 and the rear derailleur 122 include a case member 131, a link mechanism 132, and a chain guide 133, respectively, as shown in FIG. 2A through FIG. 2C.

The case member 131 houses a drive device 10 and a drive circuit 32 (described later), and as shown in FIG. 1, the case member 131 is secured to a predetermined position of the frame of the bicycle 100.

On end of the link mechanism 132 is secured to an output shaft 21 of the drive device 10, converting the rotation of the output shaft 21 into the horizontal movement of the chain guide 133 (movement in the X direction in FIG. 2B).

Figure 3:
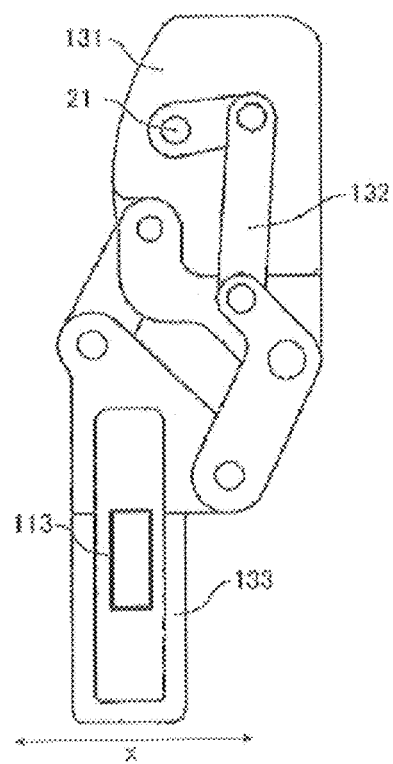
FIG. 3 is the rear elevational view of the derailleur illustrated in FIG. 2A, illustrating a chain extending through the derailleur.

The chain guide 133 is formed as a frame, and as shown in FIG. 3, the chain 113 passes therethrough. The chain guide 133 guides the chain 113 in the horizontal direction such that the chain 113 will mate with a selected one of a plurality of sprockets.

The drive device 10 includes a planetary gear reduction mechanism 20 (e.g., planetary gear mechanism) and a motor 31, and is housed in the case member 131 as shown in FIG. 4A.

As shown in FIG. 4A through FIG. 4C and FIG. 5A, the planetary gear reduction mechanism 20 includes a carrier 11 (11a, 11b, 11c), a fixed sun gear 12 (e.g., a fixed external sun gear), a plurality of planet gears 13, a drive gear 14, an output sun gear 15 (e.g., an output external sun gear), and a base 16. Furthermore, the mechanism is covered by the case member 131.

The carrier 11 includes a pair of support plates 11a and 11b, and a plurality of rotation shafts 11c, and supports the plurality of the planet gears 13. The carrier 11 can be made from metal, resin, and the like. The carrier is configured to be able to rotate. The carrier 11 rotatably and revolvably supports the planet gears 13.

The fixed sun gear 12 is placed at the center section of the carrier 11. The fixed sun gear 12 is secured to the base 16.

The planet gears 13 can be made from metal, resin, and the like. Each of the planet gears 13 has a first gear 13b that engages with the fixed sun gear 12 (e.g., the fixed external sun gear), and a second gear 13d that engages with the output sun gear 15 (e.g., the output external sun gear). The first gear 13b and the second gear 13d are coaxially and integrally coupled to each other. Six planet gears 13 are placed on an arc along which the planet gears 13 revolve. The planet gears 13 are rotatably supported by the rotation shafts 11c that are placed on the arc along which the planet gears 13 revolve. The rotation shafts 11c are supported at the top end and at the bottom end by the support plates 11a and 11b.

The drive gear 14 can be made from metal, resin, and the like. Further the drive gear 14 is formed concentrically with the fixed sun gear 12 on the base 16, and is formed so as to rotate freely. An internal gear 14b is formed on the inner surface for engaging with the first gear 13b of the planet gear 13. An outer gear 14a is formed at the perimeter on the lower end of the drive gear 14. The torque of the motor 31 is transmitted to the outer gear 14a via a pinion gear 23 and an intermediate gear 22, and thus the drive gear 14 rotates due to this torque. The first gear 13b of the planet gear 13 which is engaged with the internal gear 14b rotates as the drive gear 14 rotates. The planet gears 13 revolve around the perimeter of the fixed sun gear 12 while rotating about each of the respective rotation shafts 11c. Moreover, although the intermediate gear 22 is shown as a single gear in the drawings, the intermediate gear can be configured as a spur gear wheel train having one or a plurality of gear trains. In other words, the intermediate gear 22 can be a gear train with at least one spur gear disposed between the pinion gear 23 (e.g., the motor pinion) of the motor 31 and the planetary gear reduction mechanism 20 (e.g., the planetary gear mechanism). The gear train is configured to transmit the motor torque of the motor 31 to the planetary gear reduction mechanism 20 (e.g., the planetary gear mechanism).

The output sun gear 15 can be made from metal, resin, and the like and is coaxially formed relative to the fixed sun gear 12 so as to rotate relatively to the fixed sun gear 12. The output sun gear 15 engages with the second gear 13d of the planet gear 13 and rotates as the planet gear 13 rotates. The output shaft 21 is coaxially secured to the output sun gear 15. In other words, the output sun gear 15 (e.g., the output external sun gear) is rotatable relative to the fixed sun gear 12 (e.g., the fixed external sun gear), and the output sun gear 15 (e.g., the output external sun gear) is fixedly coupled to the output shaft 21. The output sun gear 15 (e.g., the output external sun gear) has external gear teeth. Furthermore, the output shaft 21 is coaxially arranged relative to a rotational axis of the output sun gear 15 (e.g., the output external sun gear). The second gears of the planet gears engage with the output sun gear 15 (e.g., the output external sun gear). Then, rotational output of the output shaft 21 is transmitted externally.

The base 16 supports the entire planetary gear reduction mechanism 20.

The output shaft 21 extends from one surface of the output sun gear 15, protrudes from the case member 131, and couples with one end of the link mechanism 132. Additionally, the output shaft 21 extends from the other end of the output sun gear 15 through an opening formed at the center section of the fixed sun gear 12, and passes through the base 16. The output shaft 21 is supported by a sliding bearing 201 placed on the base 16, and a sliding bearing 202 placed in the case member 131. The sliding bearings 201, 202 can be for example, oil-impregnated sintered bearings.

Figure 5A:
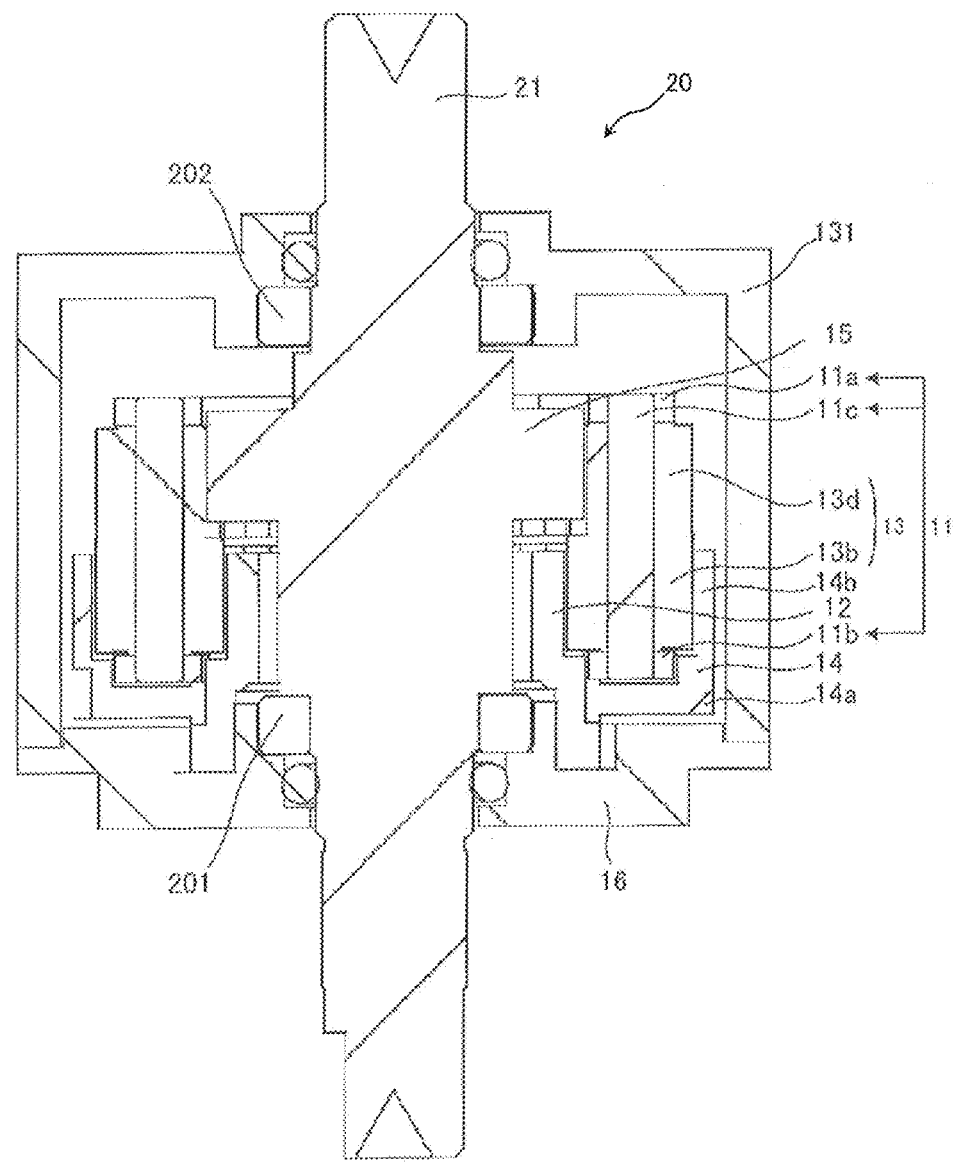
FIG. 5A is a cross sectional view of the planetary gear reduction mechanism taken along v-v line in FIG. 4A.
Figure 5B:
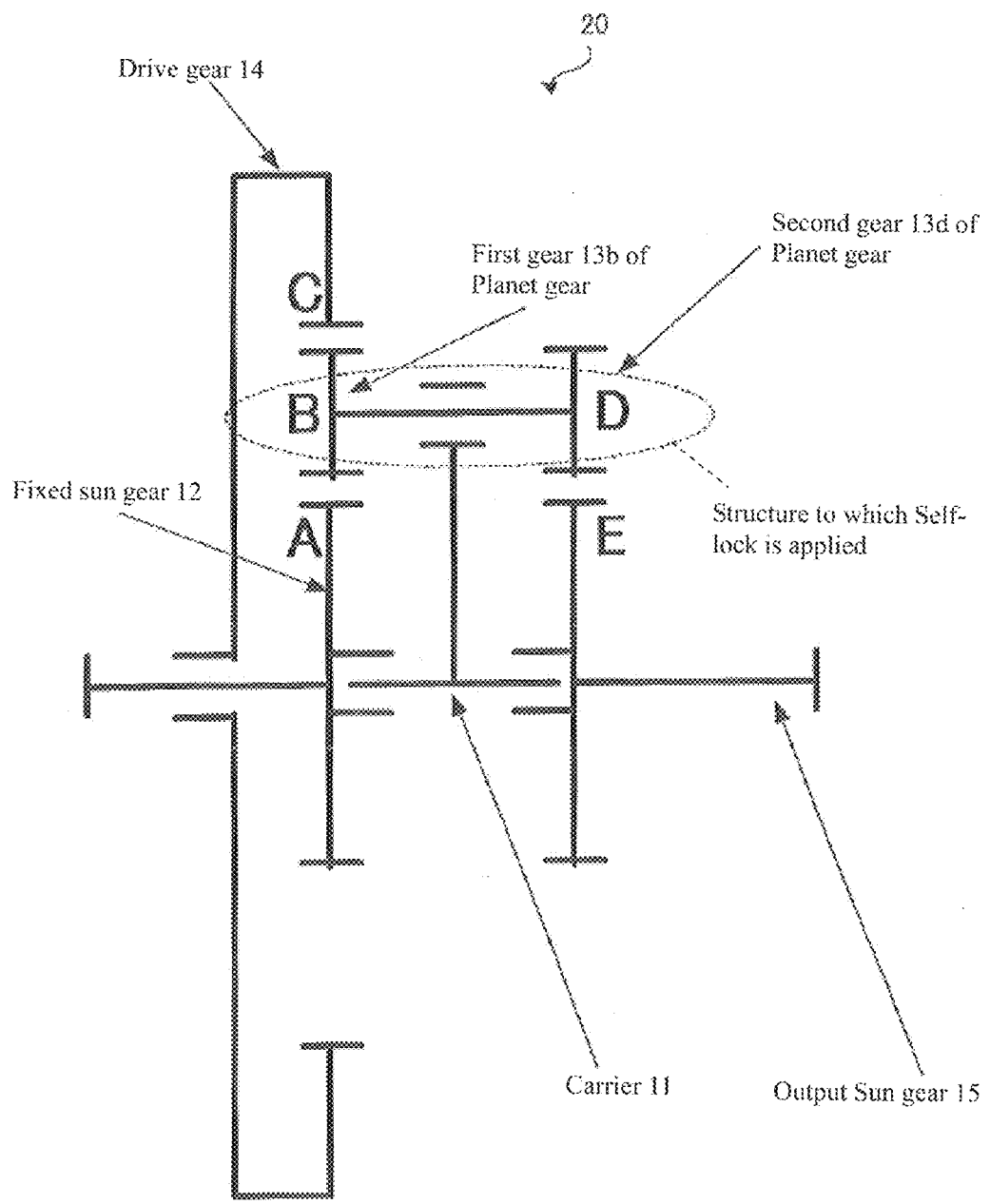
FIG. 5B is a skeleton diagram of the planetary gear reduction mechanism illustrated in FIG. 5A.

FIG. 5B is a skeleton view of the drive device 10 having the above mentioned configuration. In FIG. 5B, the fixed sun gear 12 is represented by A, the first gear 13b in the planet gear 13 is represented by B, the internal gear 14b of the drive gear 14 is represented by C, the second gear 13d of the planet gear 13 is represented by D, and the output sun gear 15 is represented by E.

As the external gear 14a of the drive gear 14 rotates due to the drive force transmitted from the motor 31, the planetary gear reduction mechanism 20 having the above described configuration is configured such that the first gear 13b in the planet gear 13 which is engaged with the fixed sun gear 12 and the internal gear 14b revolves and rotates. As the first gear 13b revolves and rotates, the second gear 13d coaxially fixed to the first gear 13b also revolves and rotates. The output sun gear 15 is engaged with the second gear 13d and thus rotates due to the revolution and rotating of the second gear 13d. The output shaft 21 then rotates as the output sun gear 15 rotates.

The reduction gear ratio RGR of the planetary gear reduction mechanism 20 in this case can be represented by formula (1) below, where Za represents the number of teeth (e.g., tooth count) of the fixed sun gear 12 (e.g., fixed external sun gear), Zb represents the number of teeth (e.g., tooth count) of the first gear 13b of the planet gear 13, Zc represents the number of teeth (e.g., tooth count) of the internal gear 14b of the drive gear 14, Zd represents the number of teeth (e.g., tooth count) of the second gear 13d of the planet gear 13, and Ze represents the number of teeth of the output sun gear 15 (e.g., the output external sun gear).

$$RGR=Zb*Ze*(Za+Zc)/(Zc*(Zb*Ze-Za*Zd)) \quad (1)$$

The drive circuit 32 which is housed in the case member 131, receives a shift signal from the shift switch 123 which is placed on the handlebar of the bicycle, as shown in FIG. 6. The drive circuit 32 calculates rotational amount of the motor 31 in response to the instruction, and controls the motor 31 to rotate by the calculated rotational amount. The rotation of the motor 31 is transmitted to the link mechanism 132 via the pinion gear 23, the intermediate gear 22, and the planetary gear reduction mechanism 20 which causes the chain guide 133 to move, to thus guide the chain 113 to the intended sprocket. In the illustrated embodiment, the planetary gear reduction mechanism 20 (e.g., the planetary gear mechanism), the output shaft 21, the intermediate gear 22 basically form a bicycle derailleur motor gear unit configured to reduce the motor speed of the motor 31 and transmit the motor torque of the motor 31 to the front derailleur 121 or the rear derailleur 122 (e.g., derailleur).

In the above mentioned configuration, when stress is added to the chain guide 133 from the chain 113, a torque is applied to the output shaft 21 of the drive device 10 by way of the link mechanism 132. It is necessary for the drive device to act against this force to maintain the position of the chain guide 133.

At that point, even if there is some stress from the chain 113, such that the planetary gear reduction mechanism 20 does not act against this stress and does not rotate (referred to below as "self-lock"), each gear that makes up the planetary gear reduction mechanism 20 is made an involute gear. Furthermore, the fixed sun gear 12 (e.g., the fixed external sun gear), the output sun gear 15 (e.g., the output external sun gear), the first gear 13b, and the second gear 13d have the tooth counts, respectively, such that the tooth counts satisfy the following formulas.

When Zb*Ze<Za*Zd:

$$\{(\eta ab*Za/Zb)+1\}/[\{(Ze/(\eta de*Zd)\}+1] \leq 1 \quad (2)$$

When Zb*Ze>Za*Zd:

$$\{(\eta de*Ze/Zd)+1\}/[\{Za/(\eta ab*Zb)\}+1] \leq 1 \quad (3)$$

Here, ηab represents the transmission efficiency between the fixed sun gear 12 (e.g., the fixed external sun gear) and the first gear 13b of the planet gear 13, and ηde represents the transmission efficiency between the second gear 13d of the planet gear 13 and the output sun gear 15 (e.g., the output external sun gear). The rotating shaft for the planet gear in the planetary gear reduction mechanism 20 is a sliding bearing, and both transmission efficiencies ηab and ηde have values of approximately 0.9 (0.85-0.95), or more preferably a value of 0.9.

The planetary gear reduction mechanism 20 is configured with gear settings that satisfy the formula (2) or the formula (3). Therefore, the rotation of the motor 31 responsive to the operation of the shift switch 123 is transmitted from the output shaft 21 to the chain guide 133 to perform a shift change. However, when the force from the chain 113 is added to the chain guide 133, the planetary gear reduction mechanism 20 stops rotating (self-lock), and takes the stress. Consequently, the chain guide 133 is retained at its original position, and an unintended shift change does not occur. In other words, in the illustrated embodiment, the fixed sun gear 12, the output sun gear 15, the first gear 13b, and the second gear 13d have the tooth counts, respectively, such that the fixed sun gear 12, the output sun gear 15, the first gear 13b, and the second gear 13d lock while an external force is exerted to the output sun gear 15 from the output shaft 21.

Accordingly, it is possible to provide a function whereby the planetary gear reduction mechanism 20 to act against the counterforce from the chain and to maintain the positions of the chain with a simple configuration and without even using a special supplementary configuration.

Next, a detailed description will be given regarding setting the number of gear teeth to satisfy the formulas (2), (3) to thereby add a self-lock function to the planetary gear reduction mechanism 20.

First, the specification of the two sets of sun gear and the planet gear (the fixed sun gear 12 and the first gear 13b of the planet gear 13, and the output sun gear 15 and the second gear 13d of the planet gear 13) are set as shown in FIG. 7.

In FIG. 7, a module indicates the size of a tooth for the gear, mab represents the module for the fixed sun gear 12 and the first gear 13b of the planet gear 13, while mde represents the module for the output sun gear 15 and the second gear 13d of the planet gear 13. The inter-shaft distance represents the distance between the rotational axes for two gears that are engaged. L represents the inter-shaft distance for the fixed sun gear 12 and the first gear 13b of the planet gear 13, as well as the inter-shaft distance for the output sun gear 15 and the second gear 13d of the planet gear 13 which are equal.

The number of teeth represents the number of teeth on each gear. Za represents the number of teeth on the fixed sun gear 12, Zb represents the number of teeth on the first gear 13b of the planet gear 13, Zd represents the number of teeth on the second gear 13d of the planet gear 13, and Ze represents the number of teeth on the output sun gear 15.

Figure 8A:
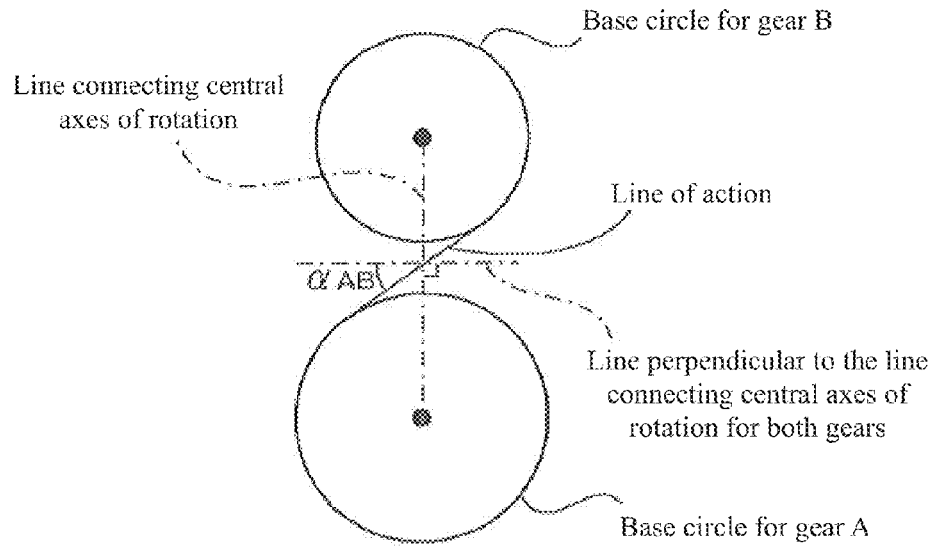
FIG. 8A is a schematic diagram illustrating a relationship between a sun gear and a planet gear.

The engagement pressure angle α represents the inclination of the gears that are engaged. More specifically, the engagement pressure angle α is the angle α between the line of action for the pair of engaged gears, connecting the base circle of the driving gear and the base circle of the driven gear, and the normal to the line that connects the rotational axes of both gears, as shown in FIG. 8A. Here, αab represents the engagement pressure angle during engagement of the fixed sun gear 12 and the first gear 13b of the planet gear 13, and αde represents the engagement pressure angle during engagement of the second gear 13d of the planet gear 13 and the output sun gear 15.

A commonly known method for describing the balance of forces during gear transmission of a pair of engaged gears for a given transmission efficiency η uses a theoretical line of action connecting the circle resulting from multiplying the radius of the base circle of the driven gear by the transmission efficiency η, and the base circle of the driving gear.

Figure 8B:
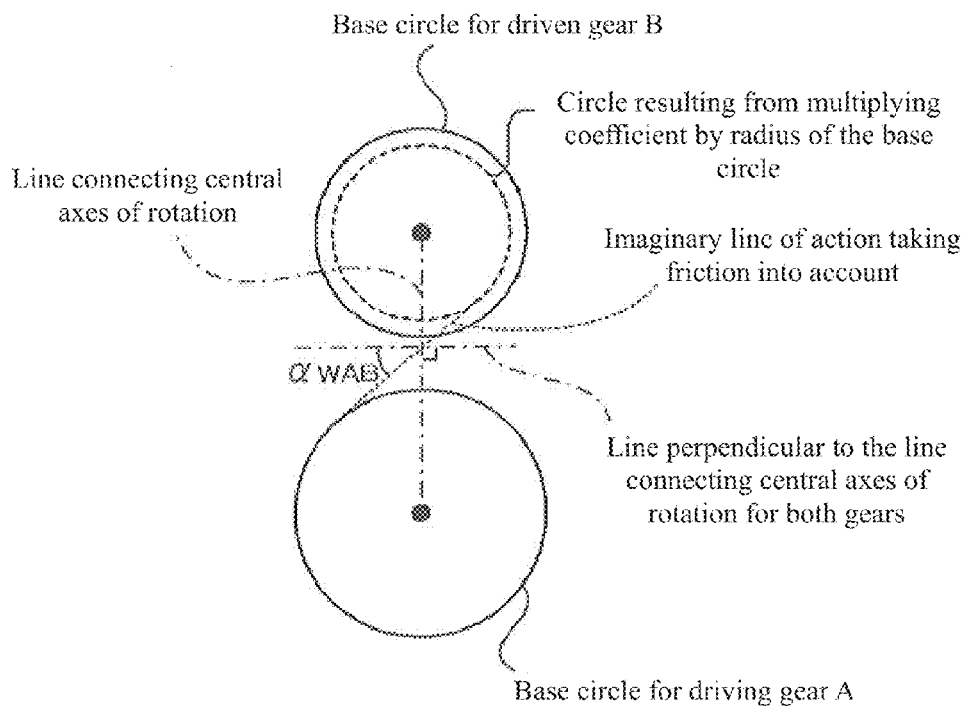
FIG. 8B is a schematic diagram illustrating a relationship between a sun gear and a planet gear.

The engagement pressure angle αw of the theoretical line of action represents a pressure angle that takes into account the effects of friction due to slippage of the contact surfaces of the engaged gears. More specifically, as shown in FIG. 8B, the engagement pressure angle αw of the theoretical line of action is the angle α between the line of action for the pair of engaged gears which connects the base circle of the driving gear and the base circle of the driven gear, and the normal to the line that connects the rotational axes of both the gears. Here, αwab represents the engagement pressure angle of the theoretical line of action during engagement of the fixed sun gear 12 and the first gear 13b of the planet gear 13, and αwde represents the engagement pressure angle of the theoretical line of action during engagement of the second gear 13d of the planet gear 13 and the output sun gear 15.

The transmission efficiency η represents the transmission efficiency of two engaged gears. Here, ηab represents the transmission efficiency during engagement of the fixed sun gear 12 and the first gear 13b of the planet gear 13, and ηde represents the transmission efficiency during engagement of the second gear 13d of the planet gear 13 and the output sun gear 15.

Here, base circle radius rb represents the radius of the circle (base circle) used to sketch the involute curve as a waveform, rba represents the base circle radius for the fixed sun gear 12, rbb represents the base circle radius for the first gear 13b of the planet gear 13, rbd represents the base circle radius of the second gear 13d of the planet gear 13, and rbe represents the base circle radius for the output sun gear 15.

Additionally the direction of rotary movement differs in the planetary gear reduction mechanism 20 according to the combinations of gear teeth for the gears. Therefore, it is necessary to have separate cases for the conditions for the self-lock of the mechanism according to the direction of movement.

Therefore, for each movement direction, the rotational direction for each gear and the line of action to the planet gear will be described.

First, the number of rotations for the respective elements when the output shaft 21 has made one rotation is as follows.
Output sun gear: 1
Fixed sun gear: 0
Planet gear rotate: (Zb*Ze+Za*Ze)/(Zb*Ze−Za*Zd)
Planet gear revolution: Zb*Ze/(Zb*Ze−Za*Zd)

The sign for each calculated value represents the rotational direction. A positive value indicates the same rotational direction as the output shaft 21, and a negative value indicates a reverse rotational direction. Accordingly, the rotational direction and the revolution direction for the planet gear 13 is defined by the size relationship between Zb*Ze and Za*Zd.

Figure 9:
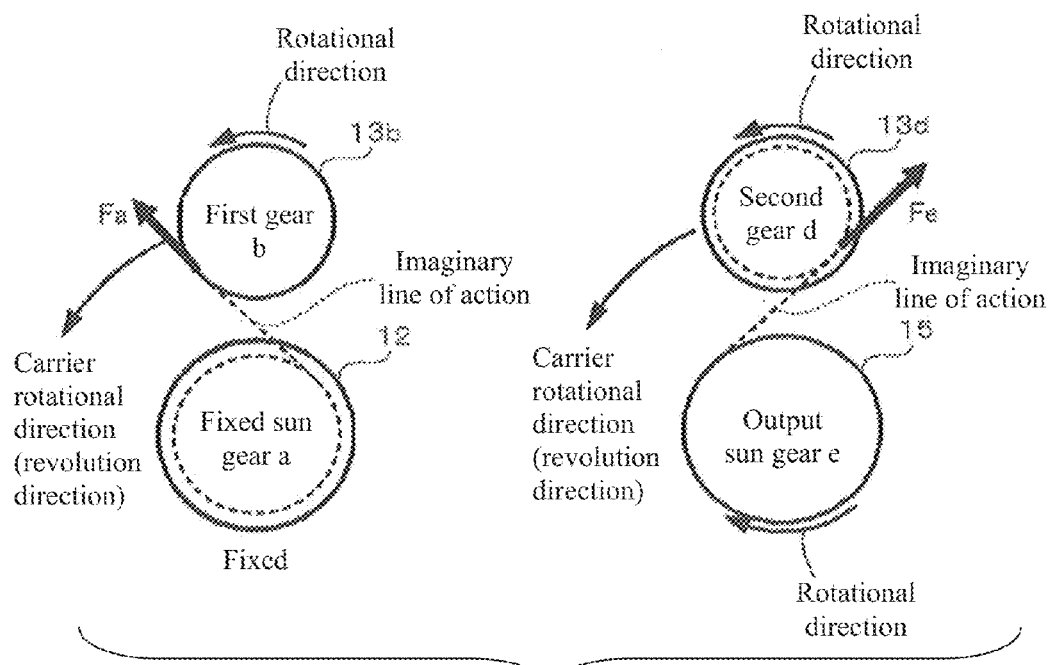
FIG. 9 is a schematic diagram illustrating rotational directions and directions of force when $Zb*Ze<Za*Zd$.

When the combination of the gear teeth of the gears is Zb*Ze<Za*Zd, the movement direction and the line of action for each constituent element is as shown in FIG. 9.

Figure 10:
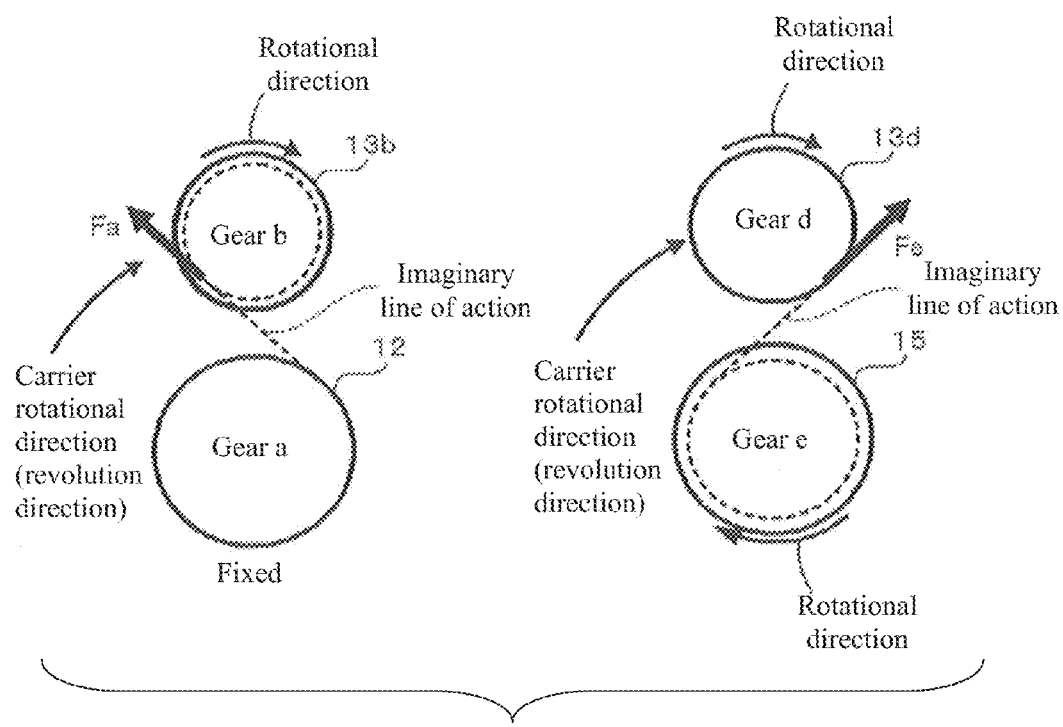
FIG. 10 is a schematic diagram illustrating rotational directions and directions of force when $Zb*Ze>Za*Zd$.

However, when the combination of the gear teeth of the gears is $Zb*Ze>Za*Zd$, the movement direction and the line of action for each constituent element is as shown in FIG. 10.

FIG. 9 and FIG. 10 illustrate an external clockwise force being applied to the output shaft 21, and the thin arrow represents the assumed movement direction of the rotation of the gears due to that force. Additionally, Fa which is the line of action from the fixed sun gear 12 to the planet gear 13, Fe which is the line of action from the output sun gear 15 to the planet gear 13 are represented by the thick arrows. Furthermore, the solid line circle represents a base circle, the dotted line circle represents a theoretical base circle, and the dotted line connecting the base circle and the theoretical base circle represents the theoretical line of action that takes into account the transmission efficiency.

As shown in the drawings, when $Zb*Ze>Za*Zd$, the rotational direction of the planet gear 13 and the carrier 11 is the reverse of when $Zb*Ze<Za*Zd$. Thus, the first gear 13b and the fixed sun gear 12, as well as the second gear 13d and the output sun gear 15 are in a regression drive relationship, the fixed sun gear 12 and the second gear 13d are driving while the first gear 13b and the output sun gear 15 are being driven, and the theoretical line of action differs from the case where $Zb*Ze<Za*Zd$.

Next is a discussion of the balance of forces in the planet gear 13 when the self-lock is applied. When the self-lock is applied, each planet gear 13 does not rotate or revolve. Therefore, first, the condition where the planet gear 13 does not rotate will be considered. The elements that cause the planet gear 13 to rotate disappear when the moment generated by the reverse force Fa from the fixed sun gear 12 to the planet gear 13, and the pressure Fe from the output sun gear 15 to the planet gear 13 is in balance with the rotating shaft of the planet gear 13 as the center.

Therefore, in order for the self-lock to be created, formulas (4) and (5) must be true.

When $Zb*Ze<Za*Zd$:

$$Fa*rbb=Fe*rbd*\eta de$$

$$Fa/Fe=rbd*\eta de/rbb \quad (4)$$

When $Zb*Ze>Za*Zd$:

$$Fa*rbb*\eta ab=Fe*rbd$$

$$Fa/Fe=rbd(rbb*\eta ab) \quad (5)$$

Figure 11:
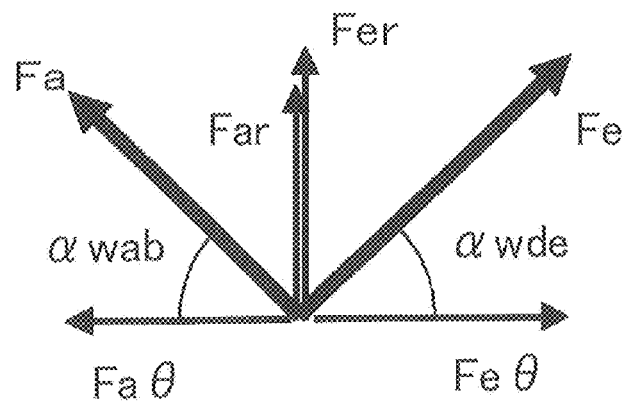
FIG. 11 is a schematic diagram illustrating a force applied to a planet gear and distributions of the force.

Next, the condition where planet gear 13 does not revolve will be examined. As shown in FIG. 11, the reverse force Fa added from the fixed sun gear 12 to the planet gear 13 can be broken down into the radial direction component Far of the fixed sun gear 12, and the rotational direction component Faθ of the carrier 11. In addition, the pressure Fe added by the output sun gear 15 to the planet gear 13 can be broken down into the radial direction component Fer for the output sun gear 15, and the rotational direction component Feθ for the carrier 11.

Among these force components, the component Far for the radial direction of the fixed sun gear 12, and the component Fer for the radial direction of the output sun gear 15 receive the reverse force from the rotation shaft 11c of the carrier 11 and acquire balance.

Consequently, the planet gear 13 will not revolve if the net force of the force components Faθ and Feθ are zero, or if the orientation of the net force is the reverse of the rotational direction of the carrier 11 which is defined by the combination of the number of gear teeth on the gear. The conditions where the net force of the force components Faθ and Feθ is zero, or the rotational direction of the carrier 11 is reversed will be examined.

In other words, when $Zb*Ze<Za*Zd$, if the formula (6) is true, then the planet gear 13 will no longer revolve.

$$Fa\theta \le Fe\theta \quad (6)$$

When $Zb*Ze>Za*Zd$, if the formula (7) is true, then the planet gear 13 will no longer revolve.

$$Fa\theta \ge Fe\theta \quad (7)$$

The situations where these conditions are true will be examined.

First, the force components Faθ and Feθ are represented by the formulas (8) and (9).

$$Fa\theta=Fa*\cos(\alpha wab) \quad (8)$$

$$Fe\theta=Fe*\cos(\alpha wde) \quad (9)$$

Substituting the formulas (8) and (9) formula into the formula (6) and changing its form yields the formula (6').

$$Fa\theta \le Fe\theta$$

$$Fa*\cos(\alpha wab) \le Fe*\cos(\alpha wde)$$

$$Fa*\cos(\alpha wab)/\{Fe*\cos(\alpha wde)\} \le 1 \quad (6')$$

Substituting the formulas (8) and (9) into the formula (7) and changing its form yields the formula (7').

$$Fa\theta \ge Fe\theta$$

$$Fa*\cos(\alpha wab) \ge Fe*\cos(\alpha wde)$$

$$Fe*\cos(\alpha wab)/\{Fa*\cos(\alpha wde)\} \le 1 \quad (7')$$

In addition, if this is an involute gear, then the following formulas (10) to (13) are true.

When $Zb*Ze<Za*Zd$:

$$\cos(\alpha wab)=(rbb+rba*\eta ab)/L \quad (10)$$

$$\cos(\alpha wde)=(rbe+rbd*\theta de)/L \quad (11)$$

When $Zb*Ze>Za*Zd$:

$$\cos(\alpha wab)=(rba+rbb*\eta ab)/L \quad (12)$$

$$\cos(\alpha wde)=(rbd+rbe*\eta rde)/L \quad (13)$$

Substituting the formulas (4), (5) and (10) through (13) into the formulas (6') and (7') and simplifying yields the formulas (14) and (15).

When $Zb*Ze<Za*Zd$:

$$[\{(rba*\eta ab)/rbb\}+1]/[\{rbe/(rbd*\eta de)\}+1] \le 1 \quad (14)$$

When $Zb*Ze>Za*Zd$:

$$[\{(rbe*\eta de)/rbb\}+1]/[\{rba/(rbb*\eta ab)\}+1] \le 1 \quad (15)$$

In addition, the basic gear formulas (16) through (19) are known.

$$rba=mab*Za*\cos(\alpha)/2 \quad (16)$$

$$rbb=mab*Zb*\cos(\alpha)/2 \quad (17)$$

$$rbd=mde*Zd*\cos(\alpha)/2 \quad (18)$$

$$rbe=mde*Ze*\cos(\alpha)/2 \quad (19)$$

Here, α represents the basic pressure angle for the respective gears.

Substituting the formulas (16) through (19) into the formulas (14) and (15) yields the formulas (20) and (21).

When Zb*Ze<Za*Zd:

$$[\{(\eta ab*Za)/Zb\}+1]/[\{Ze/(\eta de*Zd)\}+1] \leq 1 \qquad (20)$$

When Zb*Ze<Za*Zd:

$$[\{(\eta de*Ze)/Zd\}+1]/[\{Za/(\eta ab*Zb)\}+1] \leq 1 \qquad (21)$$

The formulas (20) and (21) are equivalent to the formulas (2) and (3).

Accordingly, setting the number of teeth Za, Zb, Zd, Ze for the fixed sun gear 12, the first gear 13b, the second gear 13d, and the output sun gear 15 to satisfy the formulas (2) and (3) thereby obtains the planetary gear reduction mechanism 20 provided with a self-lock function and the derailleur 121, 122.

Moreover, the transmission further improves if a rolling bearing such as a ball bearing and the like is used instead of a sliding bearing for the rotating shaft in the planet gear in the planetary gear reduction mechanism 20. However, the output shaft of the motor unit attached to the gear-reduction mechanism for the bicycle gear changing device usually has a diameter of about 20 mm. Furthermore, it is desired that this diameter is reduced. Accordingly, a diameter of no more than 20 mm is desired even in the planetary gear reduction mechanism 20. However it is not possible to satisfy this requirement if a rolling bearing such as a ball bearing is used. Therefore, a sliding bearing is considered the most suitable under the special circumstances wanting to reduce the size and weight of the bicycle gear changing device. In this case, the gear mesh efficiency of the fixed sun gear 12 and the planet gear 13 is 0.85 to 0.9 when combining all the losses that can occur such as the tooth surface frictional loss or the shaft frictional loss. Even if the gear efficiency were to exceed 0.9 by a several percent, if the load resistances other than in the planetary gear reduction mechanism 20 were taken into account, 0.9 is a realistic value for transmission efficiency η in the formulas (20) and (21) for the purposes of the bicycle gear changing device. Setting the transmission efficiency η to an unnecessarily large value to ensure that the self-lock will be applied leads to selecting a gear reduction mechanism with an inefficient gear combination and is not a good idea.

In this case, the formulas (20) and (21) can be represented by the formulas (22) and (23).

When Zb*Ze<Za*Zd:

$$(0.9*Za/Zb+1)/(Ze/(0.9*Zd)+1) \leq 1 \qquad (22)$$

When Zb*Ze>Za*Zd:

$$(0.9*Ze/Zd+1)/(Za/(0.9*Zb)+1) \leq 1 \qquad (23)$$

Figure 12:
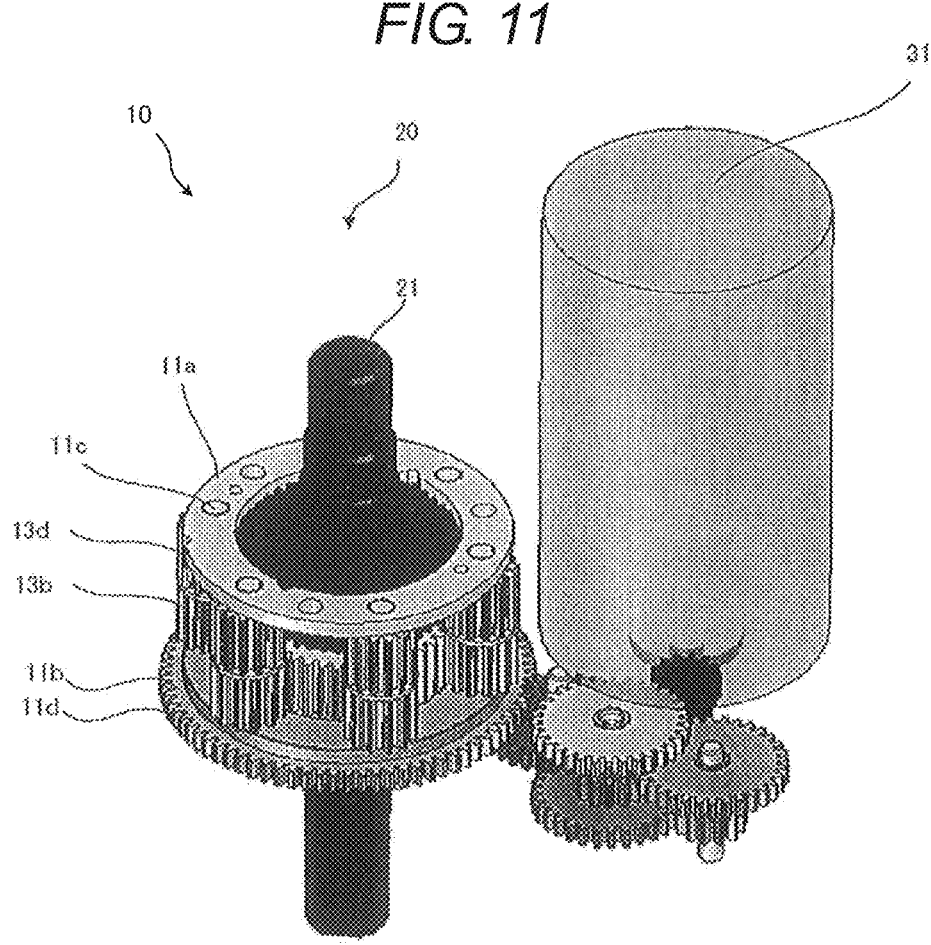
FIG. 12 is a perspective view of a planetary gear reduction mechanism in accordance with a modification example of the first embodiment.

Furthermore, in the above explanation an example was given where the outer gear 14a formed in the drive gear 14 is driven, however any gear can be suitably selected as the drive gear. For example, as shown in FIG. 12, the mechanism can be configured such that an outer gear 11d is formed in the carrier 11 (with no outer gear 14a being provided for the drive gear 14), and the outer gear 11d is driven by the motor 31.

Moreover, it is also possible to use the configuration shown in FIGS. 13A to 13C as the configuration for the planetary gear reduction mechanism 20.

FIG. 13A is a configuration where the there is no internal gear 14b disposed in the drive gear 14.

FIG. 13B is a configuration where there is no internal gear 14b disposed in the drive gear 14, instead, an internal gear is disposed for meshing with the second gear 13d.

FIG. 13C is a configuration where in addition to the internal gear 14b disposed in the drive gear 14, an internal gear is disposed for meshing with the second gear 13d.

Second Embodiment

The configuration of the planetary gear reduction mechanism according to the present invention is not limited to the above embodiment, and various modifications and applications are possible. For example, in the above-mentioned embodiment, the fixed sun gear 12 (e.g., the fixed external sun gear) and the output sun gear 15 (e.g., the output external sun gear) includes external gears. However, the fixed sun gear and the output sun gear can include internal gears.

Figure 14A:
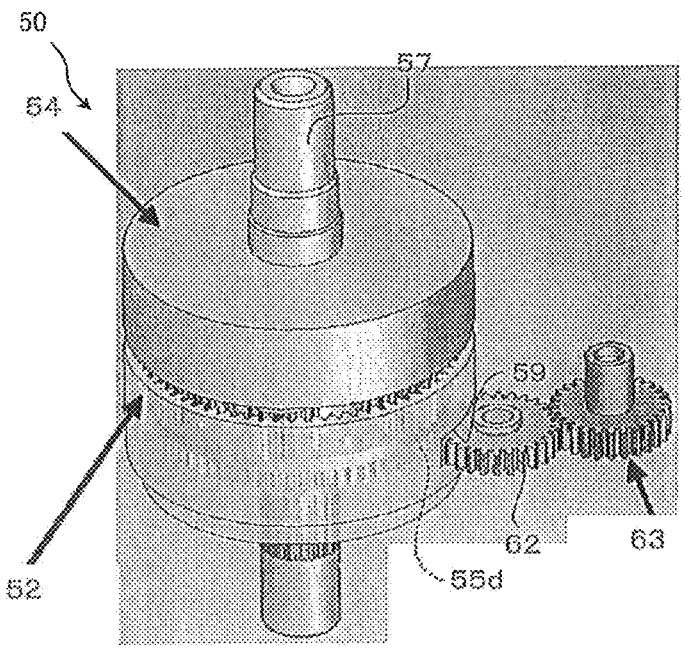
FIG. 14A is a perspective view of a planetary gear reduction mechanism in accordance with a second embodiment.
Figure 14B:
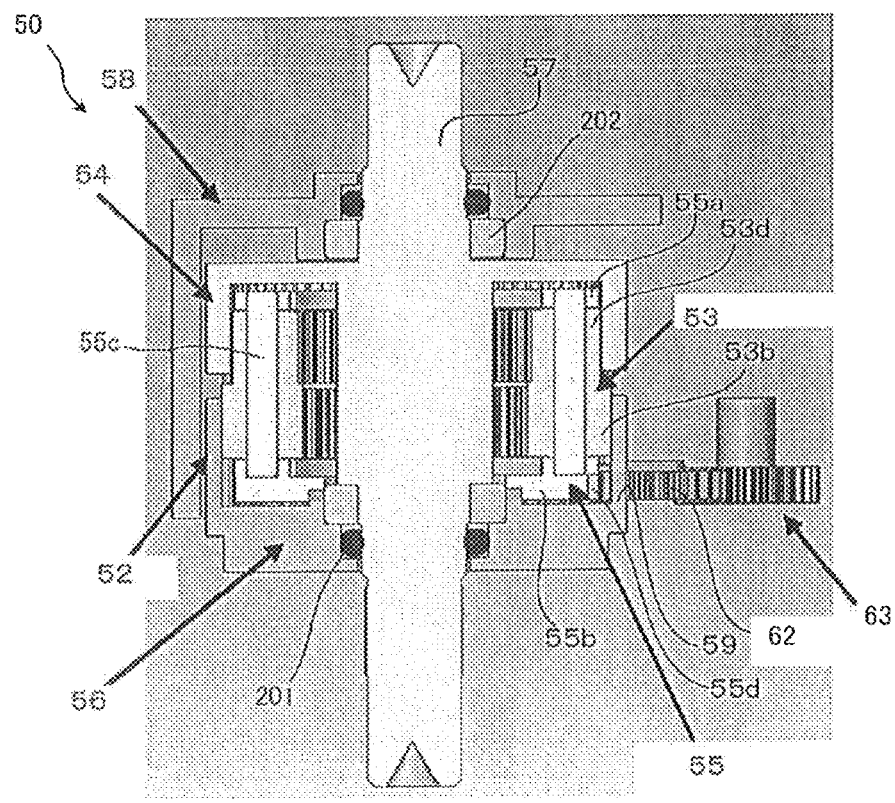
FIG. 14B is a cross sectional view of the planetary gear reduction mechanism in accordance with the second embodiment.
Figure 15:
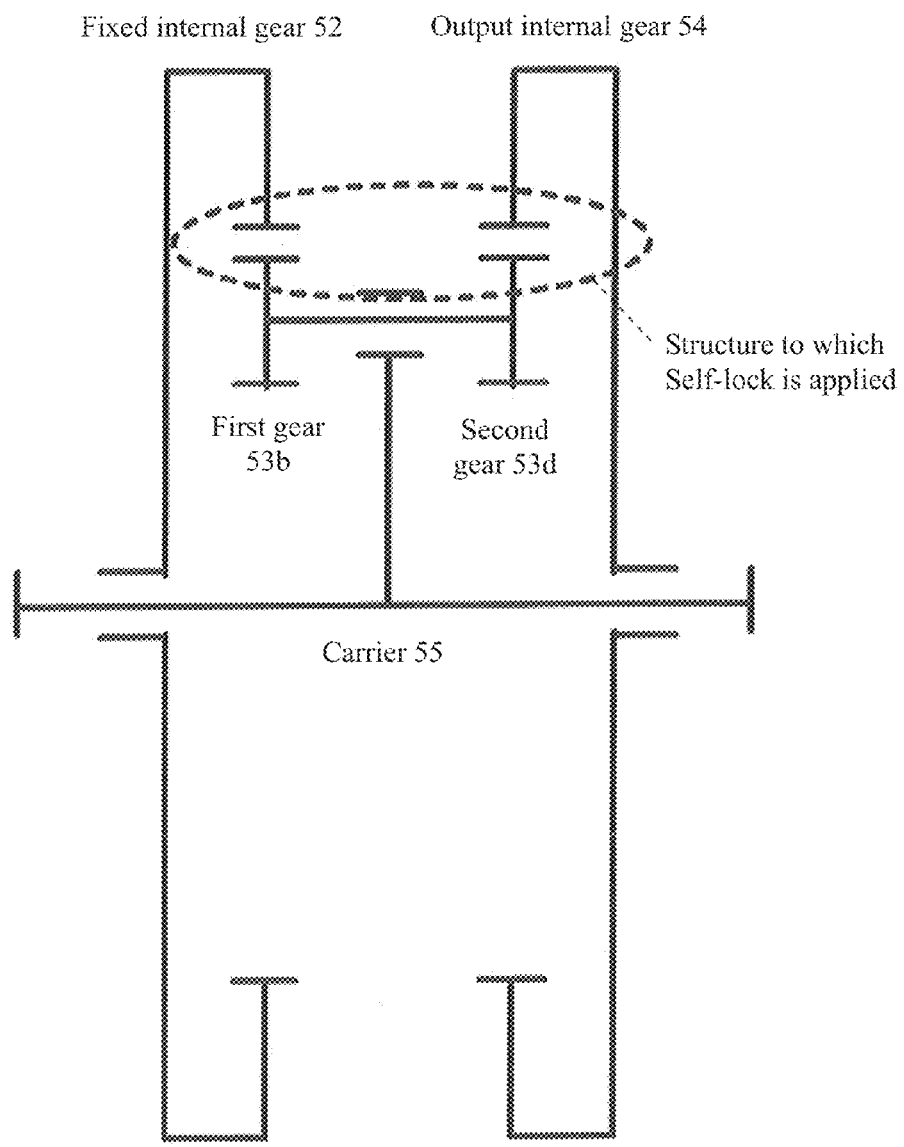
FIG. 15 is a skeleton diagram of the planetary gear reduction mechanism illustrated in FIGS. 14A and 14B.

Referring now to FIGS. 14A, 14B and 15, a planetary gear reduction mechanism 50 in accordance with a second embodiment will now be explained. In view of the similarity between the first and second embodiments, the descriptions of the parts of the second embodiment that are identical to the parts of the first embodiment may be omitted for the sake of brevity. For example, the configuration of the drive device 10 in accordance with the first embodiment is basically identical to a drive device 40 in accordance with the second embodiment, except for the planetary gear reduction mechanism 50.

The planetary gear reduction mechanism 50 basically includes a fixed internal gear 52 (e.g., a fixed sun gear or a fixed internal sun gear), a plurality of planet gears 53, an output internal gear 54 (e.g., an output sun gear or an output internal sun gear), a carrier 55, a base 56, an output shaft 57, and a cover 58.

The fixed internal gear 52 is a cylindrical shape with an internal gear formed on the inner peripheral surface and functions as a fixed sun gear. The fixed internal gear 52 has an opening 59 formed therein for the insertion of an intermediate gear 62 which transmits the torque of a motor pinion 63 that is fixed to the rotation shaft of the motor 31. In the illustrated embodiment, the planetary gear reduction mechanism 50 (e.g., the planetary gear mechanism) with the output shaft 57, and the intermediate gear 62 basically form a bicycle derailleur motor gear unit configured to reduce the motor speed of the motor 31 and transmit the motor torque of the motor 31 to the front derailleur 121 or the rear derailleur 122 (e.g., derailleur).

Each of the planet gears 53 has a first gear 53b that engages with the fixed internal gear 52 (e.g., the fixed internal sun gear) and a second gear 53d that engages with the output internal gear 54 (e.g., the output internal sun gear). The first gear 53b and the second gear 53d are coaxially coupled to each other in the planet gear 53. The first gear 53b engages with the fixed internal gear 52, and rotates and revolves while the second gear 53d engages with the output internal gear 54, and rotates and revolves. The output internal gear 54 is a cylindrical shape and is placed above the fixed internal gear 52. An internal gear 54f is formed on the inner peripheral surface of the output internal gear 54 for engaging with the second gear 53d, and the internal gear 54f rotates as the planet gear 53 rotates and revolves. The output internal gear 54 (e.g., the output internal sun gear) is rotatable relative to the fixed internal gear 52 (e.g., the fixed internal sun gear). The output internal gear 54 (e.g., the output internal sun gear) is fixedly coupled to the output shaft 57. The output internal gear 54 (e.g., the output internal gear) has the internal gear 54f (e.g., the internal gear teeth). The planet gears 53 are rotatably supported by rotation shafts 55c placed on an arc along which the planet gears 53 revolve. The rotation shafts 55c are supported at the top end and at the bottom end by a pair of support plates 55a and 55b of the carrier 55.

The carrier 55 can be formed from metal or resin, and the like, and supports the planet gears 53 at equal intervals such that the planet gears 53 can rotate and revolve. In other words, the carrier 55 rotatably and revolvably supports the planet gears 53. In addition the carrier 55 itself is configured to rotate (spin), and furthermore has a drive gear 55f formed on the outer peripheral surface. The carrier 55 engages with the intermediate gear 62 through an opening 59 formed in the fixed internal gear 52, and is rotatably driven by the torque of the motor transmitted via the intermediate gear 62. In other words, the intermediate gear 62 can be a gear train with at least one spur gear disposed between the motor pinion 63 of the motor 31 and the planetary gear reduction mechanism 50 (e.g., the planetary gear mechanism). The gear train is configured to transmit the motor torque of the motor 31 to the planetary gear reduction mechanism 50 (e.g., the planetary gear mechanism).

The base 56 is formed integrally with the fixed internal gear 52 to support the entire mechanism. The output shaft 57 is coaxially fixed to the output internal gear 54, and is supported to be able to rotate. In other words, the output shaft 57 is coaxially arranged relative to a rotational axis of the output internal gear 54 (e.g., the output internal sun gear). The second gears 53d of the planet gears 53 engage with the output internal gear 54 (e.g., the output external sun gear). Then, rotational output of the output shaft 57 is transmitted externally. The cover 58 covers the entire mechanism.

FIG. 15 is a skeleton view of the planetary gear reduction mechanism 50 having the above mentioned configuration.

Here, if Zb represents the number of teeth (e.g., tooth count) of the first gear 53b of the planet gear 53, Zc represents the number of teeth (e.g., tooth count) of the fixed internal gear 52 (e.g., the fixed internal sun gear), Zd represents the number of teeth (e.g., tooth count) of the second gear 53d of the planet gear 53, Zf represents the number of teeth (e.g., tooth count) of the output internal gear 54 (e.g., the output internal sun gear), $\eta bc$ represents the transmission coefficient between the fixed internal gear 52 (e.g., the fixed internal sun gear) and the first gear 53b, and $\eta df$ represents the transmission coefficient between the output internal gear 54 (e.g., the output internal sun gear) and the second gear 53d, then the fixed internal gear 52 (e.g., the fixed internal sun gear), the output internal gear 54 (e.g., the output internal sun gear), the first gear 53b, and the second gear 53d have the tooth counts, respectively, such that the tooth counts satisfy the following formulas (24) and (25) in order for the planetary gear reduction mechanism 50 to have a self-lock function.

When Zc*Zd>Zb*Zf:

$$[\{(\eta bc*Zc)/Zb\}-1]/[\{Zf/(\eta df*Zd)\}-1] \leq 1 \quad (24)$$

When Zc*Zd<Zb*Zf:

$$[\{(\eta df*Zf)/Zd\}-1]/[\{(\eta bc*Zc)/Zb\}-1] \leq 1 \quad (25)$$

Hereby, the planetary gear reduction mechanism 50 can be equipped with the self-lock function in the same manner as the first embodiment because of this of configuration. Furthermore, both transmission efficiencies $\eta bc$ and $\eta df$ have values of approximately 0.9 (0.85-0.95), or more preferably a value of 0.9. In the illustrated embodiment, the fixed internal gear 52 (e.g., the fixed sun gear), the output internal gear 54 (e.g., the output sun gear), the first gear 53b, and the second gear 53d have the tooth counts, respectively, such that the fixed internal gear 52, the output internal gear 54, the first gear 53b, and the second gear 53d lock while an external force is exerted to the output internal gear 54 from the output shaft 57.

Next, the relationship of the number of teeth that obtains the self-lock function will now be described.

First, the number of rotations for the respective elements when the output shaft 57 has made one rotation is as follows.
Output internal gear 54: 1
Fixed internal gear 52: 0
Planet gear rotate: $\{(Zc/Zb)-1\}/[\{(Zc*Zd/\{Zb*Zf\}\}-1]$
Planet gear revolution: $(-1)/[\{Zc*Zd/(Zb*Zf)\}-1]$ Accordingly, the cases are separated into when Zc*Zd<Zb*Zf, and when Zc*Zd>Zb*Zf.

Figure 16:
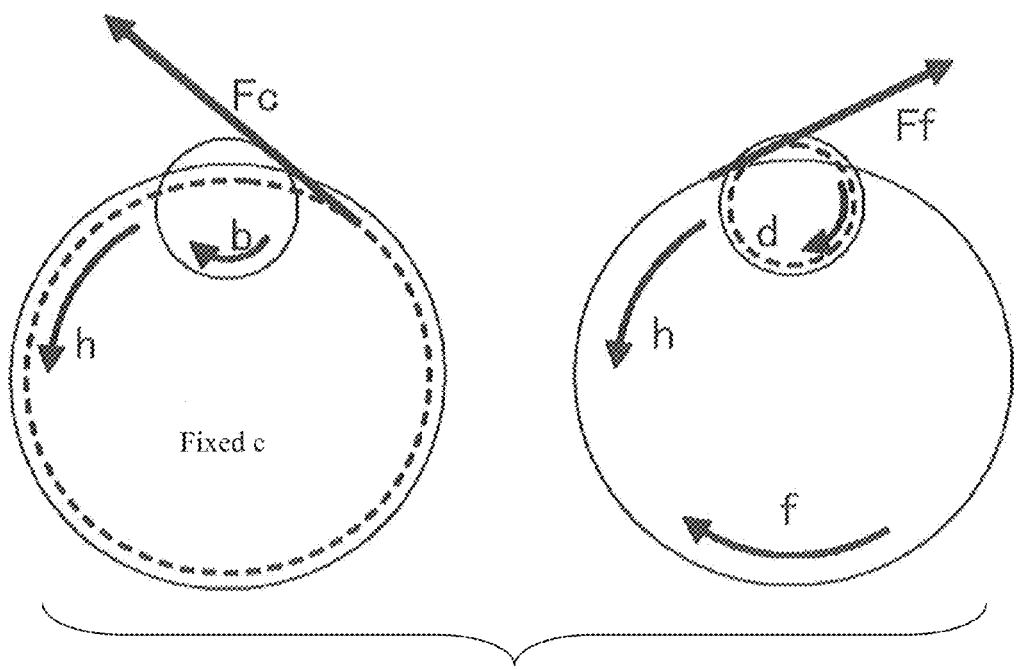
FIG. 16 is a schematic diagram illustrating rotational directions and directions of force when $Zc*Zd>Zb*Zf$.

When Zc*Zd>Zb*Zf, the direction of movement and the line of action for each constituent element is as shown in FIG. 16. Furthermore, FIG. 17 is an exploded view of the planet gear section.

In this case, the first gear 53b is the driving gear and the fixed internal gear 52 is the driven gear, and the output internal gear 54 is the driving gear and the second gear 53d is the driven gear. Additionally, in the drawing Fc represents the counterforce from the fixed internal gear 52 to the planet gear 53, and Ff is the counterforce from the output internal gear 54 to the planet gear 53, b is the rotational direction of the planet gear 53, h is the revolution direction of the planet gear 53, and f is the rotational direction of the output internal gear 54.

Figure 17:
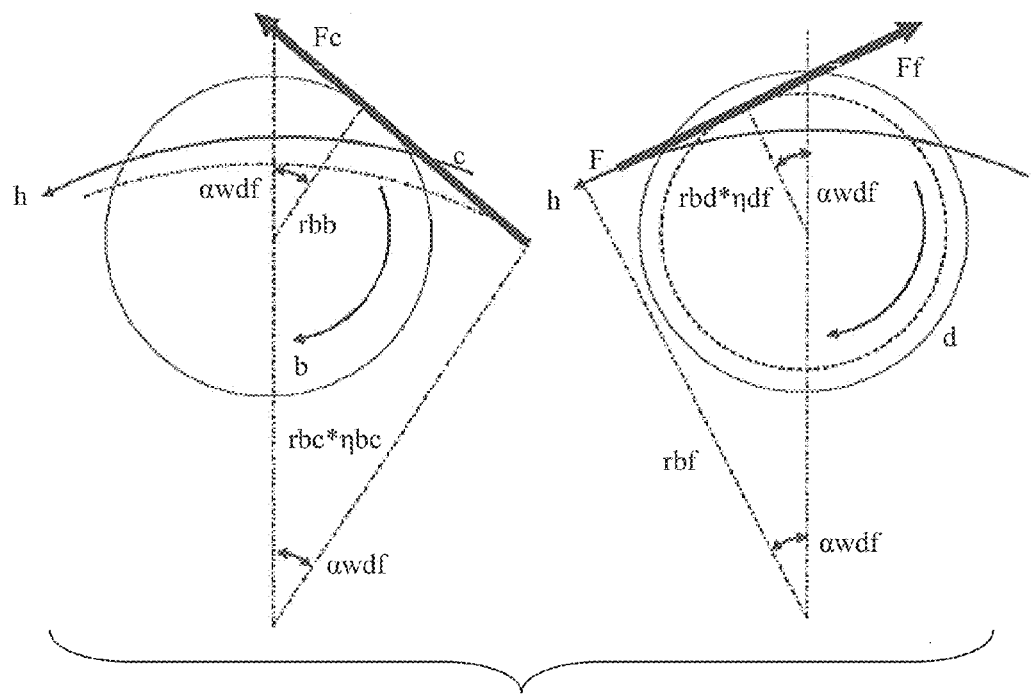
FIG. 17 is a detailed diagram illustrating the rotational directions and the directions of force illustrated in FIG. 16.

From the relationship in FIG. 17, the formula (26) and the formula (27) are true.

$$rbf\cos(\alpha wdf) = L + *\eta df \cos(\alpha wdf)$$

$$rbf - rbd*\eta df = L*\cos(\alpha wdf)$$

$$\cos(\alpha wdf) = (rbf - rbd*\eta df)/L \quad (26)$$

$$rbc*\eta bc/\cos(\alpha wbc) = L + rbb/\cos(\alpha wbc)$$

$$rbc*\eta bc - rbb = L*\cos(\alpha wdc)$$

$$\cos(\alpha wbc) = (rbc*\eta bc - rbb)/L \quad (27)$$

Here, the formula (28) is a sufficient condition for the planet gear 53 to not rotate.

$$Ff*rbd*\eta df = Fc*rbb \quad (28)$$

The formula (29) can be obtained by changing the form of the above formula.

$$Fc/Ff = rbd*\eta df/rbb \quad (29)$$

Additionally, the formula (30) is a sufficient condition for the planet gear 53 to not revolve.

$$Fc*\cos(\alpha wbc) \leq Ff*\cos(\alpha wdf) \quad (30)$$

The formula (31) can be obtained by changing the form of the above formula.

$$Fc/Ff \leq \cos(\alpha wdf)/\cos(\alpha wbc) \quad (31)$$

Substituting the formulas (26), (27), and (29) into the formula (31) yields the formula (32).

$$rbd*\eta df/rbb \leq \{(rbf - rbd*\eta df)/L\}/\{(rbc*\eta bc - rbb)/L\} = (rbf - rbd*\eta df)/(rbc*\eta bc - rbb) \quad (32)$$

The formula (33) can be obtained by changing the form of the above formula.

$$\{(rbc*\eta bc/rbb)-1\}/\{\{rbf/(rbd*\eta df)\}-1\} \leq 1 \quad (33)$$

The formula (34) represents the basic formula for the involute gear.

$$rbb = mbc*Zb*\cos(\alpha)/2$$

$$rbc = mbc*Zc*\cos(\alpha)/2$$

$$rbd = mdf*Zd*\cos(\alpha)/2$$

$$rbf = mbf*Zf*\cos(\alpha)/2 \quad (34)$$

Here, $\alpha$ represents the basic pressure angle for the respective gears.

Substituting the formula (34) into the formula (32) yields the formula (35).

$$[\{(\eta bc*Zc)/Zb\}-1]/[\{Zf/(\eta df*Zd)\}-1] \leq 1 \quad (35)$$

Figure 18:
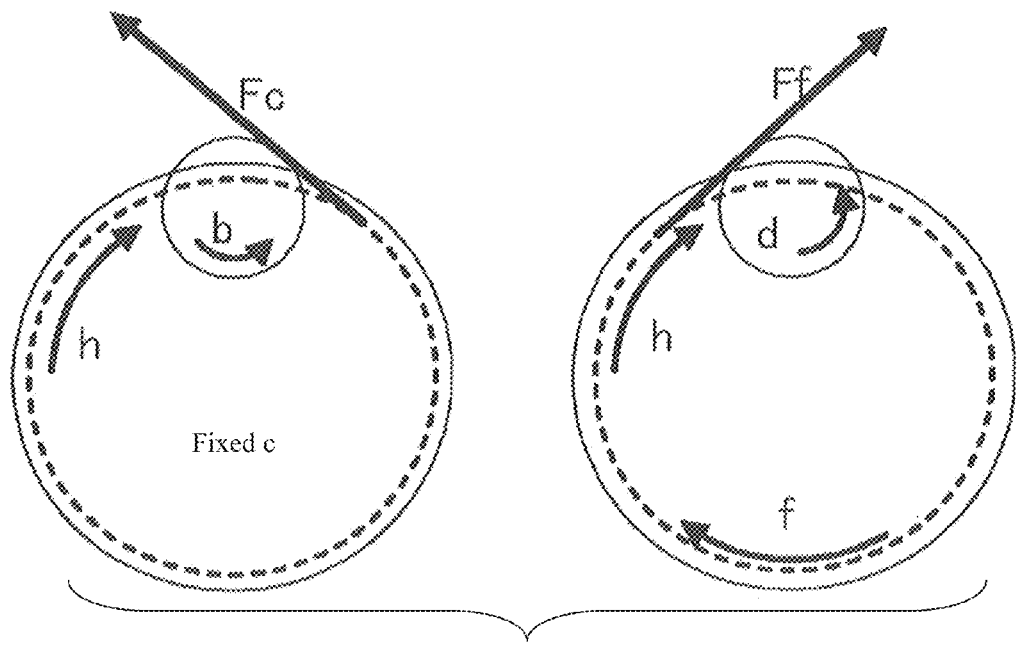
FIG. 18 is a schematic diagram illustrating rotational directions and directions of force when Zc*Zd<Zb*Zf.

However, when Zc*Zd>Zb*Zf, the direction of movement and the line of action for each constituent element is as shown in FIG. 18. Furthermore, FIG. 19 is an exploded view of the planet gear section.

Figure 19:
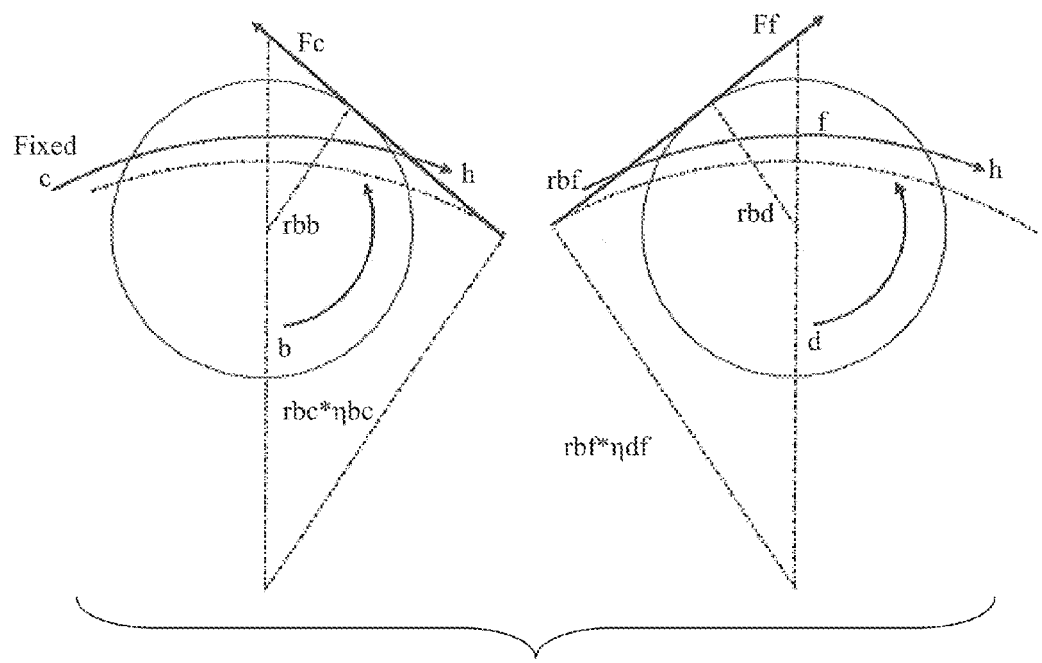
FIG. 19 is a detailed diagram illustrating the rotational directions and the directions of force illustrated in FIG. 18.

From the drawing relationship in FIG. 19, the formula (36) and the formula (37) are true.

$$rbf*\eta df \cos(\alpha wdf) = L + rbd/\cos(\alpha wdf)$$

$$rbf*\eta df - rbd = L*\cos(\alpha wdf)$$

$$\cos(\alpha wdf) = (rbf*\eta df - rbd)/L \quad (36)$$

$$rbc*\eta bc/\cos(\alpha wbc) = L + rbb/\cos(\alpha wbc)$$

$$rbc*\eta bc - rbb = L*\cos(\alpha wbc)$$

$$\cos(\alpha wbc) = (rbc*\eta bc - rbb)/L \quad (37)$$

Here, the formula (38) is a sufficient condition for the planet gear 53 to not rotate.

$$Ff*rbd = Fc*rbb \quad (38)$$

The formula (39) can be obtained by changing the form of the above formula.

$$Fc/Ff = rbd/rbb \quad (39)$$

Additionally, the formula (40) is a sufficient condition for the planet gear 53 to not revolve.

$$Fc*\cos(\alpha wbc) \geq Ff*\cos(\alpha wdf) \quad (40)$$

The formula (41) can be obtained by changing the form of the above formula.

$$Fc/Ff \geq \cos(\alpha wdf)/\cos(\alpha wbc) \quad (41)$$

Substituting the formulas (36), (37), and (39) into the formula (41) yields the formula (42).

$$rbd/rbb \geq \{(rbf*\eta df - rbd)/L\}/\{(rbc*\eta bc - rbb)/L\} = (rbf*\eta df - rbd(rbc*\eta bc - rbb)) \quad (42)$$

The formula (43) can be obtained by changing the form of the above formula.

$$\{(rbf*\eta df/rbd) - 1\}/\{(rbc*\eta bc/rbb) - 1\} \leq 1 \quad (43)$$

The formula (44) represents the basic formulas for the involute gear.

$$rbb = mbc*Zb*\cos(\alpha)$$

$$rbc = mbc*Zc*\cos(\alpha)$$

$$rbd = mdf*Zd*\cos(\alpha)$$

$$rbf = mdf*Zf*\cos(\alpha) \quad (44)$$

Here, α represents the basic pressure angle for the respective gears. Substituting the formula (44) into the formula (43) yields the formula (45).

$$\{(\eta df*Zf/Zd) - 1\}/\{(\eta bc*Zc/Zb) - 1\} \leq 1 \quad (45)$$

The formulas (35) and (45) are equivalent to the formulas (24) and (25). Therefore, as above described, satisfying the formula (24), and the formula (25) realizes the planetary gear reduction mechanism 50 that is equipped with a self-lock function.

Furthermore, in the above explanation an example was given where the outer gear 55d formed in the carrier 55 is driven, however any gear can be suitably selected as the drive gear.

Moreover, it is also possible to use the configuration shown in FIGS. 20A to 20C as the configuration for the planetary gear reduction mechanism 50.

FIG. 20A is a configuration where a seventh gear is disposed for meshing with the carrier 55 and the second gear 53d of the planet gear 53. FIG. 20B is a configuration where an eighth gear is disposed for meshing with the carrier 55 and the first gear 53b of the planet gear 53. FIG. 20C is a configuration where both the seventh and the eighth gears are provided.

Figure 21A:
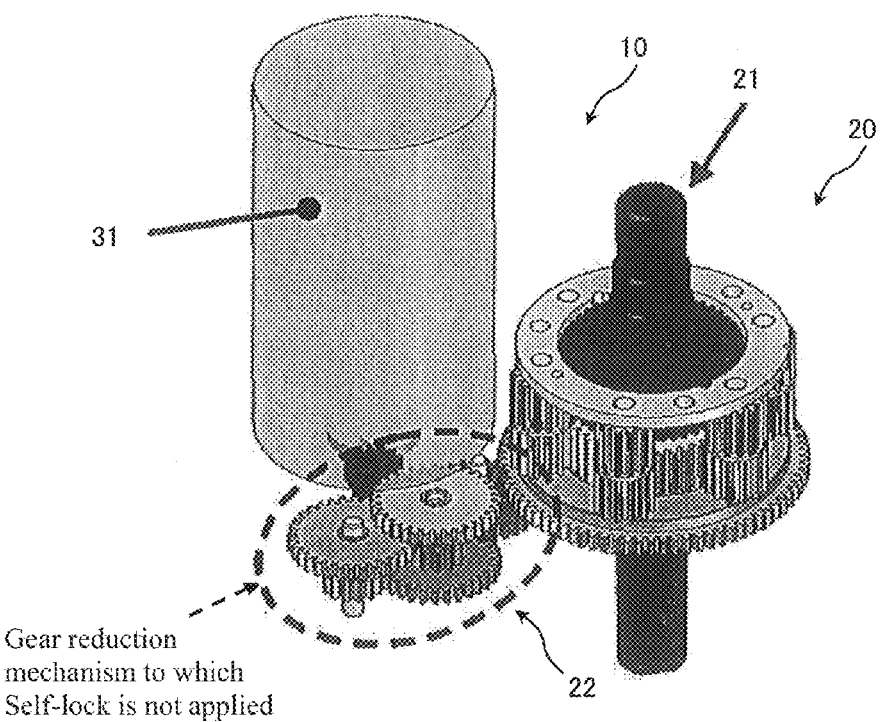
FIG. 21A is a perspective view of a planetary gear reduction mechanism in accordance with a modification example.
Figure 21B:
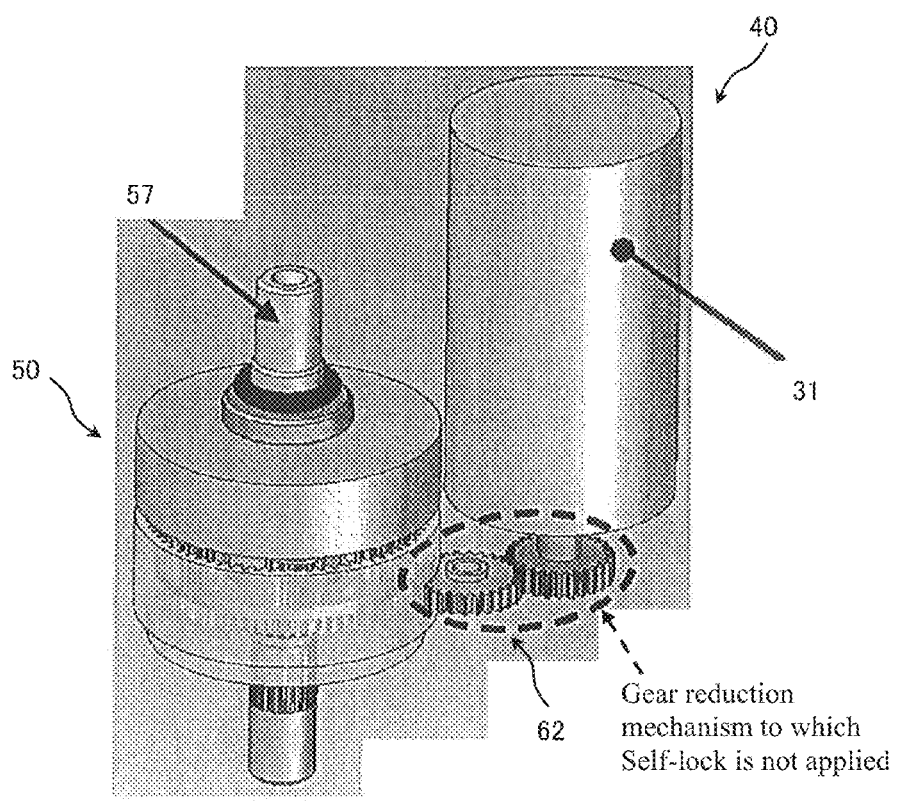
FIG. 21B is a perspective view of a planetary gear reduction mechanism in accordance with a modification example.

In the above mentioned configuration, as shown in FIGS. 21A and 21B, the planetary gear reduction mechanisms 20 and 50 function as a self-lock mechanisms. Therefore, from the view of the motor 31, a self-lock mechanism is disposed after the intermediate gear train (the spur gear wheel train or the gear reduction mechanism between the motor 31 and the planetary gear reduction mechanism 20 (50)). With this configuration, large external forces added by the chain 113 and so forth are blocked by the self-lock mechanism, and do not reach the intermediate gear train and motor 31. Accordingly, the intermediate gear train and the motor pinion of the motor 31 can be set to have a normal strength.

Moreover, the external force (moment) applied to the output shaft 21 (57) is greater than the motor torque for the output shaft 21 (57) that is due to the motor 31. In this configuration, the self-lock is applied at the output shaft 21 (57). Therefore, the planetary gear reduction mechanism 20 (50) can be produced to have a mechanical strength that can withstand the external forces. Thus, it is certainly possible to guarantee strength with respect to the force from the motor 31. Therefore, if a self-lock mechanism is applied at the output shaft 21 (57), then the device can be configured such that only the self-lock mechanism is able to withstand strong external forces, and the spur gear wheel train can be maintained at a strength capable of withstanding the force (power) from the motor 31. Accordingly, the spur gear wheel train no longer needs to be strong enough to withstand external forces, and thus can be light and compact.

Additionally, having the self-lock mechanism at the last stage reduces the product backlash. Here, the so-called product backlash indicates the amount of rotational play of the output shaft 21 (57) when an external force is applied to the output shaft 21 (57). For instance, if the self-lock is placed on the rotation shaft of the motor 31, then the backlash accumulates through all the wheel sets from the output shaft 21 (57) to the rotation shaft of the motor 31, and appears as product backlash in the output shaft 21 (57). If the self-lock is applied at the output shaft 21 (57), then the wheel train backlash between the motor 31 and just before the self-lock mechanism does not reach the output shaft 21 (57), and consequently reduces the overall product backlash.

Figure 22:
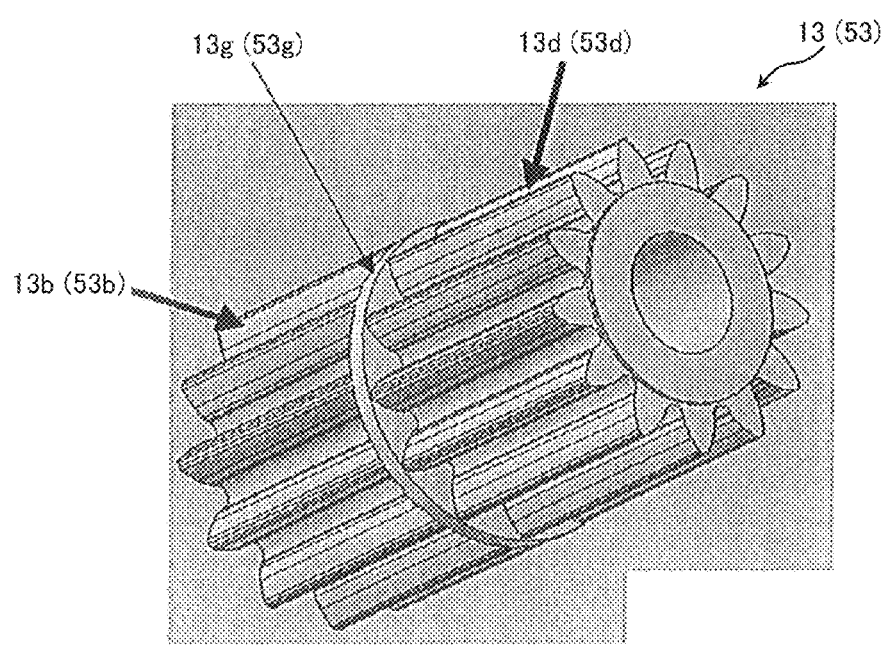
FIG. 22 is a perspective view of a planet gear with a guard.

Moreover, a guard 13g (53g) is formed in the planet gear 13 (53) between the first gear 13b (53b) and the second gear 13d (53d), as shown in FIG. 22. In other words, in the illustrated embodiment, at least one of the planet gears 13 (53) has the guard 13g (53g) that is axially disposed between the first gear 13b (53b) and the second gear 13d (53d). The first gear 13b (53b), the second gear 13d (53d) and the guard 13g (53g) are a one-piece member. Moreover, in the illustrated embodiment, the planet gears 13 (53) with the guards 13g (53g) are integrally formed as a one-piece, unitary member, respectively. By forming the guard 13g (53g), the teeth of the first and second gears 13b and 13d (53b and 53d) and the guard 13g (53g) are integrated. Therefore, the guard 13g (53g) braces against the pressure on the teeth, and thus increases the strength of the planet gears 13 (53) by 1.5 to 2 times. Furthermore, the guards 13g (53g) make it easier to form the planet gears 13 (53) by the molding, such as metal injection molding (MIM), plastic molding, or forging. Finally, the strength of the planet gears 13 (53) having the guards 13g (53g) can be increased as well as the strength of gears engaged therewith can be increased.

Generally, the gear strength will increase if the addendum modification coefficient of the gear increases. Attaching the guard 13g (53g) reduces the addendum modification coefficient on the planet gear 13 (53). However, the guard 13g (53g) provides an increased strength, and the planet gear 13 (53) has a larger strength compared to one not having a guard. If the addendum modification coefficient of the engaging gear increases by the amount that the addendum modification coefficient of the planet is reduced, then the engaging gear is causes to properly mesh and thus the strength of the engaging gear increases. Generally, it is necessary to increase the size of the gear to improve the strength of the gear. However, with the above-mentioned guard, the strength of the gear can be increased while the gear remains small, and therefore it is possible to keep the size and weight of the entire gear reduction mechanism small.

If the self-lock is applied at the output shaft, then the gears of the output shaft must receive all of the external force. In order to increase the strength of the gears by engagement of the gears, the gears must basically be larger. However, this also leads to increasing the size of the device. Increasing the addendum modification coefficient of the gear will also increase the strength. However, there is a limit to the increase in strength. Not only that, this reduces the transmission coefficient and increases the size of the gear. Another means of increasing the strength of the gear lies in increasing the number of gear teeth. However, this also increases the size of the device. Additionally, there is also a limit even when using a material having increased strength. Further, the external force applied to the output shaft of the electronic mechanism for the bicycle gear changing device is that large. In the illustrated embodiments, the number of the planet gears 13 (53) are increased. Thus, the force is spread out when a plurality of gear teeth of the planet gears 13 (53) are engaged, and the strength of the gear is increased in a small amount of space. In the illustrated embodiments, the output shaft 21 (57) for the motor unit that drives the derailleur (e.g., the front derailleur 121 or the rear derailleur 122) is directly secured to the output gear (e.g., the output sun gear 15 or the output internal gear 54) of the planetary gear reduction mechanism 20 (50). There is a great advantage to being able to use the number of the planet gears 13 (53) as a means of adjusting the strength. The strength of the planetary gear reduction mechanism 20 (50) can be increased as desired without changing the overall size. Even if the number of parts increases, the initial cost and management cost can be kept the same without increasing the kinds of parts used.

Furthermore, in this configuration, the gear reduction mechanism is connected to the motor 31. The suitable spur gear wheel train can be placed inside the gear reduction device (between the motor 31 and the planetary gear reduction mechanism 20 (50)), and thereby the gear reduction ratio can be modified by simply changing the spur gear wheel train while still sharing a large number of parts. In other words, in the illustrated embodiment, the intermediate gear 22 (62) can be a gear reduction mechanism configured to be disposed between the motor 31 and the planetary gear reduction mechanism 20 (50). The gear reduction mechanism is configured to transmit the motor torque of the motor 31 to the planetary gear reduction mechanism 20 (50).

For example, the rotation speed and torque for the output shaft 21 (57) which is required by the planetary gear reduction mechanism 20 (50) differs in the front derailleur 121 and the rear derailleur 122.

Moreover, the requirements changed based on the purpose of the bicycle such as for the purpose of road racing or for mountain biking. With the drive device 10 (40), other than the planetary gear reduction mechanism 20 (50), there is at least one spur gear wheel train (e.g., the intermediate gear 22 (62)) besides the motor pinion 23 (63) of the motor 31, thereby allowing different reduction gear ratios to be provided while standardizing the configurations for the parts and units.

Figures 23A, 23B:
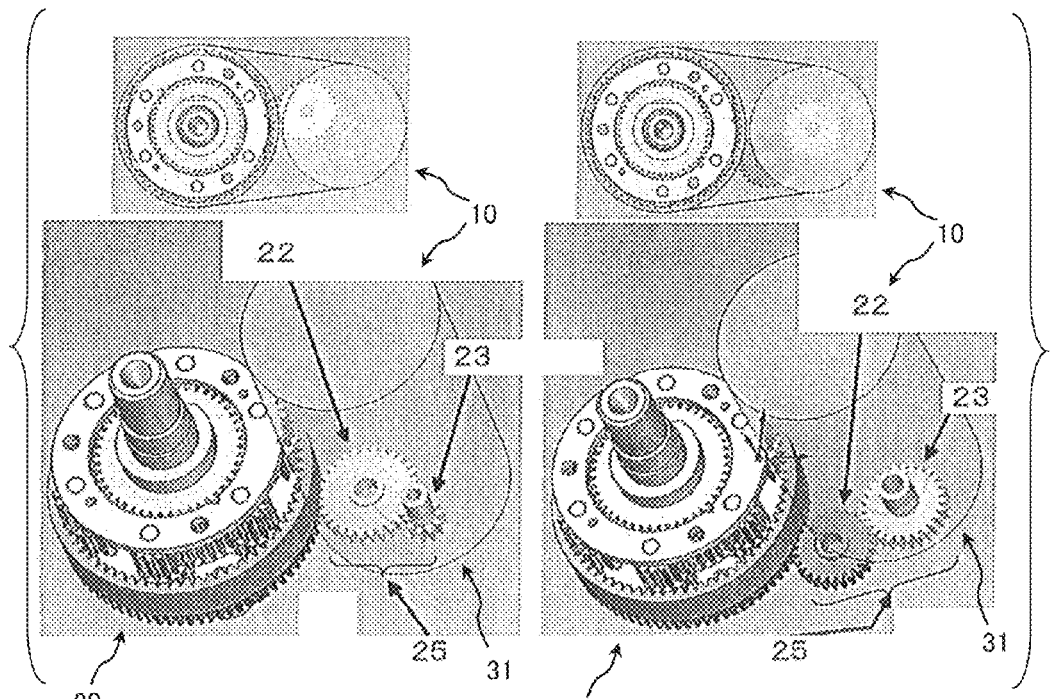
FIG. 23A is an axial plan view and a perspective view of a gear train disposed between a motor and a planetary gear reduction mechanism.
FIG. 23B is an axial plan view and a perspective view of a gear train disposed between a motor and a planetary gear reduction mechanism.
Figures 23C, 23D:
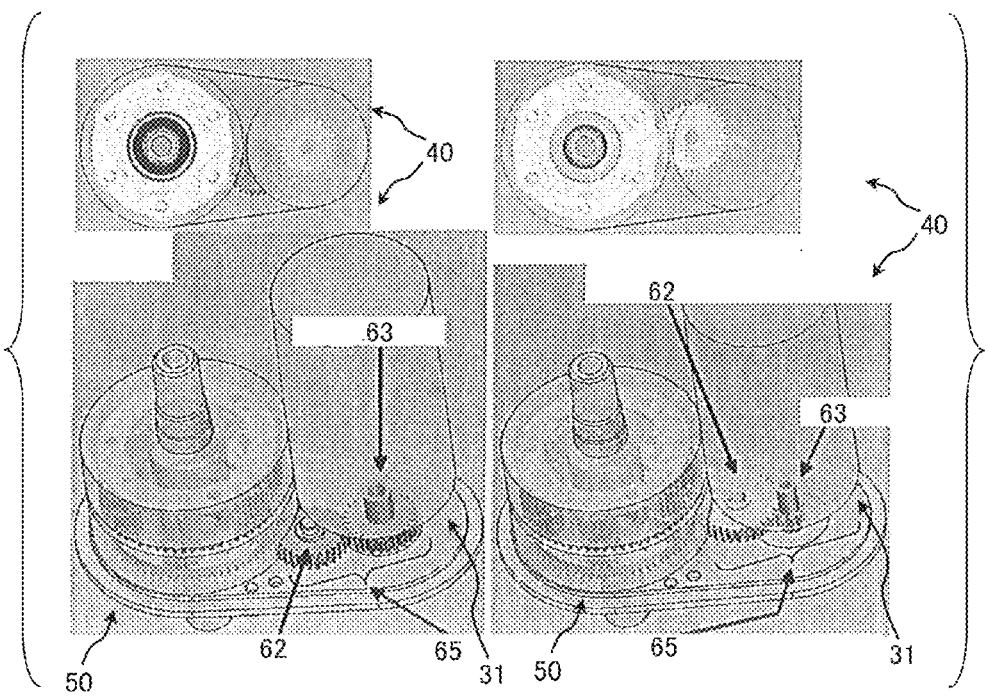
FIG. 23C is an axial plan view and a perspective view of a gear train disposed between a motor and a planetary gear reduction mechanism.
FIG. 23D is an axial plan view and a perspective view of a gear train disposed between a motor and a planetary gear reduction mechanism.

Therefore, it becomes possible to reduce costs through mass production, shorten development cycles, stabilize quality by use in various parts, shorten product development cycles, and make servicing and repair efficient. Moreover, planetary gear reduction mechanisms are generally compact and have a large gear reduction ratio. However, in order to change the gear reduction ratio, in many cases it is necessary to change almost all the constituent parts. In contrast to that, in the illustrated embodiment, replacing a portion of the spur gear wheel train, and combining with a spur gear wheel train that has a larger degree of freedom for changing the gear reduction ratio, the planetary gear reduction mechanism can easily be used for different purpose. For example, as shown in FIGS. 23A and 23B, in the drive device 10 in accordance with the first embodiment, an appropriate gear reduction ratio can be obtained by changing the combination of gear diameters (the number of gear teeth) of the gears that make up the spur gear train 25 which includes the motor pinion 23 and the intermediate gear 22. In the same manner, as shown in FIGS. 23C and 23D, in the drive device 40 in accordance with the second embodiment, the appropriate gear reduction ratio can be obtained by changing the combination of gear diameters (the number of gear teeth) of the gears that make up the spur gear train 65 which includes the motor pinion 63 and the intermediate gear 62. Not only that, the amount of space required for the inter-shaft distance for the planetary gear reduction mechanism 20 (50) and the motor 31 has not changed. Therefore, it can be easy to maintain a standard between the different purposes for the bicycle. Additionally, the spur gear train 25 (65) can fit within an outer profile connecting an outer periphery of the planetary gear reduction mechanism 20 (50) and an outer periphery of the motor 31. Therefore, it is possible to standardize the placement of the mechanism or the case member 131.

Moreover, as shown in FIG. 21A, when the wheel train is created using a plurality of spur gears, this further increases the freedom to change the gear reduction ratio within that same space. The reason is that, even without changing the already set inter-shaft distance, it can be easy to change the gear ratio by merely increasing or decreasing the number of gear teeth of the engaged gears by the same amount.

In the illustrated embodiment, rotational axes of the planetary gear reduction mechanism 20 (50), the spur gear wheel train 25 (65), and the motor 31 are arranged in parallel to each other. Arranging the planetary gear reduction mechanism and the motor coaxially and connecting the planetary gear reduction mechanism and the motor in series creates a thin long shape, and can be a disadvantage in terms of rigidity if overturned. However, since the planetary gear reduction mechanism 20 (50), the spur gear wheel train 25 (65) and the motor 31 are arranged in parallel to each other (aligned in the same height level), the planetary gear reduction mechanism 20 (50) and the motor 31 can be arranged in a row, and this arrangement can be compact and suitable for various purposes.

The space approximately within the edges of the diameter of the motor 31 and the diameter of the planetary gear reduction mechanism 20 (50) becomes a convenient space for arranging the spur gear wheel train 25 (65). Thus, a space efficient motor unit can be provided. Moreover, the rotation shafts are all in one direction, thereby improving ease of assembly.

The output shaft 21 (57) fixed to the output sun gear 15 (the output internal gear 54) extends through the fixed sun gear 12 (the fixed internal gear 52) and is supported by the sliding bearings 201 and 202 that are disposed in the base 16 (56) and the case member 131. With this configuration, the distance between the bearings that support the output shaft 21 (57) (i.e., the distance between the sliding bearings 201 and 202) can be made longer. Thus, the amount of shaking can be reduced. In addition, the bearings for the output shaft 21 (57) can be formed on the part of the base, which results in robust bearings.

Figure 24A:
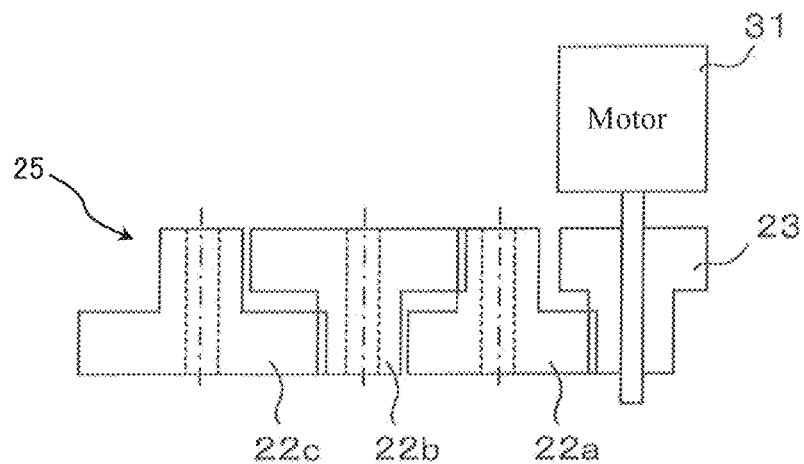
FIG. 24A is a schematic diagram of an intermediate gear train.
Figure 24B:
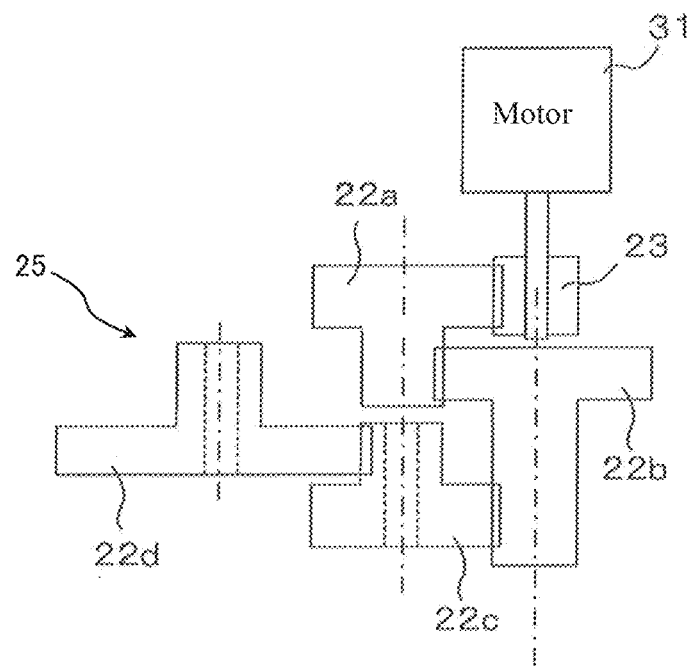
FIG. 24B is a schematic diagram of an intermediate gear train.

Moreover, efficient use of space can be obtained by combining the spur gears as shown in FIGS. 24A and 24B. As shown in FIG. 24A, the intermediate gears 22 (22a, 22b and 22c) and the motor pinion 23 that form the spur gear train 25 can be placed at the same height, by alternately interchanging the top and bottom of the intermediate gears 22a, 22b and 22c. Furthermore, as shown in FIG. 24B, the intermediate gears 22 (22a, 22b, 22c and 22d) and the motor pinion 23 that form the spur gear train 25 can be made compact and provide a large gear reduction ratio, by overlapping the intermediate gears 22 (22a, 22b, 22c and 22d) and the motor pinion 23 in a plurality of stages.

In the case where there are two internal sun gears and two external sun gears in the planetary gear reduction mechanism, it is preferable that the self-lock is applied in the internal gear. The engagement of the plurality of the planet gears and the output shaft gear can receive the external force applied to the output shaft. However, instead of receiving the external force with the external gear, it is preferable to use the internal gear which has a large distance from its rotational center to the engagement of the gear teeth because this in turn reduces the tooth surface pressure. Therefore, with the internal gear, the appropriate strength can be obtained by a smaller gear than the external gear. Thus, the size and weight of the planetary gear reduction mechanism 20 (50) can be reduced, which can makes the planetary gear reduction mechanism 20 (50) compact.

Third Embodiment

Figure 25:
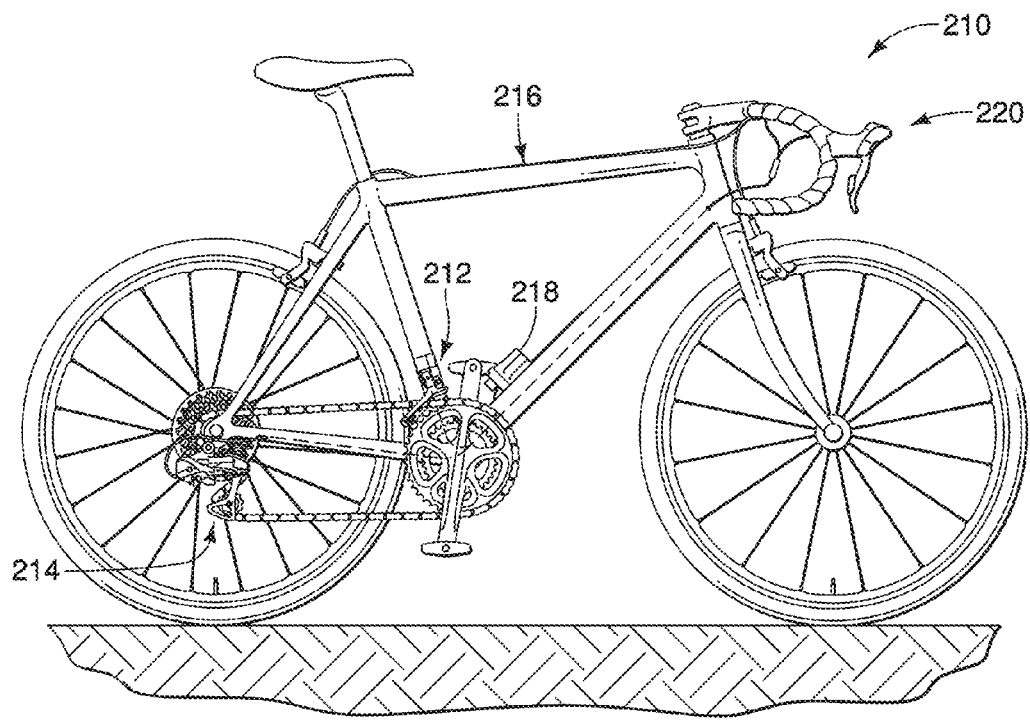
FIG. 25 is a side elevational view of a bicycle that is equipped with an motorized front derailleur and a motorized rear derailleur, which each have an electric derailleur motor unit in accordance with a third embodiment.

Referring to FIG. 25, a bicycle 210 is illustrated that is equipped with an electrically controlled shifting system. The electrically controlled shifting system includes a bicycle electric front derailleur 212 and a bicycle electric rear derailleur 214 (e.g., motorized derailleurs) in accordance with one illustrative embodiment. The front and rear derailleurs 212 and 214 are each mounted to a bicycle frame 216 of the bicycle 210 in a conventional manner. In the illustrative embodiment, the front and rear derailleurs 212 and 214 are motorized derailleurs (i.e., each of the derailleurs 212 and 214 has a motor). The electrically controlled shifting system further includes a battery 218 and a pair of electric shifters 220 (only one illustrated in FIG. 25). The battery 218 is fixedly coupled to the bicycle frame 214 of the bicycle 210 with the battery 218 being easily removed from and reattached to the bicycle 210. The battery 218 is electrically coupled to the derailleurs 212 and 214 and the electric shifters 220 to supply electrical power thereto. The electric shifters 220 have electrical switches that electronically control the upshifting and downshifting of the derailleurs 212 and 214 to move a chain between front and rear chain sprockets of the bicycle 210, respectively, in a conventional manner. The battery 218 is a replaceable battery pack or a rechargeable battery. Since batteries and electric shifters are conventional electronic components in the bicycle field, further descriptions of the battery 218 and the electric shifters 220 will be omitted for the sake of brevity.

Figure 26:
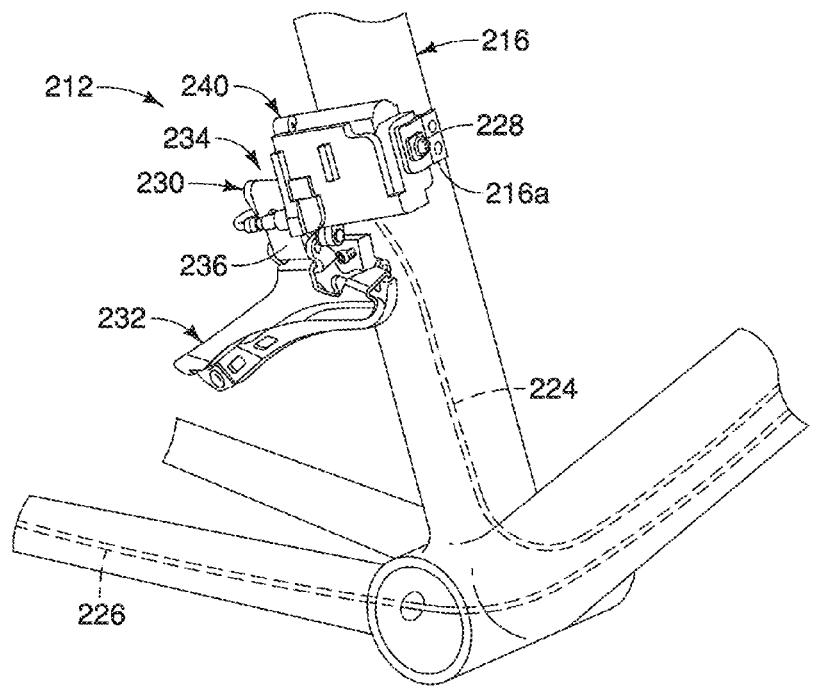
FIG. 26 is a front side perspective view of a portion of the bicycle illustrated in FIG. 25 that includes the front derailleur.

Referring to FIGS. 25 and 26, a first electrical cable 224 extends from the front derailleur 212 to a control unit (not shown) to receive electrical power from the battery 218 and to receive shift signals from one of the electric shifters 220. Similarly, a second electrical cable 226 extends from the rear derailleur 214 to the control unit to receive electrical power from the battery 218 and receive shift signals from other of the electric shifters 220. Thus, the electrical cables 224 and 226 are multi-electrical conductor cables. In the illustrated embodiment, the electrical cables 224 and 226 are routed inside the bicycle frame 216. Alternatively, the electrical cables 224 and 226 can be run along the exterior of the bicycle frame 216 and secured to the bicycle frame 216 with suitable fasteners such as cable ties.

As seen in FIG. 26, the front derailleur 212 is fixed to a bracket 216a of the bicycle frame 216 by a fastening member or fastener, e.g. a bolt 228. Of course, it will be apparent from this disclosure that other mounting configurations can be used as needed and/or desired. The front derailleur 212 basically includes a derailleur base member 230 and a chain guide 232 (e.g., a movable member). The derailleur base member 230 is fixed to the bicycle frame 216 by a fastening member or fastener, e.g. a bolt, in a conventional manner. In particular, the derailleur base member 230 has a portion with a threaded hole. The threaded hole receives the bolt to secure the derailleur base member 230 to the bicycle frame 216. The chain guide 232 is movably supported to the derailleur base member 230 to move between a retracted position and an extended position. Depending on the configuration of the bicycle, the chain guide 232 may be move to at least one intermediate position located between the retracted and extended positions. In the illustrated embodiment, the chain guide 232 is movably supported to the derailleur base member 230 by an inner link 234 and an outer link 236. The links 234 and 236 form a four bar linkage (e.g., a linkage) with the derailleur base member 230 and the chain guide 232. In other words, the links 234 and 236 have first ends pivotally mounted to the derailleur base member 230 and second ends pivotally mounted to the chain guide 232. Since the four bar linkage is a conventional mechanical component in the bicycle field, further descriptions of the four bar linkage will be omitted for the sake of brevity. Thus, in the illustrated embodiment, the front derailleur 212 (e.g., the motorized derailleur) includes the four bar linkage (e.g., the linkage) and the chain guide 232 (e.g., the movable member).

Figure 27:
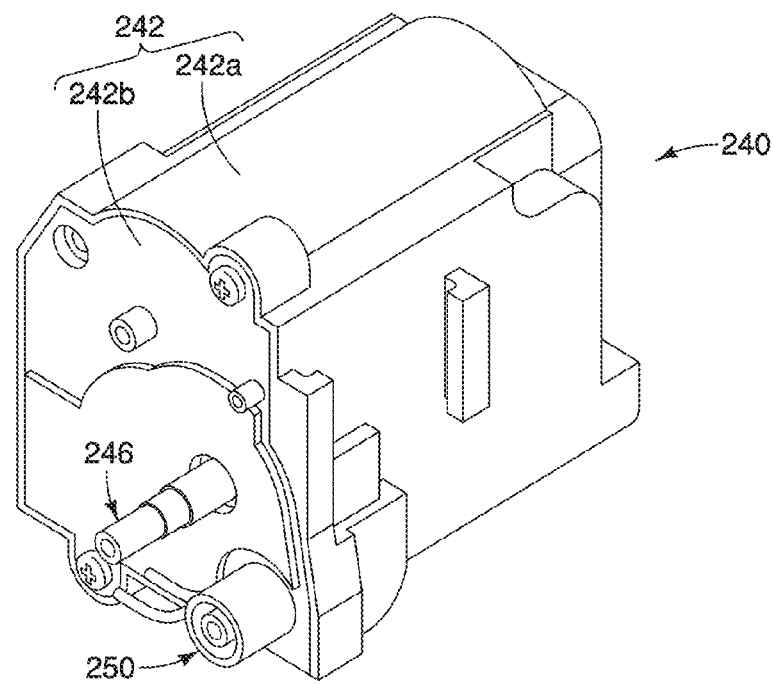
FIG. 27 is a rear side perspective view of the electric derailleur motor unit of the motorized front derailleur illustrated in FIG. 26.
Figure 28:
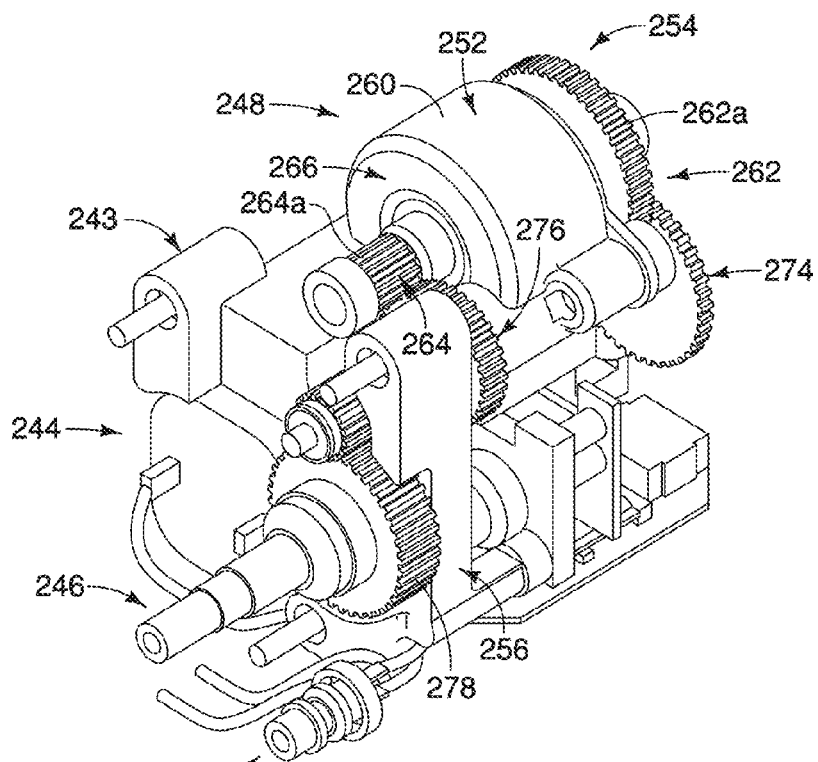
FIG. 28 is a rear side perspective view of the electric derailleur motor unit illustrated in FIG. 27, with a housing of the electric derailleur motor unit removed.

The front derailleur 212 (e.g., the motorized derailleur) also includes an electric derailleur motor unit 240 (hereinafter "motor unit 240"). The bracket 216a and the derailleur base member 230 support the motor unit 240 with respect to the bicycle frame 216. The derailleur base member 230 is formed of a rigid material such as a lightweight metal and/or non-metallic material. Since the derailleur base member 230 is fixed to the bicycle frame 216 by the bolt, the derailleur base member 230 constitutes a fixed member with respect to the bicycle frame 216. As seen in FIGS. 27 and 28, the motor unit 240 (e.g., the electric derailleur motor unit) includes a housing 242, a base member 243, an electric drive part or motor 244, an output shaft 246, and a drive train 248.

As seen in FIG. 27, the housing 242 basically includes a front cover 242a and a back cover 242b. The front and back covers 242a and 242b are fastened together to enclose the motor 244. In the illustrated embodiment, the front and back covers 242a and 242b can be, for example, adhesively fastened together or fastened together by screws or other suitable fasteners. The front and back covers 242a and 242b are preferably formed of a lightweight non-metallic material such as generally rigid plastic material. The back cover 242b of the housing 242 has a cable opening that opens in a rearward direction relative to the housing 242 with the motor unit 240 in an installed position on the bicycle 210. The cable opening provides access to a cable connector 250 of the motor unit 240 for electrically connecting the electrical cable 224 to the motor unit 240.

As seen in FIGS. 27 and 28, the base member 243 is fixedly coupled to the housing 242. When the front and back covers 242a and 242b are fastened together, the base member 243 is contained within the housing 242. The base member 243 is provided for supporting the motor 244, the output shaft 246 and the drive train 248 with respect to the housing 242 within the housing 242. The configuration of the base member 243 depends on the configuration of the motor unit 240. Since a variety of components can be supported on the base member 243 within the housing 242, the base member 243 will not be discussed or illustrated in detail.

Figure 31:
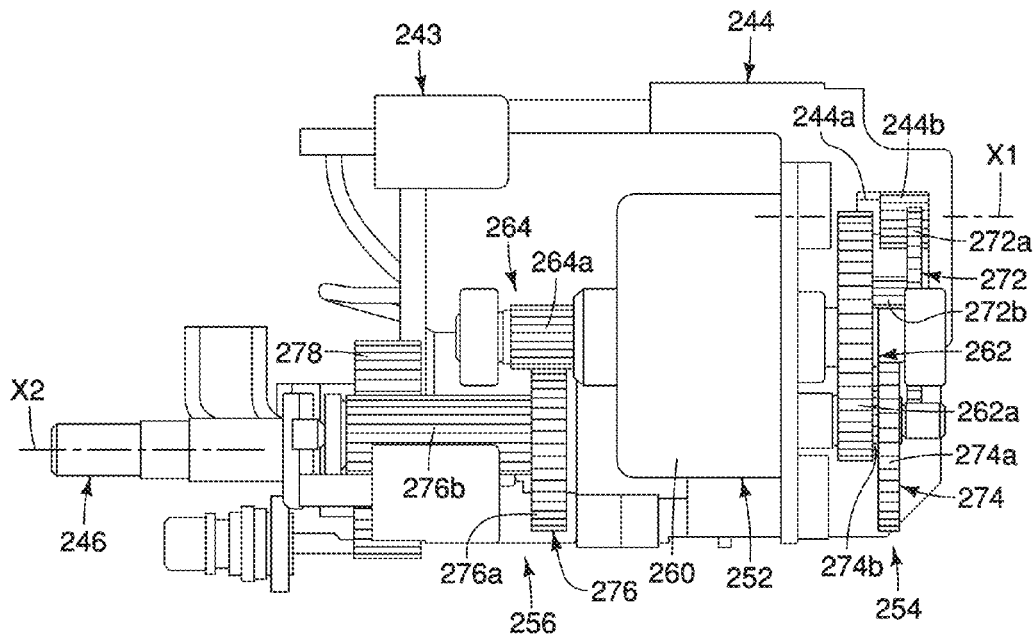
FIG. 31 is a top plan view of the electric derailleur motor unit illustrated in FIG. 27, with the housing of the electric derailleur motor unit removed.
Figure 32:
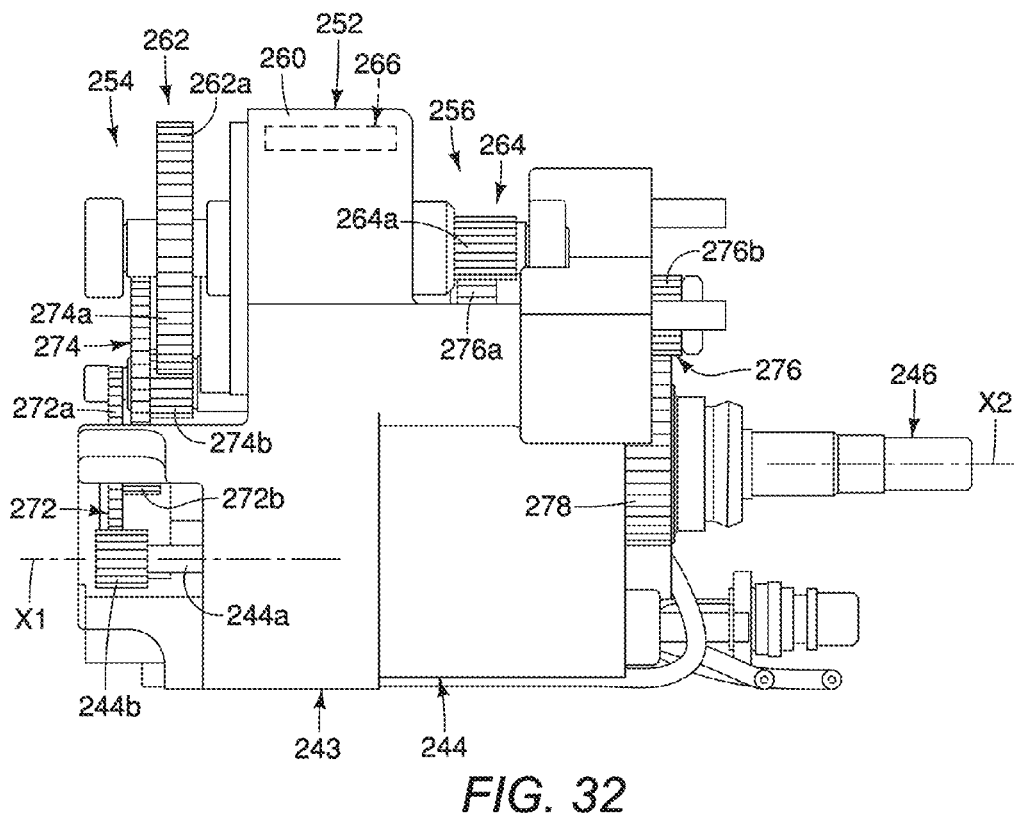
FIG. 32 is a right side elevational view of the electric derailleur motor unit illustrated in FIG. 27, with the housing of the electric derailleur motor unit removed.

As seen in FIGS. 31 and 32, the motor 244 is mounted to the base member 243. The motor 244 has a motor shaft 244a rotatable about a first rotational axis X1. The motor 244 also has a motor pinion 244b (a spur gear) that is fixedly attached to the motor shaft 244a of the motor 244. In the illustrated embodiment, the motor pinion 244b is formed of a rigid material, such as a lightweight metal and/or non-metallic material, suitable for gears. The output shaft 246 is rotatable about a second rotational axis X2. In the illustrated embodiment, the first and second rotational axis X1 and X2 are parallel to each other. The drive train 248 is operatively disposed between the motor shaft 244a of the motor 244 and the output shaft 246. Basically, the motor 244 drives the drive train 248 to rotate the output shaft 246. The output shaft 246 is connected to the outer link 236 to move the chain guide 232 between the retracted and extended positions. In particular, as shown in FIG. 26, the chain guide 232 is operatively coupled to the motor 244 of the motor unit 240. The links 234 and 236 (e.g., the linkage) are operatively coupled to the output shaft 246 of the motor unit 240. The chain guide 232 (e.g., the movable member) is movably supported by the links 234 and 236 (e.g., the linkage) to move relative to the base member 243 of the motor unit 240 between the retracted position (e.g., the first shift position) and the extended position (e.g., the second shift position).

The motor 244 is contained within an interior space of the housing 242. The motor 244 preferably includes other conventional parts that are not being illustrated for purposes of illustration. For example, the motor 244 will typically also include a position control/detecting mechanism (not shown) and one or more printed circuit boards (not shown) with a motor circuit and a position control/detecting circuit (e.g., see U.S. Pat. Nos. 6,162,140 and 7,306,531 which are both assigned to Shimano. Inc.). In the illustrated embodiment, the motor 244 has an internal control unit or internal drive unit (not shown) and an electrical cable extending from the internal control unit. The electrical cable is connected to the cable connector 250. Thus, the electric motor 244 is electrically connected to the battery 218 and to the electric shifter 220 by the electrical cable 224. The cable connector 250 preferably has additional conductors for attaching other wires for the position control/detecting mechanism (not shown) and/or a printed circuit board (not shown). Since the motor 244 is relatively conventional and can have a variety of configurations, the motor 244 will not be discussed or illustrated in detail.

As seen in FIGS. 28 to 32, the drive train 248 basically includes the motor pinion 244b (the spur gear) of the motor 244, an anti-backdriving device 252, a first reduction gear train 254, and a second reduction gear train 256. In the illustrated embodiment, the first reduction gear train 254 of the drive train 248 is operatively coupled between the motor shaft 244a and the anti-backdriving device 252, while the second reduction gear train 256 of the drive train 248 is operatively coupled between the anti-backdriving device 252 and the output shaft 246.

The anti-backdriving device 252 basically includes a case 260, an input member 262, an output member 264, and an engagement element 266. The case 260 is mounted to the base member 243. The case 260 houses a part of the input member 262, a part of the output member 264 and the engagement element 266.

The input member 262 of the anti-backdriving device 252 is rotatable with respect to the case 260. In the illustrated embodiment, the rotational axis of the input member 262 is parallel to the first rotational axis X1 of the motor 244. The input member 262 is operatively coupled to the motor shaft 244a of the motor 244. Specifically, the input member 262 has an externally-toothed input gear 262a that is fixedly coupled to an input shaft of the input member 262. In the illustrated embodiment, the input gear 262a is formed of a rigid material, such as a lightweight metal and/or non-metallic material, suitable for gears. The input gear 262a is operatively coupled to the motor shaft 244a of the motor 244 via the first reduction gear train 254. Thus, the input gear 262a rotates together with the input member 262 while rotation of the motor 244 is transmitted to the input gear 262a via the first reduction gear train 254.

Figure 30:
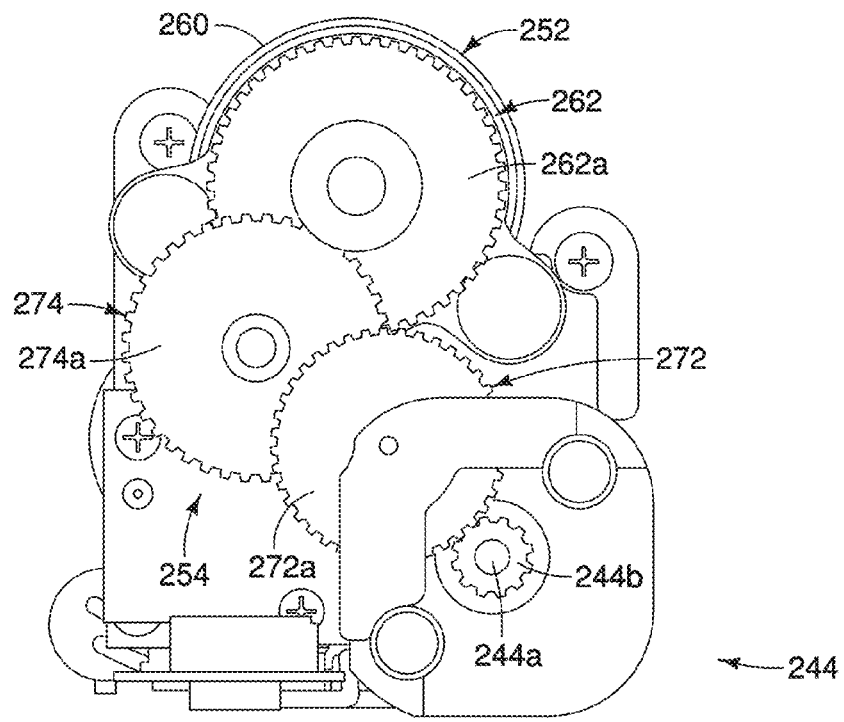
FIG. 30 is a front side elevational view of the electric derailleur motor unit illustrated in FIG. 27, with the housing of the electric derailleur motor unit removed.

In particular, as seen in FIGS. 30 to 32, the first reduction gear train 254 consists of spur gears to operatively couple the motor shaft 244a to the anti-backdriving device 252. Specifically, the first reduction gear train 254 only includes first and second stepped gears 272 and 274 (e.g., spur gears), and does not include any worms. The first and second stepped gears 272 and 274 are rotatably supported to the base member 243 in a conventional manner. Specifically, the first and second stepped gears 272 and 274 are rotatable about rotational axes, respectively. The rotational axes of the first and second stepped gears 272 and 274 are parallel to each other. Furthermore, the rotational axes of the first and second stepped gears 272 and 274 are parallel to the first rotational axis X1 of the motor 244.

The first stepped gear 272 has an externally-toothed first large gear portion 272a and an externally-toothed first small gear portion 272b (e.g., spur gears). The first large gear portion 272a and the first small gear portion 272b are concentrically arranged with respect to each other, and are integrally formed as a one-piece, unitary member. The first large gear portion 272a has a larger diameter than the first small gear portion 272b. Similarly, the second stepped gear 274 has an externally-toothed second large gear portion 274a and an externally-toothed second small gear portion 274b (e.g., spur gears). The second large gear portion 274a and the second small gear portion 274b are concentrically arranged with respect to each other, and are integrally formed as a one-piece, unitary member. The second large gear portion 274a has a larger diameter than the second small gear portion 274b. In the illustrated embodiment, as shown in FIG. 30, the motor pinion 244b of the motor 244 has a smaller diameter than the first large gear portion 272a of the first stepped gear 272. The first large gear portion 272a has a smaller diameter than the second large gear portion 274a of the second stepped gear 274. The second large gear portion 274a has a smaller diameter than the input gear 262a of the input member 262 of the anti-backdriving device 252. In the illustrated embodiment, the first and second stepped gears 272 and 274 are formed of a rigid material, such as a lightweight metal and/or non-metallic material, suitable for gears.

In the illustrated embodiment, as seen in FIGS. 30 to 32, the motor pinion 244b of the motor 244 meshes with the first large gear portion 272a of the first stepped gear 272. The first small gear portion 272b of the first stepped gear 272 meshes with the second large gear portion 274a of the second stepped gear 274. The second small gear portion 274b of the second stepped gear 274 meshes with the input gear 262a of the input member 262 of the anti-backdriving device 252. Thus, the rotation of the motor 244 is transmitted to the input member 262 of the anti-backdriving device 252 via the motor pinion 244b, the first stepped gear 272, the second stepped gear 274 and the input gear 262a. In the illustrated embodiment, the first reduction gear train 254 has a plurality of spur gears (e.g., the first and second stepped gears 272 and 274). However, the first reduction gear train 254 can consist of only one spur gear or more than two spur gears as needed and/or desired. Also, each of the spur gears of the first reduction gear train 254 includes a stepped gear (e.g., the first and second stepped gears 272 and 274). However, each of the spur gear of the first reduction gear train 254 can be a spur gear having a single gear portion.

On the other hand, the output member 264 of the anti-backdriving device 252 is rotatable with respect to the case 260. In the illustrated embodiment, the rotational axis of the output member 264 is parallel to the second rotational axis X2 of the output shaft 246. Furthermore, the output member 264 is concentrically arranged relative to the input member 262. Specifically, the output member 264 rotates together with the input member 262 while the input member 262 is rotated by the rotation of the motor 244. Furthermore, the output member 264 is operatively coupled to the output shaft 246. Specifically, the output member 264 has an externally-toothed output gear 264a that is fixedly coupled to an output shaft of the output member 264. In the illustrated embodiment, the output gear 264a is formed of a rigid material, such as a lightweight metal and/or non-metallic material, suitable for gears. The output gear 264a is operatively coupled to the output shaft 246 via the second reduction gear train 256. The output gear 264a rotates together with the output member 264, and also transmits rotation to the output shaft 246 via the second reduction gear train 256.

Figure 29:
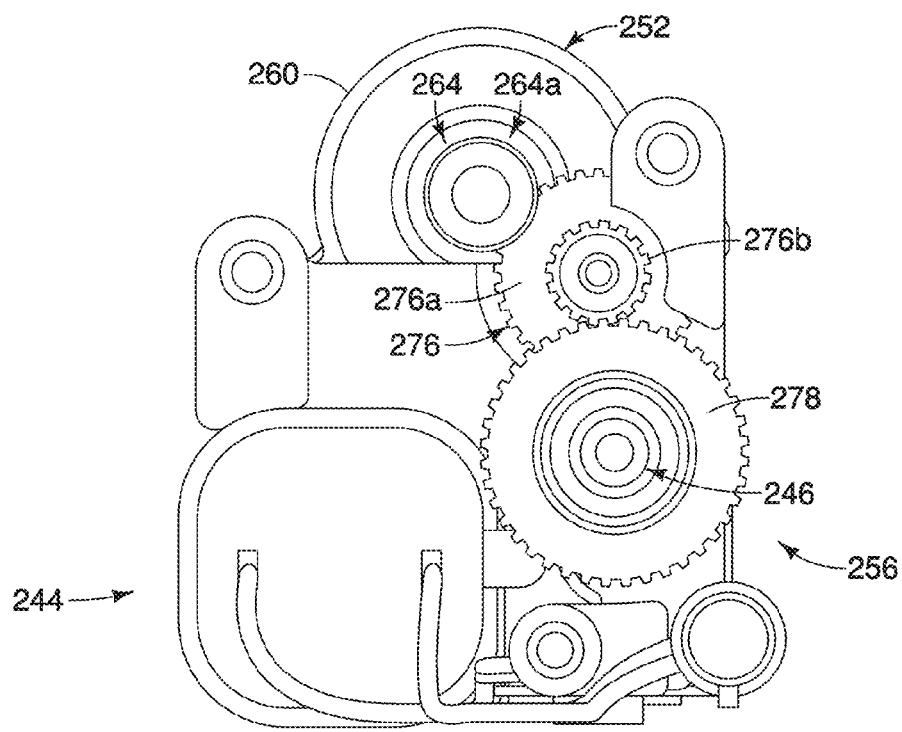
FIG. 29 is a rear side elevational view of the electric derailleur motor unit illustrated in FIG. 27, with the housing of the electric derailleur motor unit removed.

In particular, as seen in FIGS. 29, 31 and 32, the second reduction gear train 256 consists of spur gears to operatively couple the anti-backdriving device 252 to the output shaft 246. Specifically, the second reduction gear train 256 only includes a third stepped gear 276 and an output spur gear 278 (e.g., spur gears), and does not include any worms. The third stepped gear 276 is rotatably supported to the base member 243 in a conventional manner. The third stepped gear 276 has an externally-toothed third large gear portion 276a and an externally-toothed third small gear portion 276b (e.g., spur gears). The third large gear portion 276a and the third small gear portion 276b are concentrically arranged with respect to each other, and are integrally formed as a one-piece, unitary member. The third large gear portion 276a has a larger diameter than the third small gear portion 276b. The output spur gear 278 is fixedly coupled to an outer peripheral surface of the output shaft 246. The output spur gear 278 is concentrically arranged with respect to the output shaft 246. In the illustrated embodiment, as shown in FIG. 29, the output gear 264a of the output member 264 of the anti-backdriving device 252 has a smaller diameter than the third large gear portion 276a of the third stepped gear 276. The third large gear portion 276a has a smaller diameter than the output spur gear 278 of the output shaft 246. In the illustrated embodiment, the third stepped gear 276 and output spur gear 278 are formed of a rigid material, such as a lightweight metal and/or non-metallic material, suitable for gears.

In the illustrated embodiment, as seen in FIGS. 29, 31 and 32, the output gear 264a of the output member 264 of the anti-backdriving device 252 meshes with the third large gear portion 276a of the third stepped gear 276. The third small gear portion 276b of the third stepped gear 276 meshes with the output spur gear 278 of the output shaft 246. Thus, the rotation of the output member 264 of the anti-backdriving device 252 is transmitted to the output shaft 246 via the output gear 264a, the third stepped gear 276 and the output spur gear 278. In the illustrated embodiment, the second reduction gear train 256 has a plurality of spur gears (e.g., the third stepped gear 276 and the output spur gear 278). However, the second reduction gear train 256 can consist of only one spur gear or more than two spur gears as needed and/or desired. Also, the second reduction gear train 256 includes a stepped gear (e.g., the third stepped gear 276). However, the second reduction gear train 256 can only include a spur gear having a single gear portion.

The engagement element 266 is operatively disposed between the case 260 and the output member 264. The engagement element 266 has a plurality of rollers radially disposed between the case 260 and the output member 264. The rollers of the engagement element 266 are arranged to lock the output member 264 with respect to the case 260 in both rotational directions about a rotational axis of the output member 264 unless there is drive from the input member 262. On the other hand, the rollers of the engagement element 266 are arranged to release the output member 264 with respect to the case 260 when there is drive from the input member 262 in either rotational direction about a rotational axis of the input member 262. Furthermore, if the input member 262 rotates further, then the input member 262 is directly connected to the output member 264 to transmit rotation of the input member 262 to the output member 264. This type of anti-backdriving device is conventionally well-known in the art (e.g., see Japanese Patent No. 2713601, for example). Thus, the detailed configuration of the anti-backdriving device 252 will be omitted for the sake of brevity.

Thus, in the illustrated embodiment, the rotation of the motor shaft 244a of the motor 244 in both rotational directions about the first rotational axis X1 is transmitted to the input member 262 of the anti-backdriving device 252 via the first reduction gear train 254, which also rotate the output member 264 of the anti-backdriving device 252. Furthermore, this rotation of the output member 264 is transmitted to the output shaft 246 via the second reduction gear train 256, which move the chain guide 232 between the retracted and extended positions via the links 234 and 236. In other words, in the illustrated embodiment, the anti-backdriving device 252 is configured to transmit rotation of the motor shaft 244a of the motor 244 in both rotational directions about the first rotational axis X1 to the output shaft 246.

On the other hand, if an external rotational torque from outside of the motor unit 240 is exerted to the output shaft 246, the external rotational torque is transmitted to the output member 264 of the anti-backdriving device 252 via the second reduction gear train 256. However, with the anti-backdriving device 252, the output member 264 is locked with respect to the case 260 in both rotational directions about the rotational axis of the output member 264 unless there is drive from the input member 262. Thus, the anti-backdriving device 252 performs self-lock function, which prevents the external rotational toque transmitted to the output member 264 from being further transmitted to the input member 262. As a result, the external rotational torque is prevented from being further transmitted to the motor 244 via the first reduction gear train 254. In the illustrated embodiment, since the output member 264 of the anti-backdriving device 252 is operatively coupled to the output shaft 246 via the second reduction gear train 256, the output shaft 246 is also locked while the output member 264 is locked. In other words, in the illustrated embodiment, the anti-backdriving device 252 is further configured to prevent the output shaft 246 from rotating in both rotational directions about the second rotational axis X2 while the output shaft 246 receives the external rotational torque from outside of the electric derailleur motor unit 240. Furthermore, the anti-backdriving device 252 is further configured to lock the output member 264 with respect to the case 260 in response to the rotation of the output shaft 246 being transmitted from the output shaft 246 to the output member 264 of the anti-backdrivin device 252.

When external force from outside of the motor unit 240, such as reaction force from a chain of the bicycle, is exerted to the chain guide 232 or the links 234 and 236, this external force causes an external rotational torque that is exerted to the output shaft 246 via the chain guide 232 or the links 234 and 236. However, with the motor unit 240, the external rotational torque is prevented from being transmitted beyond the anti-backdriving device 252 to the motor 244. Thus, the motor 244 or the position control/detecting mechanism of the motor 244 can be properly protected.

Figure 33:
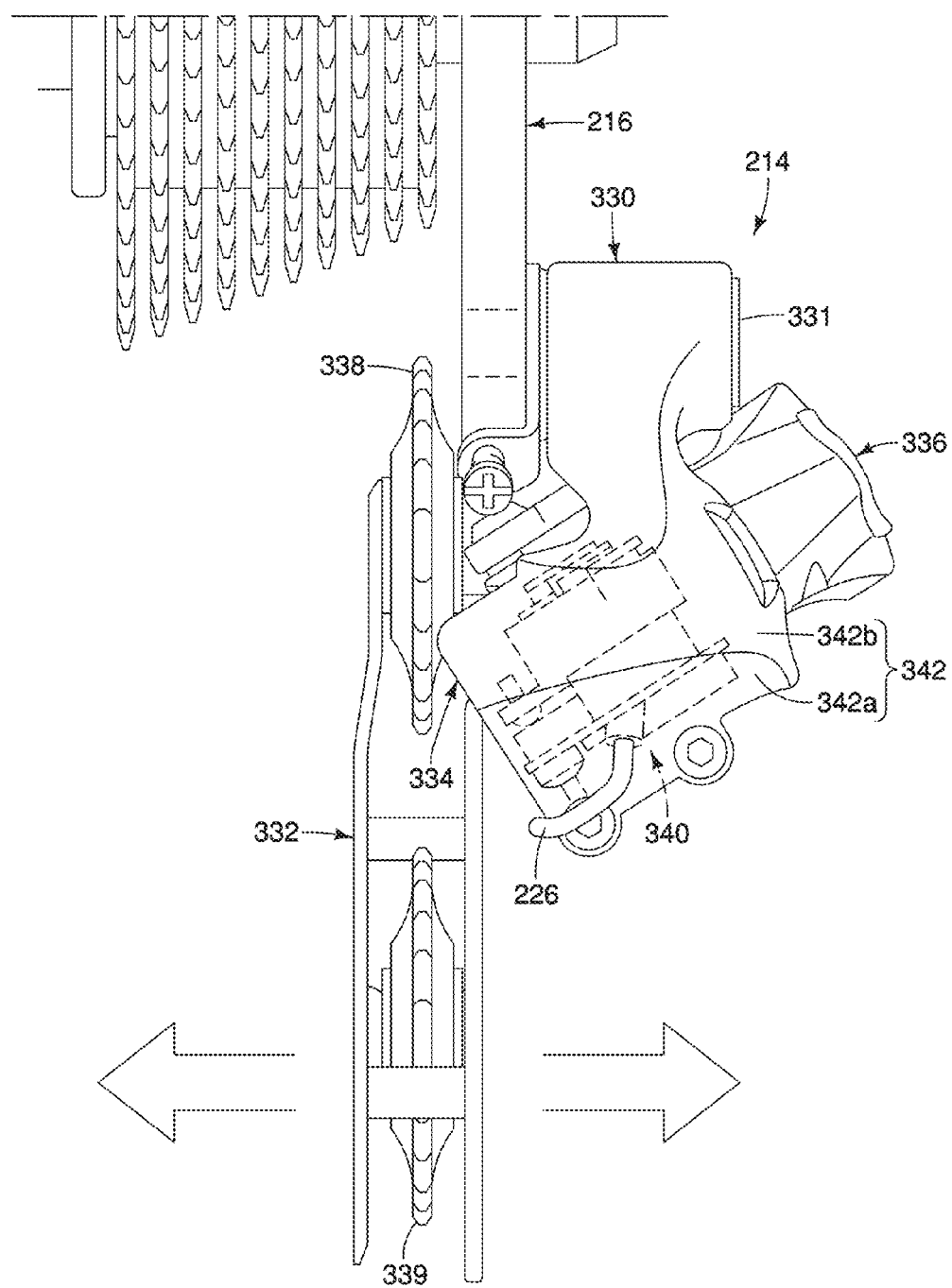
FIG. 33 is a rear side elevational view of the motorized rear derailleur attached to a rear part of a bicycle frame of the bicycle illustrated in FIG. 25.

As seen in FIGS. 25 and 33, the rear derailleur 214 basically includes a derailleur base member 330 and a chain guide 332 (a movable member). The derailleur base member 330 is fixed to the bicycle frame 216 by a fixing bolt 331. The chain guide 332 is movably supported to the derailleur base member 330 to move between a retracted position and an extended position with a plurality of intermediate positions located between the retracted and extended positions. In the illustrated embodiment, the chain guide 332 is movably supported to the derailleur base member 330 by an inner link 334 and an outer link 336. The links 334 and 336 form a four bar linkage (e.g., a linkage) with the derailleur base member 330 and the chain guide 332. In the illustrated embodiment, the chain guide 332 is a conventional chain guide that includes a first or guide roller 338 and a second or tension roller 339. Thus, in the illustrated embodiment, the rear derailleur 214 (e.g., the motorized derailleur) includes the four bar linkage (e.g., the linkage) and the chain guide 332 (e.g., the movable member).

Figure 34:
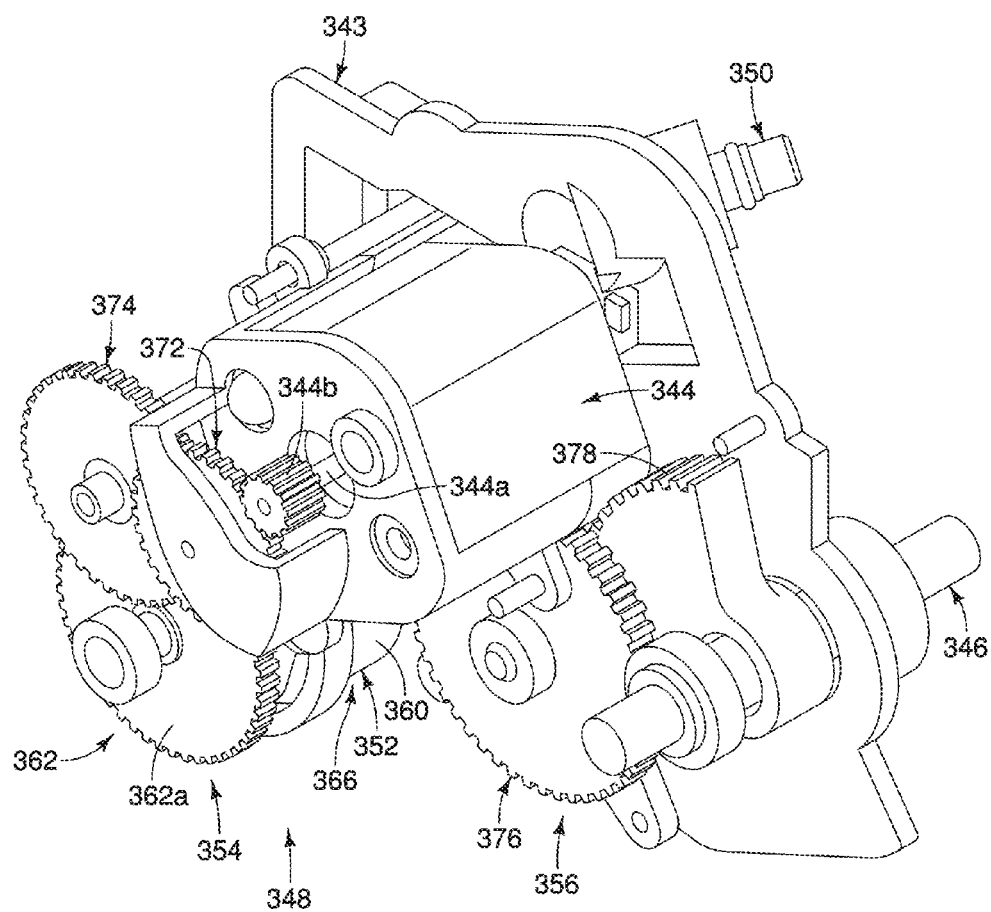
FIG. 34 is a perspective view of the electric derailleur motor unit of the motorized rear derailleur illustrated in FIG. 33.

The rear derailleur 214 (e.g., the motorized derailleur) also includes an electric derailleur motor unit 340 (hereinafter "motor unit 340"). The derailleur base member 330 supports the motor unit 340 with respect to the bicycle frame 216. The motor unit 340 is operatively coupled between the derailleur base member 330 and the chain guide 332. In other words, the chain guide 332 is operatively coupled to the motor unit 340 so as to be moved by the motor unit 340. In the illustrated embodiment, as seen in FIG. 34, the motor unit 340 (e.g., the electric derailleur motor unit) includes a housing 342, a base member 343, an electric drive part or motor 344, an output shaft 346, and a drive train 348. The chain guide 332 is operatively coupled to the motor 344 of the motor unit 340. In particular, the chain guide 332 is moved by the motor 344 of the motor unit 340 between the retracted and extended positions. The motor 344 of the rear derailleur 214 can be any conventional motor such as, for example, the motor of the rear derailleur that is disclosed in U.S. Pat. No. 6,162,140.

Here, the housing 342 has first and second covers 342a and 342b. The second cover 342b is integrally formed with the derailleur base member 330, while the first cover 342a is a separate member that is attached to the second cover 342b to conceal the motor unit 340. The first cover 342a of the housing 342 has a cable opening that opens in a downward direction relative to the housing 342 with the motor unit 340 in an installed position when the rear derailleur 214 is mounted on the bicycle 210. The cable opening provides access to a cable connector 350 of the motor unit 340 for electrically connecting the electrical cable 226 to the motor unit 340.

As seen in FIGS. 33 and 34, the base member 343 is fixedly coupled to the housing 342. When the first and second covers 342a and 342b are fastened together, the base member 343 is contained within the housing 342. The base member 343 is provided for supporting the motor 344, the output shaft 346 and the drive train 348 with respect to the housing 342 within the housing 342. The configuration of the base member 343 depends on the configuration of the motor unit 340. Since a variety of components can be supported on the base member 343 within the housing 342, the base member 343 will not be discussed or illustrated in detail.

Figure 37:
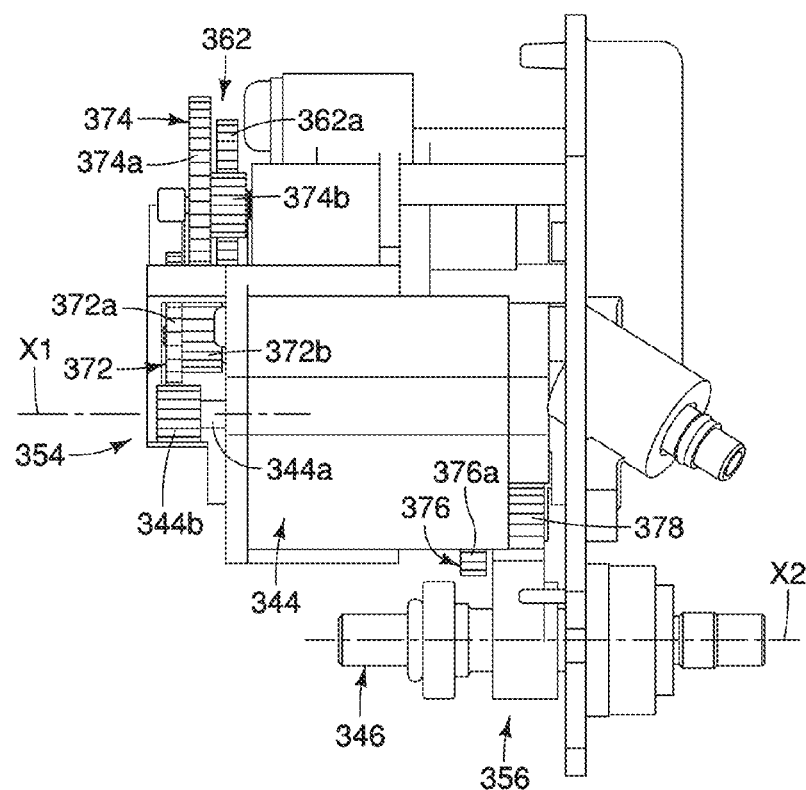
FIG. 37 is a normal view of a rear side of the electric derailleur motor unit illustrated in FIG. 34.
Figure 38:
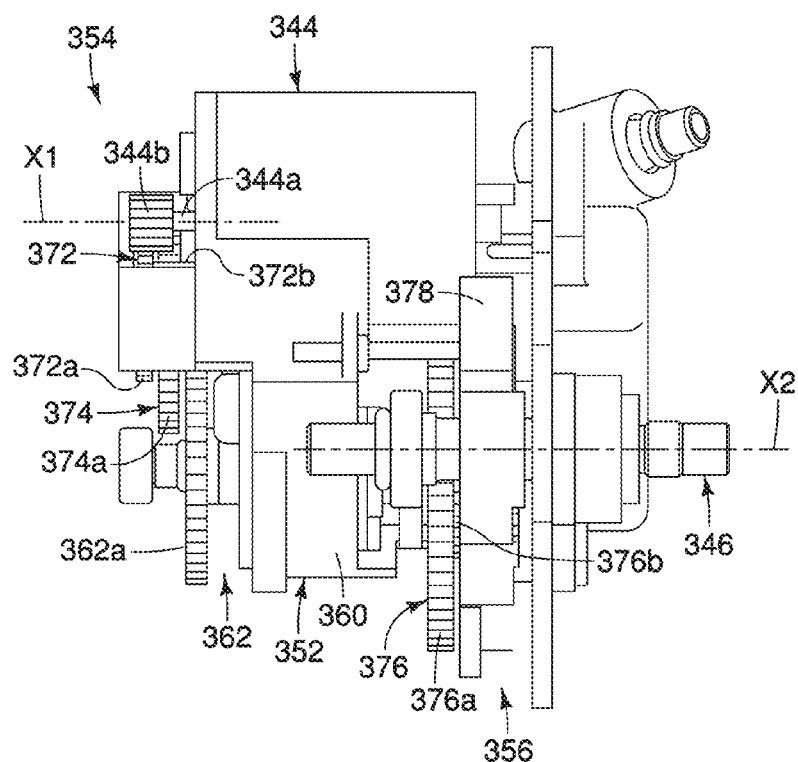
FIG. 38 is a normal view of a top side of the electric derailleur motor unit illustrated in FIG. 34.

As seen in FIG. 34, the motor 344 is mounted to the base member 343. Furthermore, as seen in FIGS. 37 and 38, the motor 344 has a motor shaft 344a rotatable about a first rotational axis X1. The motor 344 also has a motor pinion 344b (a spur gear) that is fixedly attached to the motor shaft 344a of the motor 344. In the illustrated embodiment, the motor pinion 344b is formed of a rigid material, such as a lightweight metal and/or non-metallic material, suitable for gears. The output shaft 346 is rotatable about a second rotational axis X2. In the illustrated embodiment, the first and second rotational axes X1 and X2 are parallel to each other. As seen in FIG. 34, the drive train 348 is operatively disposed between the motor shaft 344a of the motor 344 and the output shaft 346. Basically, the motor 344 drives the drive train 348 to rotate the output shaft 346. The output shaft 346 is connected to the outer link 336 to move the chain guide 332 between the retracted and extended positions. In particular, as shown in FIG. 33, the chain guide 332 is operatively coupled to the motor 344 of the motor unit 340. The links 334 and 336 (e.g., the linkage) are operatively coupled to the output shaft 346 of the motor unit 340. The chain guide 332 (e.g., the movable member) is movably supported by the links 334 and 336 (e.g., the linkage) to move relative to the base member 343 of the motor unit 340 between the retracted position (e.g., the first shift position) and the extended position (e.g., the second shift position).

The motor 344 is contained within an interior space of the housing 342. The motor 344 preferably includes other conventional parts that are not being illustrated for purposes of illustration. The motor 344 can be functionally and structurally identical to the motor 244 of the front derailleur 212, except for output torque or speed. Thus, the motor 344 will only be briefly discussed and illustrated herein. In the illustrated embodiment, the motor 344 has an internal control unit or internal drive unit (not shown) and an electrical cable extending from the internal control unit. The electrical cable is connected to the cable connector 350. Thus, the electric motor 344 is electrically connected to the battery 218 and to the electric shifter 220 by the electrical cable 224. The cable connector 350 preferably has additional conductors for attaching other wires for the position control/detecting mechanism (not shown) and/or a printed circuit board (not shown). Since the motor 344 is relatively conventional and can have a variety of configurations, the motor 344 will not be discussed or illustrated in detail.

Figure 36:
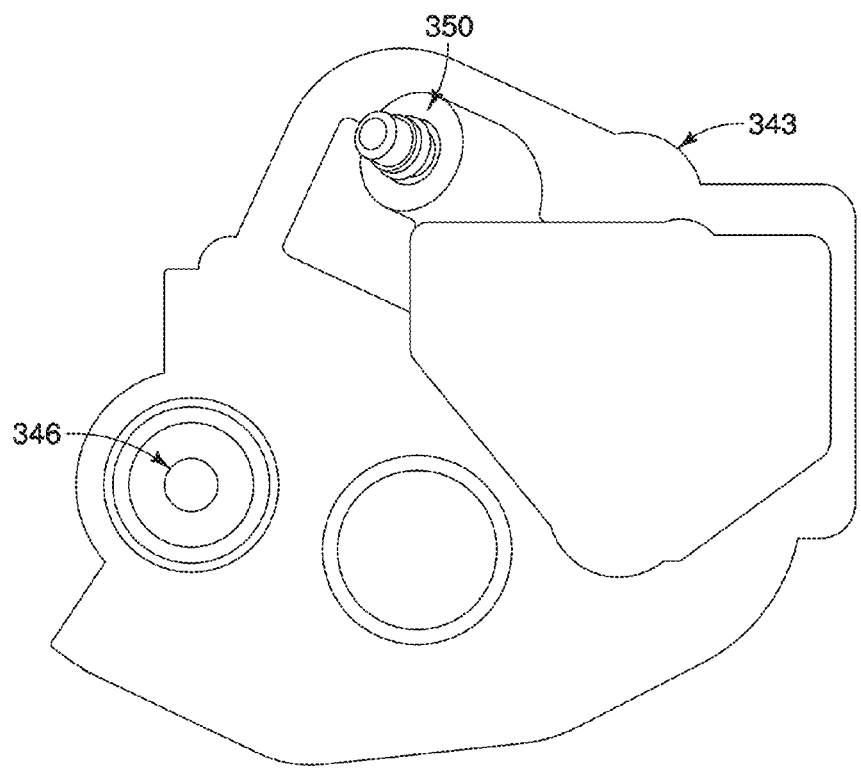
FIG. 36 is an another axial side view of the electric derailleur motor unit illustrated in FIG. 34.

As seen in FIG. 34, the drive train 348 basically includes the motor pinion 344b (the spur gear) of the motor 344, an anti-backdriving device 352, a first reduction gear train 354, and a second reduction gear train 356. In the illustrated embodiment, the first reduction gear train 354 of the drive train 348 is operatively coupled between the motor shaft 344a and the anti-backdriving device 352, while the second reduction gear train 356 of the drive train 348 is operatively coupled between the anti-backdriving device 352 and the output shaft 346. In the illustrated embodiment, as seen in FIGS. 34 and 36, the drive train 348 is basically disposed on one side of a main plate of the base member 343, and only the output shaft 346 and cable connector 350 extend through the main plate of the base member 343 towards the other side of the main plate of the base member 343.

Figure 39:
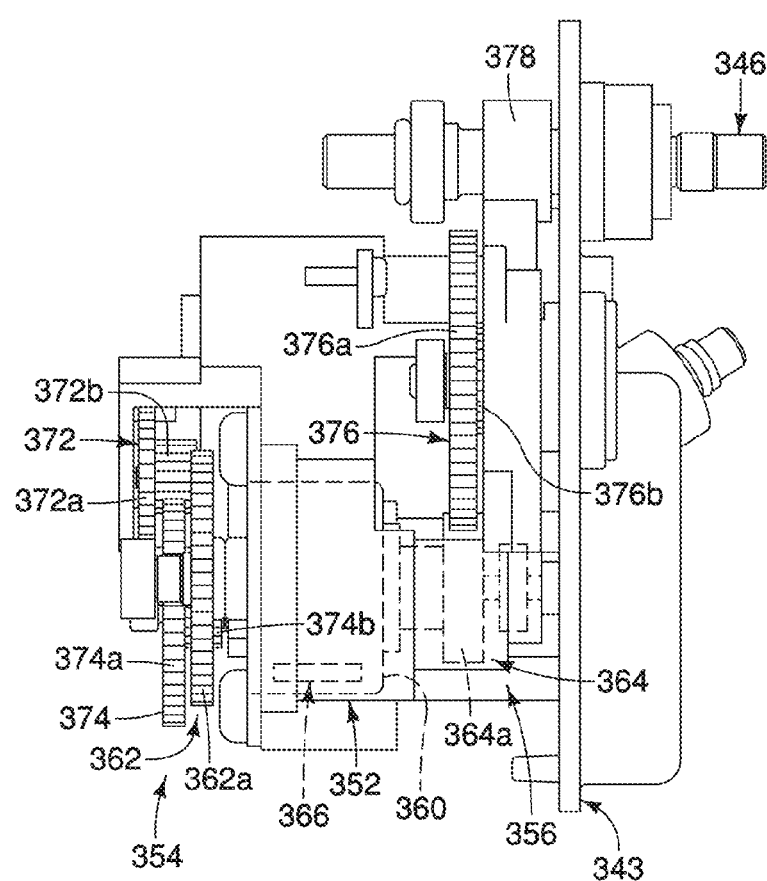
FIG. 39 is a normal view of a front side of the electric derailleur motor unit illustrated in FIG. 34.

As seen in FIG. 39, the anti-backdriving device 352 basically includes a case 360, an input member 362, an output member 364, and an engagement element 366. The case 360 is mounted to the base member 343. The case 360 houses a part of the input member 362, a part of the output member 364 and the engagement element 366.

The input member 362 of the anti-backdriving device 352 is rotatable with respect to the case 360. In the illustrated embodiment, the rotational axis of the input member 362 is parallel to the first rotational axis X1 of the motor 344. The input member 362 is operatively coupled to the motor shaft 344a of the motor 344. Specifically, the input member 362 has an externally-toothed input gear 362a that is fixedly coupled to an input shaft of the input member 362. In the illustrated embodiment, the input gear 362a is formed of a rigid material, such as a lightweight metal and/or non-metallic material, suitable for gears. The input gear 362a is operatively coupled to the motor shaft 344a of the motor 344 via the first reduction gear train 354. Thus, the input gear 362a rotates together with the input member 362 while rotation of the motor 344 is transmitted to the input gear 362a via the first reduction gear train 354.

In particular, as seen in FIGS. 35 and 37 to 39, the first reduction gear train 354 consists of spur gears to operatively couple the motor shaft 344a to the anti-backdriving device 352. Specifically, the first reduction gear train 354 only includes first and second stepped gears 372 and 374 (e.g., spur gears), and does not include any worms. The first and second stepped gears 372. and 374 are rotatably supported to the base member 343 in a conventional manner. Specifically, the first and second stepped gears 372 and 374 are rotatable about rotational axes, respectively. The rotational axes of the first and second stepped gears 372 and 374 are parallel to each other. Furthermore, the rotational axes of the first and second stepped gears 372 and 374 are parallel to the first rotational axis X1 of the motor 344.

Figure 35:
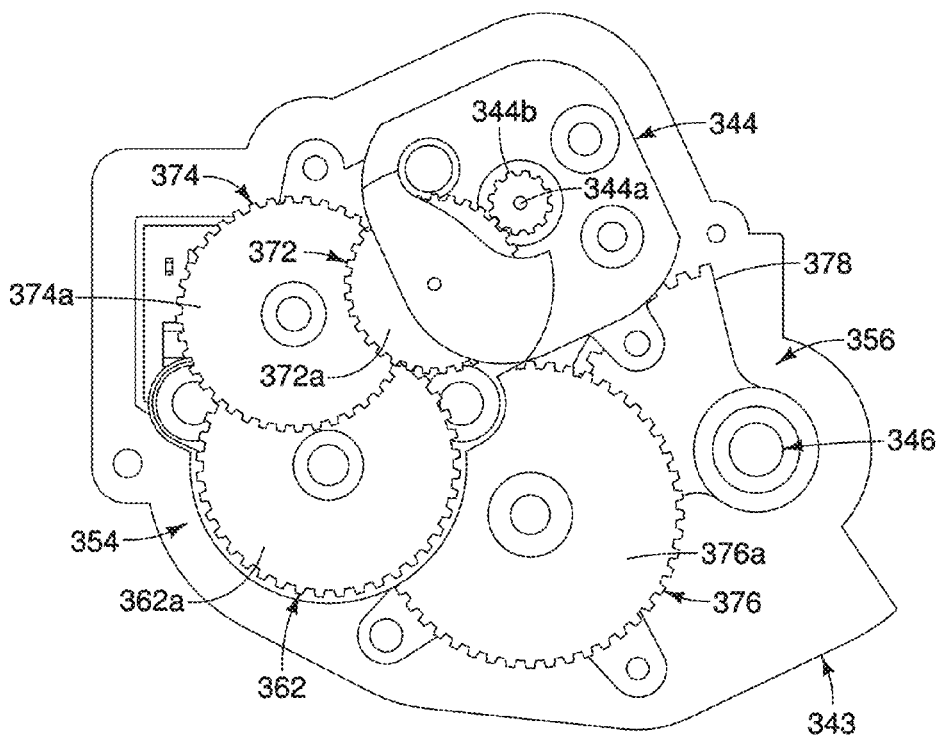
FIG. 35 is an axial side view of the electric derailleur motor unit illustrated in FIG. 34.

The first stepped gear 372 has an externally-toothed first large gear portion 372a and an externally-toothed first small gear portion 372b (e.g., spur gears). Similarly, the second stepped gear 374 has an externally-toothed second large gear portion 374a and an externally-toothed second small gear portion 374b (e.g., spur gears). The first and second stepped gears 372 and 374 are identical to the first and second stepped gears 272 and 274 of the front derailleur 212, respectively. Thus, the detailed descriptions of the first and second stepped gears 372 and 374 will be omitted for the sake of brevity. Of course, the diameters or the tooth counts of the first and second stepped gears 372 and 374 can be different from the first and second stepped gears 272 and 274 of the front derailleur 212 as needed and/or desired. In the illustrated embodiment, as shown in FIG. 35, the motor pinion 344b of the motor 344 has a smaller diameter than the first large gear portion 372a of the first stepped gear 372. The first large gear portion 372a has a smaller diameter than the second large gear portion 374a of the second stepped gear 374. The second large gear portion 374a has a smaller diameter than the input gear 362a of the input member 362 of the anti-backdriving device 352.

In the illustrated embodiment, as seen in FIGS. 35 and 37 to 39, the motor pinion 344b of the motor 344 meshes with the first large gear portion 372a of the first stepped gear 372. The first small gear portion 372b of the first stepped gear 372 meshes with the second large gear portion 374a of the second stepped gear 374. The second small gear portion 374b of the second stepped gear 374 meshes with the input gear 362a of the input member 362 of the anti-backdriving device 352. Thus, the rotation of the motor 344 is transmitted to the input member 362 of the anti-backdriving device 352 via the motor pinion 344b, the first stepped gear 372, the second stepped gear 374 and the input gear 362a. In the illustrated embodiment, the first reduction gear train 354 has a plurality of spur gears (e.g., the first and second stepped gears 372 and 374). However, the first reduction gear train 354 can consist of only one spur gear or more than two spur gears as needed and/or desired. Also, each of the spur gears of the first reduction gear train 354 includes a stepped gear (e.g., the first and second stepped gears 372 and 374). However, each of the spur gear of the first reduction gear train 354 can be a spur gear having a single gear portion.

On the other hand, the output member 364 of the anti-backdriving device 352 is rotatable with respect to the case 360. In the illustrated embodiment, the rotational axis of the output member 364 is parallel to the second rotational axis X2 of the output shaft 346. Furthermore, the output member 364 is concentrically arranged relative to the input member 362. Specifically, the output member 364 rotates together with the input member 362 while the input member 362 is rotated by the rotation of the motor 344. Furthermore, the output member 364 is operatively coupled to the output shaft 346. Specifically, the output member 364 has an externally-toothed output gear 364a that is fixedly coupled to an output shaft of the output member 364. In the illustrated embodiment, the output gear 364a is formed of a rigid material, such as a lightweight metal and/or non-metallic material, suitable for gears. The output gear 364a is operatively coupled to the output shaft 346 via the second reduction gear train 356. The output gear 364a rotates together with the output member 364, and also transmits rotation to the output shaft 346 via the second reduction gear train 356.

In particular, as seen in FIGS. 35 and 37 to 39, the second reduction gear train 356 consists of spur gears to operatively couple the anti-backdriving device 352 to the output shaft 346. Specifically, the second reduction gear train 356 only includes a third stepped gear 376 and an output sector gear 378 (e.g., spur gears), and does not include any worms. The third stepped gear 376 is rotatably supported to the base member 343 in a conventional manner. The third stepped gear 376 has an externally-toothed third large gear portion 376a and an externally-toothed third small gear portion 376b (e.g., spur gears). The third stepped gear 376 is identical to the third stepped gear 276 of the front derailleur 212. Thus, the detailed descriptions of the third stepped gear 376 will be omitted for the sake of brevity. Of course, the diameters or the tooth counts of the third stepped gear 376 can be different from the third stepped gear 376 of the front derailleur 212 as needed and/or desired. The output sector gear 378 is fixedly coupled to an outer peripheral surface of the output shaft 346. The end portion of the output sector gear 378 is concentrically arranged with respect to the output shaft 346. In the illustrated embodiment, the output sector gear 378 is a partial spur gear. Alternatively, a full spur gear can be used in place of the output sector gear 378, whereby only some of the gear teeth on a full gear are utilized. In the illustrated embodiment, as shown in FIGS. 35 and 39, the output gear 364a of the output member 364 of the anti-backdriving device 352 has a smaller diameter than the third large gear portion 376a of the third stepped gear 376. The third large gear portion 376a has a smaller diameter than the output sector gear 378 of the output shaft 346. In the illustrated embodiment, the output sector gear 378 is formed of a rigid material, such as a lightweight metal and/or non-metallic material, suitable for gears.

In the illustrated embodiment, as seen in FIGS. 37 to 39, the output gear 364a of the output member 364 of the anti-backdriving device 352 meshes with the third large gear portion 376a of the third stepped gear 376. The third small gear portion 376b of the third stepped gear 376 meshes with the output sector gear 378 of the output shaft 346. Thus, the rotation of the output member 364 of the anti-backdriving device 352 is transmitted to the output shaft 346 via the output gear 364a, the third stepped gear 376 and the output sector gear 378. In the illustrated embodiment, the second reduction gear train 356 has a plurality of spur gears (e.g., the third stepped gear 376 and the output sector gear 378). However, the second reduction gear train 356 can consist of only one spur gear or more than two spur gears as needed and/or desired. Also, the second reduction gear train 356 includes a stepped gear (e.g., the third stepped gear 376). However, the second reduction gear train 356 can only include a spur gear having a single gear portion.

The engagement element 366 is operatively disposed between the case 360 and the output member 364. The engagement element 366 has a plurality of rollers radially disposed between the case 360 and the output member 364. The rollers of the engagement element 366 are arranged to lock the output member 364 with respect to the case 360 in both rotational directions about a rotational axis of the output member 364 unless there is drive from the input member 362. On the other hand, the rollers of the engagement element 366 are arranged to release the output member 364 with respect to the case 360 when there is drive from the input member 362 in either rotational direction about a rotational axis of the input member 362. Furthermore, if the input member 362 rotates further, then the input member 362 is directly connected to the output member 364 to transmit rotation of the input member 362 to the output member 364. This type of anti-backdriving device is conventionally well-known in the art (e.g., see Japanese Patent No. 2713601, for example). Thus, the detailed configuration of the anti-backdriving device 352 will be omitted for the sake of brevity.

Thus, in the illustrated embodiment, the rotation of the motor shaft 344a of the motor 344 in both rotational directions about the first rotational axis X1 is transmitted to the input member 362 of the anti-backdriving device 352 via the first reduction gear train 354, which also rotate the output member 364 of the anti-backdrivg device 352. Furthermore, this rotation of the output member 364 is transmitted to the output shaft 364 via the second reduction gear train 356, which move the chain guide 332 between the retracted and extended positions via the links 334 and 336. In other words, in the illustrated embodiment, the anti-backdriving device 352 is configured to transmit rotation of the motor shaft 344a of the motor 344 in both rotational directions about the first rotational axis X1 to the output shaft 346.

On the other hand, if an external rotational torque from outside of the motor unit 340 is exerted to the output shaft 346, the external rotational torque is transmitted to the output member 364 of the anti-backdriving device 352 via the second reduction gear train 354. However, with the anti-backdriving device 352, the output member 364 is locked with respect to the case 360 in both rotational directions about the rotational axis of the output member 364 unless there is drive from the input member 362. Thus, the anti-backdriving device 352 performs self-lock function, which prevents the external rotational toque transmitted to the output member 364 from being further transmitted to the input member 362. As a result, the external rotational torque is prevented from being further transmitted to the motor 344 via the first reduction gear train 354. In the illustrated embodiment, since the output member 364 of the anti-backdriving device 352 is operatively coupled to the output shaft 346 via the second reduction gear train 356, the output shaft 346 is also locked while the output member 364 is locked. In other words, in the illustrated embodiment, the anti-backdriving device 352 is further configured to prevent the output shaft 346 from rotating in both rotational directions about the second rotational axis X2 while the output shaft 346 receives the external rotational torque from outside of the electric derailleur motor unit 340. Furthermore, the anti-backdriving device 352 is further configured to lock the output member 364 with respect to the case 360 in response to the rotation of the output shaft 346 being transmitted from the output shaft 346 to the output member 364 of the anti-backdriving device 352.

When external force from outside of the motor unit 340, such as reaction force from a chain of the bicycle, is exerted to the chain guide 332 or the links 334 and 336, this external force causes an external rotational torque that is exerted to the output shaft 346 via the chain guide 332 or the links 334 and 336. However, with the motor unit 340, the external rotational torque is prevented from being transmitted beyond the anti-backdriving device 352 to the motor 344. Thus, the motor 344 or the position control/detecting mechanism of the motor 344 can be properly protected.

In the illustrated embodiment, the anti-backdriving devices 252 and 352 lock the output members 264 and 364 with respect to the cases 260 and 360, respectively, in response to the rotation of the output shafts 246 and 346 being transmitted from the output shafts 246 and 346 to the output members 264 and 364, respectively. On the other hand, different types of anti-backdriving devices can be alternatively used in place of the anti-backdriving devices 252 and 352. For example, with an alternative anti-backdriving device, when an input member of the anti-backdriving device is rotated, then an output member of the anti-backdriving device also rotates. On the other hand, if an external rotational torque from outside the anti-backdriving device in both rotational directions is exerted to the output member, then the output member can freely rotate with respect to an input member, and the rotational torque is not transmitted from the output member to the input member.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e., one element is essentially part of the other element. This definition also applies to words of similar meaning, for example, "joined", "connected", "coupled", "mounted", "bonded", "fixed" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Moreover, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric derailleur motor unit configured to be attached to a derailleur comprising:
   a base member;
   a motor mounted to the base member, the motor having a motor shaft rotatable about a first rotational axis;
   an output shaft rotatable about a second rotational axis; and
   a drive train operatively disposed between the motor shaft of the motor and the output shaft, the drive train including an anti-backdriving device, the anti-backdriving device being configured to transmit rotation of the motor shaft of the motor in both rotational directions about the first rotational axis to the output shaft, and the anti-backdriving device being further configured to prevent the output shaft from rotating in both rotational directions about the second rotational axis while the output shaft receives an external rotational torque from outside of the electric derailleur motor unit,
   the drive train further including a second reduction gear train that is operatively coupled between the anti-backdriving device and the output shaft.

2. The electric derailleur motor unit according to claim 1, wherein
   the anti-backdriving device includes
      a case mounted to the base member,
      an input member rotatable with respect to the case, the input member being operatively coupled to the motor shaft of the motor,
      an output member rotatable with respect to the case, the output member operatively coupled to the output shaft, and
      an engagement element operatively disposed between the case and the output member.

3. The electric derailleur motor unit according to claim 2 wherein
   the anti-backdriving device is further configured to lock the output member with respect to the case in response to the rotation of the output shaft being transmitted from the output shaft to the output member of the anti-backdriving device.

4. The electric derailleur motor unit according to claim 1, wherein
   the drive train further includes a spur gear that is fixedly attached to the motor shaft of the motor.

5. The electric derailleur motor unit according to claim 1, wherein
   the first and second rotational axes are parallel to each other.

6. The electric derailleur motor unit according to claim 1, wherein
   the drive train further includes a first reduction gear train that is operatively coupled between the motor shaft and the anti-backdriving device.

7. The electric derailleur motor unit to claim 6, wherein
   the first reduction gear train consists of spur gears to operatively couple the motor shaft to the anti-backdriving device.

8. The electric derailleur motor unit according to claim 1, wherein
   the second reduction gear train consists of spur gears to operatively couple the anti-backdriving device to the output shaft.

9. The electric derailleur motor unit according to claim 6, wherein
   the drive train further includes a second reduction gear train that is operatively coupled between the anti-backdriving device and the output shaft.

10. The electric derailleur motor unit according to claim 9, wherein
    the second reduction gear train consists of spur gears to operatively couple the anti-backdriving device to the output shaft.

11. A motorized derailleur including the electric derailleur motor unit according to claim 1, the motorized derailleur comprising:
    a linkage operatively coupled to the output shaft, and
    a chain guide movably supported by the linkage to move relative to the base member between a first shift position and a second shift position.

12. The motorized derailleur according to claim 11, wherein the anti-backdriving device includes
    a case mounted to the base member,
    an input member rotatable with respect to the case, the input member being operatively coupled to the motor shaft of the motor,
    an output member rotatable with respect to the case, the output member operatively coupled to the output shaft, and an engagement element operatively disposed between the case and the output member.

13. The motorized derailleur according to claim 12, wherein
the anti-backdriving device is further configured to lock the output member with respect to the case in response to the rotation of the output shaft being transmitted from the output shaft to the output member of the anti-backdriving device.

14. The motorized derailleur according to claim 11, wherein
the drive train further includes a spur gear that is fixedly attached to the motor shaft of the motor.

15. The motorized derailleur according to claim 11, wherein
the first and second rotational axes are parallel to each other.

16. A bicycle derailleur including a bicycle derailleur motor gear unit configured to reduce motor speed of a motor and transmit motor torque of the motor to a derailleur, the bicycle derailleur motor gear unit comprising:
an output shaft;
a fixed sun gear;
an output sun gear rotatable relative to the fixed sun gear, the output sun gear being fixedly coupled to the output shaft;
a plurality of planet gears; and
a carrier rotatably and revolvably supporting the planet gears;
each of the planet gears having a first gear that engages with the fixed sun gear and a second gear that engages with the output sun gear, the first gear and the second gear being coaxially coupled to each other,
the fixed sun gear, the output sun gear, the first gear, and the second gear having tooth counts, respectively, such that the fixed sun gear, the output sun gear, the first gear, and the second gear lock while an external force is exerted to the output sun gear.

17. A bicycle derailleur motor gear unit configured to reduce motor speed of a motor and transmit motor torque of the motor to a derailleur, the bicycle derailleur motor gear unit comprising:
an output shaft;
a fixed external sun gear;
an output external sun gear rotatable relative to the fixed external sun gear, the output external sun gear being fixedly coupled to the output shaft, the output external sun gear having external gear teeth;
a plurality of planet gears; and
a carrier rotatably and revolvably supporting the planet gears;
each of the planet gears having a first gear that engages with the fixed external sun gear and a second gear that engages with the output external sun gear, the first gear and the second gear being coaxially coupled to each other,
the fixed external sun gear, the output external sun gear, the first gear, and the second gear having tooth counts, respectively, such that the tooth counts satisfy the following formulas:

$$(\eta ab*Za/Zb+1)/(Ze/(\eta de*Zd)+1) \leq 1$$
when $Zb*Ze < Za*Zd$; and $$(\eta de*Ze/Zd+1)/(Za/(\eta ab*Zb)+1) \leq 1$$
when $Zb*Ze > Za*Zd$, where Za represents the tooth count of the fixed external sun gear, Ze represents the tooth count of the output external sun gear, Zb represents the tooth count of the first gear, Zd represents the tooth count of the second gear, ηab represents a transmission coefficient between the fixed external sun gear and the first gear, and ηde represents a transmission coefficient between the output external sun gear and the second gear.

18. A bicycle derailleur motor gear unit configured to reduce motor speed of a motor and transmit motor torque of the motor to a derailleur, the bicycle derailleur motor gear unit comprising:
an output shaft;
a fixed internal gear;
an output internal gear rotatable relative to the fixed internal gear, the output internal gear being fixedly coupled to the output shaft, the output internal gear having internal gear teeth;
a plurality of planet gears; and
a carrier rotatably and revolvably supporting the planet gears;
each of the planet gears having a first gear that engages with the fixed internal gear and a second gear that engages with the output internal gear, the first gear and the second gear being coaxially coupled to each other,
the fixed internal gear, the output internal gear, the first gear, and the second gear having tooth counts, respectively, such that the tooth counts satisfy the following formulas:

$$(\eta bc*Zc/Zb-1)/\{Zf/(\eta df*Zd)-1\} \leq 1$$
when $Zc*Zd > Zb*Zf$; and $$(\eta df*Zf/Zd-1)/(\eta bc*Zc/Zb-1) \leq 1 \text{ when } Zc*Zd < Zb*Zf,$$

where Zc represents the tooth count of the fixed internal gear, Zf represents the tooth count of the output internal gear, Zb represents the tooth count of the first gear, Zd represents the tooth count of the second gear, ηbc represents a transmission coefficient between the fixed internal gear and the first gear, and ηdf represents a transmission coefficient between the output internal gear and the second gear.

19. The bicycle derailleur motor gear unit according to claim 16, further comprising
a gear reduction mechanism configured to be disposed between the motor and a planetary gear mechanism including the fixed sun gear, the output sun gear, the planet gears and the carrier, the gear reduction mechanism being configured to transmit the motor torque of the motor to the planetary gear mechanism.

20. The bicycle derailleur motor gear unit according to claim 16, further comprising
a gear train with at least one spur gear configured to be disposed between a motor pinion of the motor and a planetary gear mechanism including the fixed sun gear, the output sun gear, the planet gears and the carrier, the gear train being configured to transmit the motor torque of the motor to the planetary gear mechanism.

21. The bicycle derailleur motor gear unit according to claim 16,
at least one of the planet gears has a guard that is axially disposed between the first gear and the second gear, the first gear, the second gear and the guard being a one-piece member.

22. The bicycle derailleur motor gear unit according to claim 16, wherein
the output shaft is coaxially arranged relative to a rotational axis of the output sun gear
the second gears of the planet gears engage with the output sun gear, and rotational output of the output shaft is transmitted externally.

23. The bicycle derailleur motor gear unit according to claim 17, further comprising
a gear reduction mechanism configured to be disposed between the motor and a planetary gear mechanism including the fixed external sun gear, the output external sun gear, the planet gears and the carrier, the gear reduction mechanism being configured to transmit the motor torque of the motor to the planetary gear mechanism.

24. The bicycle derailleur motor gear unit according to claim 17, further comprising
a gear train with at least one spur gear configured to be disposed between a motor pinion of the motor and a planetary gear mechanism including the fixed external sun gear, the output external sun gear, the planet gears and the carrier, the gear train being configured to transmit the motor torque of the motor to the planetary gear mechanism.

25. The bicycle derailleur motor gear unit according to claim 17, wherein
at least one of the planet gears has a guard that is axially disposed between the first gear and the second gear, the first gear, the second gear and the guard being a one-piece member.

26. The bicycle derailleur motor gear unit according to claim 17, wherein
the output shaft is coaxially arranged relative to a rotational axis of the output external sun gear,
the second gears of the planet gears engage with the output external sun gear, and
rotational output of the output shaft is transmitted externally.

27. The bicycle derailleur motor gear unit according to claim 17, wherein
the transmission coefficient between the fixed external sun gear and the first gear and the transmission coefficient between the output external sun gear and the second gear have a value of 0.9.

28. The bicycle derailleur motor gear unit according to claim 18, further comprising
a gear reduction mechanism configured to be disposed between the motor and a planetary gear mechanism including the fixed internal gear, the output internal gear, the planet gears and the carrier, the gear reduction mechanism being configured to transmit the motor torque of the motor to the planetary gear mechanism.

29. The bicycle derailleur motor gear unit according to claim 18, further comprising
a gear train with at least one spur gear configured to be disposed between a motor pinion of the motor and a planetary gear mechanism including the fixed internal gear, the output internal gear, the planet gears and the carrier, the gear train being configured to transmit the motor torque of the motor to the planetary gear mechanism.

30. The bicycle derailleur motor gear unit according to claim 18, wherein
at least one of the planet gears has a guard that is axially disposed between the first gear and the second gear, the first gear, the second gear and the guard being a one-piece member.

31. The bicycle derailleur motor gear unit according to claim 18, wherein
the output shaft is coaxially arranged relative to a rotational axis of the output internal gear,
the second gears of the planet gears engage with the output internal gear, and
rotational output of the output shaft is transmitted externally.

32. The bicycle derailleur motor gear unit according to claim 18, wherein
the transmission coefficient between the fixed internal gear and the first gear and the transmission coefficient between the output internal gear and the second gear have a value of 0.9.

33. An electric derailleur motor unit comprising:
a base member;
a motor mounted to the base member, the motor having a motor shaft rotatable about a first rotational axis;
an output shaft rotatable about a second rotational axis; and
a drive train operatively disposed between the motor shaft of the motor and the output shaft, the drive train including an anti-backdriving device, the anti-backdriving device being configured to transmit rotation of the motor shaft of the motor in both rotational directions about the first rotational axis to the output shaft, and the anti-backdriving device being further configured to prevent the output shaft from rotating in both rotational directions about the second rotational axis while the output shaft receives an external rotational torque from outside of the electric derailleur motor unit,
the motorized derailleur comprising:
a linkage operatively coupled to the output shaft, and
a chain guide movably supported by the linkage to move relative to the base member between a first shift position and a second shift position.

* * * * *